(12) United States Patent
Kirkconnell et al.

(10) Patent No.: US 12,460,254 B2
(45) Date of Patent: Nov. 4, 2025

(54) **COMPOSITIONS, METHODS AND KITS FOR DETECTING *MYCOPLASMA gENITALIUM***

(71) Applicant: GEN-PROBE INCORPORATED, San Diego, CA (US)

(72) Inventors: Brett W. Kirkconnell, San Diego, CA (US); Barbara S. Weinbaum, La Jolla, CA (US); Damon K. Getman, Poway, CA (US); Alice Jiang, San Diego, CA (US)

(73) Assignee: Gen-Probe Incorporated, San Diego, CA (US)

( * ) Notice: Subject to any disclaimer, the term of this patent is extended or adjusted under 35 U.S.C. 154(b) by 1018 days.

(21) Appl. No.: 17/266,060

(22) PCT Filed: Aug. 7, 2019

(86) PCT No.: PCT/US2019/045520
§ 371 (c)(1),
(2) Date: Feb. 4, 2021

(87) PCT Pub. No.: WO2020/033557
PCT Pub. Date: Feb. 13, 2020

(65) Prior Publication Data
US 2021/0310059 A1    Oct. 7, 2021

Related U.S. Application Data

(60) Provisional application No. 62/716,241, filed on Aug. 8, 2018.

(51) Int. Cl.
*C12Q 1/689*    (2018.01)
*C12Q 1/6844*    (2018.01)

(52) U.S. Cl.
CPC ........... *C12Q 1/6844* (2013.01); *C12Q 1/689* (2013.01)

(58) Field of Classification Search
CPC ....... C12Q 1/6844; C12Q 1/689; C12Q 1/686
See application file for complete search history.

(56) References Cited

U.S. PATENT DOCUMENTS

| 5,969,122 A | 10/1999 | Hammond et al. |
| 6,031,091 A * | 2/2000 | Arnold, Jr. ............. C07H 21/00 536/23.1 |
| 7,345,155 B2 | 3/2008 | Cunningham et al. |
| 2003/0194723 A1 * | 10/2003 | Cunningham ......... C12Q 1/689 435/6.12 |
| 2017/0039316 A1 * | 2/2017 | Fofanov ................. G16B 30/10 |

FOREIGN PATENT DOCUMENTS

| JP | 2002281980 A * | 10/2002 | |
| WO | WO-2009039549 A2 * | 4/2009 | ............. C12Q 1/689 |
| WO | 2017202895 A1 | 11/2017 | |

OTHER PUBLICATIONS

Machine Translation of WO-2009039549-A2. Obtained Dec. 11, 2023. (Year: 2009).*
GenBank Accession No. AB069813 (Year: 2002).*
Machine Translation of JP-2002281980-A. (Year: 2002).*
Jensen et al. "Detection of *Mycoplasma genitalium* by PCR Amplification of the 16S rRNA Gene," Journal of Clinical Microbiology, 41(1): 261-266 (2003).
Jensen et al. "Azithromycin Treatment Failure in *Mycoplasma genitalium*-Positive Patients with Nongonococcal Urethritis Is Associated with Induced Macrolide Resistance," Clininal Infectious Diseases, 47(12): 1546-1553 (2008).
PCT, International Search Report and Written Opinion for Application No. PCT/US2019/045520, mailed Oct. 11, 2019, 16 pages.
EP, Office Action for European Application No. 19759144.9, dated Mar. 12, 2024, 9 pages.

* cited by examiner

*Primary Examiner* — Angela M. Bertagna
*Assistant Examiner* — Francesca Filippa Giammona
(74) *Attorney, Agent, or Firm* — Adam M. Breier; Michael J. Gilly

(57) ABSTRACT

The present disclosure relates to oligonucleotides useful for determining the presence of *Mycoplasma genitalium* in a test sample. The oligonucleotides of the present disclosure may be incorporated into hybridization assay probes, capture probes and amplification primers, and used in various combinations thereof.

7 Claims, No Drawings

Specification includes a Sequence Listing.

COMPOSITIONS, METHODS AND KITS FOR DETECTING *MYCOPLASMA gENITALIUM*

RELATED APPLICATIONS

This application is a national stage entry under 35 U.S.C. § 371 of International Application No. PCT/US2019/045520, filed Aug. 7, 2019, which claims the benefit of U.S. Provisional Application No. 62/716,241, filed Aug. 8, 2018. The entire disclosure of this prior application is hereby incorporated by reference.

SEQUENCE LISTING

This application contains a Sequence Listing which has been submitted electronically in ASCII format and is hereby incorporated by reference in its entirety. Said ACSII copy, created on Feb. 4, 2021, is named "DIA-0068-03UT_ST25.txt" and is 26618 bytes in size.

TECHNICAL FIELD

The present disclosure generally relates to the field of biotechnology. More particularly, the disclosure relates to compositions, methods and kits useful for determining the presence of *Mycoplasma genitalium* in a test sample.

BACKGROUND

Mycoplasmas are small prokaryotic organisms (0.2 to 0.3 µm) belonging to the class Mollicutes, whose members lack a cell wall and have a small genome size. The mollicutes include at least 100 species of *Mycoplasma*, 13 of which are known to infect humans.

One *Mycoplasma* species of clinical relevance is *M. genitalium*. This organism, which is thought to be a cause of nongonococcal urethritis (NGU), a sexually transmitted disease, has been detected to a significantly greater extent in symptomatic males than in asymptomatic males. See Yoshida et al., APhylogeny-Based Rapid Identification of *Mycoplasma* and Ureaplasmas from Urethritis Patients,@ *J. Clin. Microbiol.*, 40:105-110 (2002). In addition to NGU, *M. genitalium* is thought to be involved in pelvic inflammatory disease (which can lead to infertility in women in severe cases), adverse birth outcomes, and increased risk for human immunodeficiency virus (HIV) infection. See Maniloff et al., Mycoplasmas: Molecular Biology and Pathogenesis 417 (ASM 1992); and Manhart et al., supplement to Contemporary OB/GYN (July 2017). *M. genitalium* may also cause disease in the respiratory tract, making it important for some assays to distinguish between the presence of *M. pneumoniae* and *M. gentialium*. See Lee H. Hilborne et al., A Review of the Scientific Literature as it Pertains to The Gulf War Illnesses, Vol. 1: INFECTIOUS DISEASES CH. 3 (Rand 2000).

Significantly, *M. gentialium* is more common than many other sexually transmitted pathogens. Studies of low-risk individuals estimated the prevalence of *M. gentialium* among women to be in the range of from 0.8%-4.1%, and among men to be in the range of from 1.1%-1.2%. Among the population of women attending an STI clinic, the prevalence of *M. gentialium* ranged as high as 19% in two major U.S. cities. The prevalence was as high as 15% for men attending the STI clinics. In recent studies, *M. gentialium* prevalence was actually higher than all other bacterial sexually transmitted infections.

Sensitive and highly specific molecular tests for nucleic acids of *M. gentialium* have been described in U.S. Pat. No. 7,345,155, the disclosure of which is incorporated by reference. Significantly, the close sequence relationship between nucleic acids of different *Mycoplasma* sp. makes it difficult to distinguish one from the other.

Despite the availability of existing nucleic acid-based tests for detecting *M. gentialium*, there remains a need for supplemental assays that can be used independently, or as confirmatory assays. The present disclosure addresses this need.

SUMMARY

In a first aspect, the disclosure concerns an oligonucleotide probe for detecting nucleic acids of *Mycoplasma genitalium*. Generally speaking, the oligonucleotide probe includes a target-hybridizing sequence of bases consisting of SEQ ID NO:2 or the complement thereof, allowing for substitution of RNA and DNA equivalent bases, with a non-nucleotide linker positioned between bases 6 and 7 of SEQ ID NO:2; and a detectable label attached to the non-nucleotide linker. In some embodiments, the target-hybridizing sequence of bases consists of the base sequence of SEQ ID NO:2, allowing for substitution of RNA and DNA equivalent bases. In some embodiments, the target-hybridizing sequence of bases consists of the base sequence of SEQ ID NO:2. In some embodiments, the detectable label includes a chemiluminescent label. For example, the chemiluminescent label can include an acridinium ester. In some embodiments, the oligonucleotide probe does not detect nucleic acids of *Mycoplasma pneumoniae* if hybridized thereto. In some embodiments, the oligonucleotide probe includes no more than 22 nucleotides. In some embodiments, the oligonucleotide probe includes no more than 18 nucleotides.

In a second aspect, the disclosure concerns a hybridization probe for detecting nucleic acids of *Mycoplasma genitalium*. Generally speaking, the hybridization probe includes an oligonucleotide having a target-hybridizing sequence of bases that includes the base sequence of SEQ ID NO:3 or the complement thereof, allowing for substitution of RNA and DNA equivalent bases, with a non-nucleotide linker between base positions 6 and 7 of SEQ ID NO:3; and a detectable label attached to the non-nucleotide linker. In some embodiments, the target-hybridizing sequence of bases is up to 22 bases in length and is fully contained within the sequence of SEQ ID NO: 1 or the complement thereof, allowing for substitution of RNA and DNA equivalent bases. In some embodiments, the target-hybridizing sequence of bases is selected from the group consisting of: SEQ ID NO:2 with the non-nucleotide linker between base positions 6 and 7, SEQ ID NO:1 with the non-nucleotide linker between base positions 10 and 11, SEQ ID NO:3 with the non-nucleotide linker between base positions 6 and 7, and SEQ ID NO:4 with the non-nucleotide linker between base positions 5 and 6. In some embodiments, the detectable label includes a chemiluminescent label. In some embodiments, the chemiluminescent label includes an acridinium ester. In some embodiments, the target-hybridizing sequence of bases is SEQ ID NO: 2 with the non-nucleotide linker between base positions 6 and 7. In some embodiments, the oligonucleotide includes no more than 22 nucleotides. In some embodiments, the oligonucleotide includes no more than 18 nucleotides. In some embodiments, the base sequence of the oligonucleotide is SEQ ID NO:2.

In a third aspect, the disclosure concerns a combination of oligonucleotides for amplifying and detecting a nucleic acid analyte of *Mycoplasma genitalium*. Generally speaking, the combination includes: a first amplification oligomer with a target-hybridizing sequence of bases that is 19 to 25 bases long and includes a base sequence fully contained within the sequence of SEQ ID NO:84, and optionally a first upstream base sequence that is not complementary to the nucleic acid analyte, where the first amplification oligomer is up to 60 bases in length; and a second amplification oligomer with a target-hybridizing sequence of bases that is 19 to 25 bases long and includes a base sequence fully contained within the sequence of SEQ ID NO:85, and optionally a second upstream base sequence that is not complementary to the nucleic acid analyte, where the second amplification oligomer is up to 60 bases in length. In some embodiments, the combination further includes a hybridization probe in accordance with the above-referenced second aspect of the disclosure. In some embodiments, the target-hybridizing sequence of bases of the first amplification oligomer is SEQ ID NO:23, the first amplification oligomer includes the first upstream base sequence, and the first upstream base sequence includes a promoter sequence. In some embodiments, the second amplification oligomer is selected from the group consisting of SEQ ID NO:43, SEQ ID NO:44, and SEQ ID NO:45.

In a fourth aspect, the disclosure concerns a method of determining whether a sample includes nucleic acids of *Mycoplasma genitalium*. Generally speaking, the method includes the steps of: (a) contacting the sample with a pair of amplification oligomers, where a first amplification oligomer of the pair includes a target-hybridizing sequence of bases that is 19 to 25 bases long with a base sequence fully contained within the sequence of SEQ ID NO: 84, and optionally a first upstream base sequence that is not complementary to a nucleic acid sequence of *Mycoplasma genitalium* that is to be amplified and detected, where the first amplification oligomer is up to 60 bases in length, and a second amplification oligomer with a target-hybridizing sequence of bases that is 19 to 25 bases long with a base sequence fully contained within the sequence of SEQ ID NO:85, and optionally a second upstream base sequence that is not complementary to the nucleic acid sequence of *Mycoplasma genitalium* that is to be amplified and detected, where the second amplification oligomer is up to 60 bases in length. There also is the step of (b) amplifying any nucleic acids of *Mycoplasma genitalium* that may be present in the sample using the pair of amplification oligomers in an in vitro nucleic acid amplification reaction, so that an amplification product is produced if the sample includes nucleic acids of *Mycoplasma genitalium*. There also is the step of (c) detecting the amplification product, thereby determining that the sample includes nucleic acids of *Mycoplasma genitalium*. In some embodiments, step (c) involves detecting the amplification product with a labeled hybridization probe. In some embodiments, the labeled hybridization probe includes no more than 22 nucleotides. In some embodiments, the labeled hybridization probe is an oligonucleotide including the base sequence of SEQ ID NO:3 or the complement thereof, allowing for substitution of RNA and DNA equivalent bases, with a non-nucleotide linker between base positions 6 and 7 of SEQ ID NO: 3, and a detectable label attached to the non-nucleotide linker. In some embodiments, the labeled hybridization probe is selected from the group consisting of: SEQ ID NO: 2 with the non-nucleotide linker between base positions 6 and 7, SEQ ID NO: 1 with the non-nucleotide linker between base positions 10 and 11, SEQ ID NO:2 with the non-nucleotide linker between base positions 6 and 7, and SEQ ID NO:4 with the non-nucleotide linker between base positions 5 and 6. In some embodiments, the base sequence of the hybridization probe is SEQ ID NO:2 with the non-nucleotide linker between base positions 6 and 7. In some embodiments, the target-hybridizing sequence of bases of the first amplification oligomer is SEQ ID NO:23, the first amplification oligomer includes the first upstream base sequence, the first upstream base sequence includes a promoter sequence, and where the in vitro nucleic acid amplification reaction in step (b) is a transcription-mediated amplification reaction. In some embodiments, the second amplification oligomer is selected from the group consisting of SEQ ID NO:43, SEQ ID NO:44, and SEQ ID NO: 45.

In a fifth aspect, the disclosure concerns a hybridization probe for detecting nucleic acids of *Mycoplasma genitalium*. Generally speaking, the hybridization probe includes: an oligonucleotide that includes a target-hybridizing sequence of bases up to 23 bases in length that is complementary to nucleic acids of *Mycoplasma genitalium*, where the base sequence of the target-hybridizing sequence of bases includes 20 contiguous bases of SEQ ID NO:5, and where the base sequence of the target-hybridizing sequence of bases is fully contained within the base sequence of SEQ ID NO:5 or the complement thereof, allowing for substitution of RNA and DNA equivalent bases. The oligonucleotide further includes a non-nucleotide linker joined to a detectable label. In some embodiments, the hybridization probe is up to 23 nucleotides in length. In some embodiments, the detectable label is a chemiluminescent label. For example, the chemiluminescent label can include an acridinium ester moiety. In some embodiments, the base sequence of the hybridization probe is selected from the group consisting of SEQ ID NO:5, SEQ ID NO:6, and SEQ ID NO: 7. In some embodiments, the oligonucleotide further includes one or more nucleotide analogs.

In a sixth aspect, the disclosure concerns a hybridization probe for detecting nucleic acids of *Mycoplasma genitalium*. Generally speaking, the hybridization probe includes: an oligonucleotide of no more than 20 bases in length, where the base sequence of the oligonucleotide consists of SEQ ID NO:14 or the complement thereof, allowing for substitution of RNA and DNA equivalent bases, with a non-nucleotide linker positioned between bases 14 and 15 of SEQ ID NO:14; and a detectable label attached to the non-nucleotide linker. In some embodiments, the detectable label includes a chemiluminescent label. In some embodiments, the chemiluminescent label includes an acridinium ester. In some embodiments, the hybridization probe further includes at least one nucleoside analog that includes a modified sugar residue. In some embodiments, the at least one nucleoside analog includes a ribonucleoside having a 2'-O-methyl substitution to the ribofuranosyl moiety.

In a seventh aspect, the disclosure concerns a combination of oligonucleotides for amplifying and detecting a nucleic acid analyte of *Mycoplasma genitalium*. Generally speaking, the combination includes: a first amplification oligomer with a target-hybridizing sequence of bases that is 19 to 25 bases long and includes a base sequence fully contained within the sequence of SEQ ID NO:87, and optionally a first upstream base sequence that is not complementary to the nucleic acid analyte, where the first amplification oligomer is up to 60 bases in length; and a second amplification oligomer with a target-hybridizing sequence of bases that is 19 to 25 bases long and includes a base sequence fully contained within the sequence of SEQ ID NO:88, and optionally a second upstream base sequence that is not complementary to the nucleic acid analyte, where the second amplification oligomer is up to 60 bases in length. In some embodiments, the combination further includes a hybridization probe in accordance with the sixth aspect of the disclosure. In some embodiments, the first amplification oligomer includes the first upstream base sequence, the first upstream base sequence being a promoter sequence. In some embodiments, the target-hybridizing sequence of the first amplification oligomer is selected from the group consisting of SEQ ID NO:24, SEQ ID NO:25, SEQ ID NO:26, and SEQ ID NO:27. In some embodiments, the second amplification oligomer is up to 25 bases in length. In some embodiments, the second amplification oligomer is selected from the group consisting of SEQ ID NO:47, SEQ ID NO:48, SEQ ID NO:46, SEQ ID NO:49, and SEQ ID NO:50.

In an eighth aspect, the disclosure concerns a method of determining whether a sample includes nucleic acids of *Mycoplasma genitalium*. Generally speaking, the method includes the steps of: (a) contacting the sample with a pair of amplification oligomers, where a first amplification oligomer of the pair includes a target-hybridizing sequence of bases that is 19 to 25 bases long with a base sequence fully contained within the sequence of SEQ ID NO: 87, and optionally a first upstream base sequence that is not complementary to a nucleic acid sequence of *Mycoplasma genitalium* that is to be detected, and where a second amplification oligomer of the pair includes a target-hybridizing sequence of bases that is 19 to 25 bases long with a base sequence fully contained within the sequence of SEQ ID NO:88, and optionally a second upstream base sequence that is not complementary to the nucleic acid sequence of *Mycoplasma genitalium* that is to be detected. There also is the step of (b) amplifying any nucleic acids of *Mycoplasma genitalium* that may be present in the sample using the pair of amplification oligomers in an in vitro nucleic acid amplification reaction, so that an amplification product is produced if the sample includes nucleic acids of *Mycoplasma genitalium*. There also is the step of (c) detecting the amplification product, thereby determining that the sample includes nucleic acids of *Mycoplasma genitalium*. In some embodiments, step (c) involves detecting the amplification product with a labeled hybridization probe. In some embodiments, the labeled hybridization probe is an oligonucleotide of no more than 20 bases in length, where the base sequence of the oligonucleotide consists of SEQ ID NO:14 or the complement thereof, allowing for substitution of RNA and DNA equivalent bases, with a non-nucleotide linker positioned between bases 14 and 15 of SEQ ID NO:14, and a detectable label attached to the non-nucleotide linker. In some embodiments, the labeled hybridization probe includes at least one nucleoside analog that includes a modified sugar residue. For example, the at least one nucleoside analog can include a ribonucleoside having a 2'-O-methyl substitution to the ribofuranosyl moiety. In some embodiments, the first amplification oligomer includes the first upstream base sequence, the first upstream base sequence being a promoter sequence. In some embodiments, the target-hybridizing sequence of the first amplification oligomer is selected from the group consisting of SEQ ID NO:24, SEQ ID NO:25, SEQ ID NO:26, and SEQ ID NO:27. In some embodiments, the second amplification oligomer is up to 25 bases in length. For example, the second amplification oligomer can be selected from the group consisting of SEQ ID NO:47, SEQ ID NO:48, SEQ ID NO:46, SEQ ID NO:49, and SEQ ID NO: 50.

In a ninth aspect, the disclosure concerns a hybridization probe for detecting nucleic acids of *Mycoplasma genitalium*. Generally speaking, the base sequence of the hybridization probe is selected from the group consisting of SEQ ID NO:22 with a non-nucleotide linker between bases 13 and 14 allowing for substitution of RNA and DNA equivalent bases, or the complement thereof, SEQ ID NO:21 with a non-nucleotide linker between bases 13 and 14 allowing for substitution of RNA and DNA equivalent bases or the complement thereof, and SEQ ID NO:20 with a non-nucleotide linker between bases 13 and 14 allowing for substitution of RNA and DNA equivalent bases, or the complement thereof; where a detectable label is attached to the non-nucleotide linker between bases 13 and 14. In some embodiments, the base sequence of the hybridization probe is selected from the group consisting of SEQ ID NO:22 with the non-nucleotide linker between bases 13 and 14, SEQ ID NO:21 with the non-nucleotide linker between bases 13 and 14, and SEQ ID NO:20 with the non-nucleotide linker between bases 13 and 14. In some embodiments, the detectable label is a chemiluminescent label. For example, the chemiluminescent label can include an acridinium ester. In some embodiments, the hybridization probe further includes at least one nucleoside analog that includes a modified sugar residue. In some embodiments, the at least one nucleoside analog includes a ribonucleoside having a 2'-O-methyl substitution to the ribofuranosyl moiety. In some embodiments, the base sequence of the hybridization probe is SEQ ID NO:22 with the non-nucleotide linker between bases 13 and 14.

In a tenth aspect, the disclosure concerns a combination of oligonucleotides for amplifying and detecting a nucleic acid analyte of *Mycoplasma genitalium*. Generally speaking, the combination includes: a first amplification oligomer with a target-hybridizing sequence of bases that is 19 to 25 bases long and includes a base sequence fully contained within the sequence of SEQ ID NO:90, and optionally a first upstream base sequence that is not complementary to the nucleic acid analyte, where the first amplification oligomer is up to 60 bases in length; and a second amplification oligomer with a target-hybridizing sequence of bases that is 19 to 25 bases long and includes a base sequence fully contained within the sequence of SEQ ID NO:91, and optionally a second upstream base sequence that is not complementary to the nucleic acid analyte, where the second amplification oligomer is up to 60 bases in length. In some embodiments, the combination further includes a hybridization probe in accordance with the ninth aspect of the disclosure. In some embodiments, the first amplification oligomer includes the first upstream base sequence, the first upstream base sequence includes a promoter sequence, and the first amplification oligomer further includes a base sequence selected from the group consisting of SEQ ID NO: 28, SEQ ID NO:29, SEQ ID NO:30, and SEQ ID NO:32. In some embodiments, the second amplification oligomer includes SEQ ID NO:51, SEQ ID NO:52, and SEQ ID NO: 53. In some embodiments, the combination further includes at least one nucleoside analog that includes a modified sugar residue. In some embodiments, the at least one nucleoside analog includes a ribonucleoside having a 2'-O-methyl substitution to the ribofuranosyl moiety.

In an eleventh aspect, the disclosure concerns a method of determining whether a sample includes nucleic acids of *Mycoplasma genitalium*. Generally speaking, the method includes the step of: (a) contacting the sample with a pair of amplification oligomers, where a first amplification oligomer of the pair includes a target-hybridizing sequence of bases that is 19 to 25 bases long with a base sequence fully contained within the sequence of SEQ ID NO:90, and optionally a first upstream base sequence that is not complementary to a nucleic acid sequence of *Mycoplasma genitalium* that is to be amplified and detected, wherein the first amplification oligomer is up to 60 bases in length, and where a second amplification oligomer of the pair includes a target-hybridizing sequence of bases that is 19 to 25 bases long with a base sequence fully contained within the sequence of SEQ ID NO: 91, and optionally a second upstream base sequence that is not complementary to the nucleic acid sequence of *Mycoplasma genitalium* that is to be amplified and detected, where the second amplification oligomer is up to 60 bases in length. There also is the step of (b) amplifying any nucleic acids of *Mycoplasma genitalium* that may be present in the sample using the pair of amplification oligomers in an in vitro nucleic acid amplification reaction, so that an amplification product is produced if the sample includes nucleic acids of *Mycoplasma genitalium*. There also is the step of (c) detecting the amplification product, thereby determining that the sample includes nucleic acids of *Mycoplasma genitalium*. In some embodiments, step (c) involves detecting the amplification product with a labeled hybridization probe. In some embodiments, the labeled hybridization probe is an oligonucleotide with a base sequence selected from the group consisting of SEQ ID NO: 22 with a non-nucleotide linker between bases 13 and 14 allowing for substitution of RNA and DNA equivalent bases, or the complement thereof, SEQ ID NO:21 with a non-nucleotide linker between bases 13 and 14 allowing for substitution of RNA and DNA equivalent bases or the complement thereof, and SEQ ID NO:20 with a non-nucleotide linker between bases 13 and 14 allowing for substitution of RNA and DNA equivalent bases, or the complement thereof, and where a detectable label is attached to the non-nucleotide linker between bases 13 and 14. In some embodiments, the labeled hybridization probe further includes at least one nucleoside analog having a modified sugar residue. In some embodiments, the at least one nucleoside analog includes a ribonucleoside having a 2'-O-methyl substitution to the ribofuranosyl moiety. In some embodiments, the first amplification oligomer includes the first upstream base sequence, the first upstream base sequence being a promoter sequence. In some embodiments, the target-hybridizing sequence of the first amplification oligomer is selected from the group consisting of SEQ ID NO: 28, SEQ ID NO:29, SEQ ID NO:30, and SEQ ID NO:32. In some embodiments, the second amplification oligomer includes SEQ ID NO:51, SEQ ID NO:52, and SEQ ID NO: 53.

Introduction and Overview

The present disclosure provides a solution to the clinical need for a sensitive assay specific for *M. genitalium*. Featured are oligonucleotides which are useful for determining whether *M. genitalium* is present in a test sample obtained from, for example, a swab taken from an individual being tested for this sexually transmitted bacterium. For example, specimens for determining the presence of *M. genitalium* may be obtained from the genital tract, as well as experimental solutions, cultures and other sample media.

The present disclosure also provides a solution to the clinical need for an assay specific for *M. genitalium* by featuring oligonucleotides which are useful for determining whether *M. genitalium* is present in a test sample obtained from, for example, the urethra, the anal canal, the respiratory tract, or the lower genital tract of a human. The featured oligonucleotides may be contained in hybridization assay probes, capture probes and/or amplification primers for detecting, immobilizing and/or amplifying target nucleic acid sequences derived from *M. genitalium* in a test sample. Particularly disclosed are two different target regions for detecting *M. genitalium* in the 23S rRNA or the complement thereof, and one target region for detecting *M. genitalium* in the 16S rRNA or the complement thereof.

Notably, while the disclosed oligonucleotide probes, primers, and capture oligonucleotides are particularly preferred for detecting or determining the presence of *M. genitalium* in a test sample, the same oligonucleotides can also be used in combination for detecting or determining the presence of *M. pneumoniae* in a test sample. For example, a first result in a probe hybridization assay that indicates the presence of either *M. genitalium* or *M. pneumoniae* can be coupled with a result obtained using a probe hybridization assay that detects nucleic acids of *M. genitalium* and not *M. pneumoniae* to make the determination. More specifically, results indicating the presence of either *M. genitalium* or *M. pneumoniae* (i.e., without distinguishing one from the other), together with a negative result for the presence of *M. genitalium* would indicate the presence of *M. pneumoniae*.

In one embodiment of the present disclosure, hybridization assay probes are provided which hybridize to a 16S rRNA target region present in nucleic acid derived from *M. genitalium*, or the complement thereof, to form detectable probe: target hybrids that indicate the presence of *M. genitalium* in a test a sample. The probes of this embodiment comprise an oligonucleotide having a target binding region, where the base sequence of the target binding region is contained of within the base sequence ATACCCTAGTAGTCCACACCGTAAACGATAGA-TACTAGCTGTCGGAGCGATCC CTTCGGTAGT-GAAGTTAACACATTAAGTATCTCGCCTGGGTAGTA-CATT (SEQ ID NO: 81) or the complement thereof. The sequence of SEQ ID NO:81 is sometimes referred to herein as ATarget Region 1."

In another embodiment of the present disclosure, hybridization assay probes are provided which hybridize to a first 23S rRNA target region present in nucleic acid derived from *M. genitalium*, or the complement thereof, to form detectable probe: target hybrids that indicate the presence of *M. genitalium* in a test a sample. The probes of this embodiment comprise an oligonucleotide having a target binding region, where the base sequence of the target binding region is contained within the base sequence of GATCAAAACAC-CACCATGTAGAGAATAGGTAGGAGCAATT-GATGCAAGTTCG CAAGGATTTGTTGATGT-GAAATGTGGAATACTACCCTTGGTTATGTTTTGTTCT AATTGGTAACTGTGATCCAGTTTCAAGACAGTGT-TAGGTGGGCAGTTTGACTG GGGCGGTCGCCTCCTAAAAGGTAACG-GAGGCGCACAAAGGTACCTTCAGTAC GG (SEQ ID NO:82) or the complement thereof. The sequence of SEQ ID NO:82 is sometimes referred to herein as ATarget Region 2."

In yet another embodiment of the present disclosure, hybridization assay probes are provided which hybridize to a second 23S rRNA target region present in nucleic acid derived from *M. genitalium*, or the complement thereof, to form detectable probe: target hybrids that indicate the presence of *M. genitalium* in a test a sample. The probes of this embodiment comprise an oligonucleotide having a target binding region, where the base sequence of the target binding region is contained within the base sequence of AAGAAAACGAATGTGAT-TCCGTGTGTAGTGGCGAGCGAAAGCG-GAACAGGCC AAACCTATCTGAGGA- TAGGGGTTGTAGGGCTTGCATTATGGAAGTTAA-AAGAT AGAAGAAGCTGTTGGAAAGCAGCGC-CAAAGAGGGTGATAGCCCCGT (SEQ ID NO: 83) or the complement thereof. The sequence of SEQ ID NO:83 is sometimes referred to herein as ATarget Region 3."

Probes can be used to preferentially detect the target nucleic acid over nucleic acid derived from non-*M. genitalium* organisms, especially over nucleic acid derived from *M. pneumoniae*, for example under stringent hybridization assay conditions.

Target binding regions of preferred probes may consist of DNA, RNA, a combination DNA and RNA, or may be a nucleic acid analog (e.g., a peptide nucleic acid) or contain one or more modified nucleosides (e.g., a ribonucleoside having a 2'-O-methyl substitution to the ribofuranosyl moiety). Probes of the present disclosure are preferably oligonucleotides of at least 17 bases, and up to 18, 19, 20, 21, 22, 23, 24, 25, 30, 35, 50 or even 100 bases in length. Most preferably, the hybridization assay probes of the present disclosure are nucleic acids or nucleic acid analogs consisting of the recited sequence and optionally include a detectable label or reporter group.

Hybridization assay probes of the present disclosure may include one or more base sequences in addition to the base sequence of the target binding region region which do not stably bind to nucleic acid derived from the target organism (i.e., *M. genitalium*) under stringent conditions. An additional base sequence may include any desired base sequence, as long as it does not stably bind to nucleic acid derived from the target organism under stringent conditions or prevent stable hybridization of the probe to the target nucleic acid. By way of example, an additional base sequence may constitute the immobilized probe binding region of a capture probe, where the immobilized probe binding region is comprised of, for example, a 3' poly dA (adenine) region which hybridizes under stringent conditions to a 5' poly dT (thymine) region of a polynucleotide bound directly or indirectly to a solid support. An additional base sequence might also be a 5' sequence recognized by an RNA polymerase or which enhances initiation or elongation by an RNA polymerase (e.g., a T7 promoter). More than one additional base sequence may be included if the first sequence is incorporated into, for example, a Amolecular beacon @ probe. Molecular beacons are disclosed by Tyagi et al., ADetectably Labeled Dual Conformation Oligonucleotide Probes, Assays and Kits,@ U.S. Pat. No. 5,925,517, and include a target binding region which is bounded by two base sequences having regions which are at least partially complementary to each other. An additional base sequence may be joined directly to the target binding region or, for example, by means of a non-nucleotide linker.

While not required, the probes can include a detectable label or group of interacting labels. The label may be any suitable labeling substance, including but not limited to a radioisotope, an enzyme, an enzyme cofactor, an enzyme substrate, a dye, a hapten, a chemiluminescent molecule, a fluorescent molecule, a phosphorescent molecule, an electrochemiluminescent molecule, a chromophore, a base sequence region that is unable to stably bind to the target nucleic acid under the stated conditions, and mixtures of these. Groups of interacting labels include, but are not limited to, enzyme/substrate, enzyme/cofactor, fluorophore/quencher, luminescent/adduct, dye dimers and Förrester energy transfer pairs.

In certain embodiments, probes harbor homogeneous detectable labels, such as chemiluminescent labels that can be detected in a homogeneous assay format. Examples of preferred labels include acridinium ester labels, such as those described herein.

In another embodiment, the disclosure contemplates probe mixes that are useful for determining whether *M. genitalium* organisms are present in a test sample. For instance, to determine the presence of these organisms, the probe mix may comprise one or more of the above-described *M. genitalium* probes.

The disclosure also contemplates compositions comprising stable nucleic acid duplexes formed between the above-described hybridization assay probes and the target nucleic acids for the probes under stringent hybridization assay conditions.

In a further embodiment, the present disclosure provides capture probes comprising at least one oligonucleotide containing an immobilized probe binding region and a target binding region. The immobilized probe binding region of the capture probes may be comprised of any base sequence capable of stably hybridizing under stringent conditions to oligonucleotides bound to a solid support present in a test sample. Preferably, the immobilized probe binding region is a poly (dA), homopolymer tail located at the 3' end of the capture probe. In this embodiment, oligonucleotides bound to the solid support would include 5' poly (dT) tails of sufficient length to stably bind to the poly (dA) tails of the capture probes under assay conditions. In a preferred embodiment, the immobilized probe binding region includes a poly (dA) tail which is about 30 adenines in length, and the capture probe includes a spacer region which is about 3 thymines in length for joining target binding region and the immobilized probe binding region to each other.

The disclosure also features amplification primers useful for detecting the presence of *Mycoplasma* organisms in an amplification assay. In one preferred embodiment, each amplification primer includes an oligonucleotide, where the base sequence of the target binding region of the primer has or substantially corresponds to a base sequence contained within: SEQ ID NO:81 or the complement thereof (i.e., Target Region 1), SEQ ID NO:82 or the complement thereof (i.e., Target Region 2), and SEQ ID NO: 83 or the complement thereof (i.e., Target Region 3). Amplification primers of the present disclosure optionally include a 5' promoter sequence which is recognized by an RNA polymerase or which enhances initiation or elongation by an RNA polymerase. If included, a T7 promoter, such as AATT-TAATACGACTCACTATAGGGAGA (SEQ ID NO:80) is preferred.

Amplification primers of the present disclosure are preferably employed in sets of at least two amplification primers. Preferred sets include a first amplification primer comprising an oligonucleotide having a target binding region, where the base sequence of the target binding region contains an at least 19 contiguous base region which is at least about 80% complementary (more preferably at least about 90% complementary and most preferably 100% complementary) to an at least 19 contiguous base region present in a target sequence selected from the group consisting of SEQ ID NO:81, SEQ ID NO:82, and SEQ ID NO: 83. Optionally, the first amplification primer includes a promoter sequence attached at its 5' end. The second amplification primer of these preferred sets comprises an oligonucleotide having a target binding region, where the base sequence of the target binding region contains an at least 19 contiguous base region which is at least about 80% complementary (more preferably at least about 90% complementary and most preferably 100% complementary) to an at least 19 contiguous base region present in a target sequence selected from the group consisting of SEQ ID NO:81, SEQ ID NO:82, and SEQ ID NO:83.

The disclosure additionally contemplates compositions comprising stable nucleic acid duplexes formed between the above-described amplification primers and the target nucleic acids for the primers under amplification conditions.

The disclosure further features methods for determining whether *M. genitalium* is present in a test sample. In one embodiment, the disclosure provides a method for determining whether nucleic acid derived from *M. genitalium* is present in a test sample, where the method comprises the steps of: (a) contacting the test sample with one of the above-described hybridization assay probes for detecting *M. genitalium* under conditions permitting the probe to preferentially hybridize to a target nucleic acid derived from *M. genitalium*, thereby forming a probe: target hybrid stable for detection; and (b) determining whether the hybrid is present in the test sample as an indication of the presence or absence of *M. genitalium* in the test sample. This method may further include the step of quantifying the amount of hybrid present in the test sample as a means for estimating the amount of *M. genitalium* present in the test sample. Preferably, the probe includes a detectable label, where the label produces a detectable signal indicating the probe is hybridized to nucleic acids derived from *M. genitalium* rather than another species. For example, the signal can be at least two times, at least five times, at least ten times, or at least five hundred times stronger when the probe is hybridized to nucleic acids derived from *M. genitalium* compared to when the probe is hybridized to nucleic acids derived from *M. pneumoniae*.

The disclosure also contemplates methods for amplifying a target nucleic acid sequence present in nucleic acid derived from *Mycoplasma* organisms present in a test sample, where the method comprises the steps of: (a) contacting the test sample with at least one of the above-described amplification primers under amplification conditions; and (b) amplifying the target nucleic acid sequence. Preferred amplification methods will include a set of at least two of the above-described amplification primers.

In one embodiment, the method for amplifying a target nucleic acid sequence present in nucleic acid derived from *Mycoplasma* organisms will further include the steps of: (a) contacting the test sample with a hybridization assay probe which preferentially hybridizes to the target nucleic acid sequence, or a complement thereof, under stringent hybridization conditions, thereby forming a probe: target hybrid stable for detection; and (b) determining whether the hybrid is present in the test sample as an indication of the presence or absence of *M. genitalium* in the test sample. The above-described hybridization assay probes are especially preferred for this method.

The disclosure also contemplates kits for determining whether *M. genitalium* is present in a test sample. These kits include at least one of the above-described hybridization assay probes specific for nucleic acid derived from *M. genitalium* and optionally include written instructions for determining the presence or amount of *M. genitalium* in a test sample. In another embodiment, the kits include, in addition to the hybridization assay probes, at least one of the above-described amplification primers appropriate for amplifying a target nucleic acid sequence present in nucleic acid derived from *Mycoplasma* organisms. In still another embodiment, the kits further include, in addition to the hybridization assay probes, at least one of the above-described capture probes. In yet another embodiment, the kits further include, in addition to the hybridization assay probes, at least one of the above-described capture probes and at least one of the above-described amplification primers. Kits including a capture probe may further include a solid support material (e.g., magnetically attractable particles) for immobilizing the capture probe, either directly or indirectly, in a test sample.

The disclosure also contemplates kits for amplifying a target nucleic acid sequence present in nucleic acid derived from *Mycoplasma* organisms, where the kits include at least one of the above-described amplification primers and at least two hybridization probes for detecting nucleic acids of *Mycoplasma* organisms. In a further embodiment, these kits may include, in addition to the amplification primers and hybridization probes, at least one of the above-described capture probes. Such kits may further include a solid support material for immobilizing the capture probe in a test sample.

Those skilled in the art will appreciate that the hybridization assay probes of the present disclosure may be used as amplification primers or capture probes; that the target binding regions of the amplification primers of the present disclosure may be used as hybridization assay probes or capture probes, depending upon the degree of specificity required by a particular assay; and that the target binding regions of the capture probes of the present disclosure may be used as hybridization assay probes or amplification primers, depending upon the degree of specificity required by a particular assay. Thus, the present disclosure contemplates oligonucleotides for use in determining the presence or absence of *M. genitalium* in a test sample comprising, consisting essentially of or consisting of any of the above-described nucleotide base sequences and analogs thereof.

Unless indicated otherwise, the phrases Acomprising@ may be substituted with the phrase Aconsisting essentially of@ or Aconsisting of@ in the following disclosure, thereby indicating varying degrees of scope contemplated by the present disclosure. Each claim, however, is intended to be limited by the particular transitional phrase recited.

Other features and advantages of the disclosure will be apparent from the following description of the preferred embodiments thereof and from the claims.

DETAILED DESCRIPTION

Disclosed herein are oligonucleotides targeted to nucleic acid derived from *Mycoplasma* organisms, where the oligonucleotides are useful for determining the presence or absence of *M. genitalium* in a test sample. The oligonucleotides can aid in detecting *M. genitalium* in different ways, such as by functioning as hybridization assay probes, capture probes and/or amplification primers. Hybridization assay probes of the present disclosure can preferentially hybridize to a target nucleic acid sequence present in nucleic acid derived from *M. genitalium* under stringent hybridization assay conditions to form detectable duplexes which indicate the presence of *M. genitalium* in a test sample. Some of the probes are believed to be capable of distinguishing between the target organism and its known closest phylogenetic neighbors. Capture probes of the present disclosure can hybridize to a target nucleic acid sequence present in nucleic acid derived from *Mycoplasma* organisms under stringent hybridization assay conditions and can be used to separate target nucleic acid from clinical specimens. Amplification primers of the present disclosure can hybridize to a target nucleic acid sequence present in nucleic acid derived from *Mycoplasma* organisms under amplification conditions, and can be used as primers in an amplification reaction to generate *Mycoplasma*-derived nucleic acid. The probes and amplification primers may be used in assays for the detection and/or quantitation of *M. genitalium* in a test sample.

Definitions

The following terms have the indicated meanings in the specification unless expressly indicated to have a different meaning.

The terms "a," "an," and "the" include plural referents, unless the context clearly indicates otherwise. For example, "a nucleic acid" as used herein is understood to represent one or more nucleic acids. As such, the terms "a" (or "an"), "one or more," and "at least one" can be used interchangeably herein.

By Asample@ or Atest sample@ is meant any substance suspected of containing a target organism or nucleic acid derived from the target organism. The substance may be, for example, an unprocessed clinical specimen, such as a sputum or urethral specimen, a buffered medium containing the specimen, a medium containing the specimen and lytic agents for releasing nucleic acid belonging to the target organism, or a medium containing nucleic acid derived from the target organism which has been isolated and/or purified in a reaction receptacle or on a reaction material or device. In the claims, the terms Asample@ and Atest sample@ may refer to specimen in its raw form or to any stage of processing to release, isolate and purify nucleic acid derived from target organisms in the specimen.

By Atarget nucleic acid@ or Atarget@ is meant a nucleic acid containing a target nucleic acid sequence.

By Atarget nucleic acid sequence,@ Atarget nucleotide sequence,@ Atarget sequence@ or Atarget region@ is meant a specific deoxyribonucleotide or ribonucleotide sequence comprising all or part of the nucleotide sequence of a single-stranded nucleic acid molecule, and the deoxyribonucleotide or ribonucleotide sequence complementary thereto. The claims, however, may restrict a target sequence to the particular sense of the recited sequence with a proviso excluding complementary sequences thereof.

"Nucleic acid" and "polynucleotide" refer to a multimeric compound comprising nucleosides or nucleoside analogs which have nitrogenous heterocyclic bases or base analogs linked together to form a polynucleotide, including conventional RNA, DNA, mixed RNA-DNA, and polymers that are analogs thereof. A nucleic acid "backbone" may be made up of a variety of linkages, including one or more of sugar-phosphodiester linkages, peptide-nucleic acid bonds ("peptide nucleic acids" or PNA; PCT Publication No. WO 95/32305), phosphorothioate linkages, methylphosphonate linkages, or combinations thereof. Sugar moieties of a nucleic acid may be ribose, deoxyribose, or similar compounds with substitutions (e.g., 2' methoxy or 2' halide substitutions). Nitrogenous bases may be conventional bases (A, G, C, T, U), analogs thereof (e.g., inosine or others; see *The Biochemistry of the Nucleic Acids* 5-36, Adams et al., ed., 11th ed., 1992), derivatives of purines or pyrimidines (e.g., N4-methyl deoxyguanosine, deaza- or aza-purines, deaza- or aza-pyrimidines, pyrimidine bases with substituent groups at the 5 or 6 position, purine bases with a substituent at the 2, 6, or 8 positions, 2-amino-6-methylaminopurine, $O^6$-methylguanine, 4-thio-pyrimidines, 4-amino-pyrimidines, 4-dimethylhydrazine-pyrimidines, and $O^4$-alkyl-pyrimidines; U.S. Pat. No. 5,378,825 and PCT Publication No. WO 93/13121). Nucleic acids may include one or more "abasic" residues where the backbone includes no nitrogenous base for position(s) of the polymer (U.S. Pat. No. 5,585,481). A nucleic acid may comprise only conventional RNA or DNA sugars, bases and linkages, or may include both conventional components and substitutions (e.g., conventional bases with 2' methoxy backbones, or polymers containing both conventional bases and one or more base analogs). Nucleic acid includes "locked nucleic acid" (LNA), an analogue containing one or more LNA nucleotide monomers with a bicyclic furanose unit locked in an RNA mimicking sugar conformation, which enhance hybridization affinity toward complementary RNA and DNA sequences (Vester and Wengel, 2004, *Biochemistry* 43 (42): 13233-41). Embodiments of oligomers that may affect stability of a hybridization complex include PNA oligomers, oligomers that include 2'-methoxy or 2'-fluoro substituted RNA, or oligomers that affect the overall charge, charge density, or steric associations of a hybridization complex, including oligomers that contain charged linkages (e.g., phosphorothioates) or neutral groups (e.g., methylphosphonates). 5-methylcytosines may be used in conjunction with any of the foregoing backbones/sugars/linkages including RNA or DNA backbones (or mixtures thereof) unless otherwise indicated. It is understood that when referring to ranges for the length of an oligonucleotide, amplicon, or other nucleic acid, that the range is inclusive of all whole numbers (e.g., 19-25 contiguous nucleotides in length includes 19, 20, 21, 22, 23, 24, and 25).

A "nucleotide" as used herein is a subunit of a nucleic acid consisting of a phosphate group, a 5-carbon sugar, and a nitrogenous base (also referred to herein as "nucleobase"). The 5-carbon sugar found in RNA is ribose. In DNA, the 5-carbon sugar is 2'-deoxyribose. The term also includes analogs of such subunits, such as a methoxy group at the 2' position of the ribose (also referred to herein alternatively as "2'-O-methyl" or "2'-O-Me" or "2'-methoxy" or "2'-OMe").

"Oligomer," "oligonucleotide," or "oligo" refers to a nucleic acid of generally less than 1,000 nucleotides (nt), including those in a size range having a lower limit of about 2 to 5 nucleotides and an upper limit of about 500 to 900 nucleotides. Some particular embodiments are oligomers in a size range with a lower limit of about 18, 19, 20, 21, 22, 23, 24, or 25 nucleotides and an upper limit of about 50 to 60 nucleotides, and other particular embodiments are in a size range with a lower limit of about 10 to 20 nucleotides and an upper limit of about 22 to 100 nucleotides. Oligomers may be purified from naturally occurring sources, but may be synthesized by using any well-known enzymatic or chemical method. The term oligonucleotide does not denote any particular function of the reagent; rather, it is used generically to cover all such reagents described herein. An oligonucleotide may serve various different functions. For example, it may function as a primer if it is specific for and capable of hybridizing to a complementary strand and can further be extended in the presence of a nucleic acid polymerase; it may function as a primer and provide a promoter if it contains a sequence recognized by an RNA polymerase and allows for transcription (e.g., a T7 Primer); and it may function to detect a target nucleic acid if it is capable of hybridizing to the target nucleic acid, or an amplicon thereof, and further provides a detectible moiety (e.g., an acridinium-ester compound). Oligomers may be referred to by a functional name (e.g., capture probe, primer or promoter primer) but those skilled in the art will understand that such terms refer to oligomers.

Oligonucleotides of a defined sequence may be produced by techniques known to those of ordinary skill in the art, such as by chemical or biochemical synthesis, and by in vitro or in vivo expression from recombinant nucleic acid molecules (e.g., bacterial or retroviral vectors). As intended by this disclosure, an oligonucleotide may not consist of wild-type chromosomal DNA or the in vivo transcription products thereof. For example, oligonucleotide hybridization probes can include non-nucleotide linkers and/or detectable labels that are not found in naturally occurring nucleic acids.

"Detection probe oligomer," "detection probe," or "probe" refers to an oligomer that hybridizes specifically to a target sequence, including an amplified sequence, under conditions that promote nucleic acid hybridization, for detection of the target nucleic acid. Detection may either be direct (i.e., probe hybridized directly to the target) or indirect (i.e., a probe hybridized to an intermediate structure that links the probe to the target). Detection probes may be DNA, RNA, analogs thereof or combinations thereof (e.g., DNA/RNA chimerics), and they may be labeled or unlabeled. Detection probes may further include alternative backbone linkages (e.g., 2'-O-methyl linkages). A probe's target sequence generally refers to the specific sequence within a larger sequence which the probe hybridizes specifically. A detection probe may include target-specific sequence(s) and non-target-specific sequence(s). Such non-target-specific sequences can include sequences which will confer a desired secondary or tertiary structure, such as a hairpin structure, which can be used to facilitate detection and/or amplification (see, e.g., U.S. Pat. Nos. 5,118,801, 5,312,728, 6,835,542, and 6,849,412). Probes of a defined sequence may be produced by techniques known to those of ordinary skill in the art, such as by chemical synthesis, and by in vitro or in vivo expression from recombinant nucleic acid molecules.

"Label" or "detectable label" refers to a moiety or compound joined directly or indirectly to a probe that is detected or leads to a detectable signal. Direct joining may use covalent bonds or non-covalent interactions (e.g., hydrogen bonding, hydrophobic or ionic interactions, and chelate or coordination complex formation) whereas indirect joining may use a bridging moiety or linker (e.g., via an antibody or additional oligonucleotide(s)). Any detectable moiety may be used, including a radionuclide, a ligand such as biotin or avidin or even a polynucleotide sequence, an enzyme, an enzyme substrate, a reactive group, a chromophore such as a dye or particle (e.g., a latex or metal bead) that imparts a detectable color, a luminescent compound (e.g., bioluminescent, phosphorescent, or a chemiluminescent compound), and a fluorescent compound or moiety (i.e., fluorophore). Embodiments of fluorophores include those that absorb light in the range of about 495 to 650 nm and emit light in the range of about 520 to 670 nm, which include those known as FAM™, TET™, CAL FLUOR™ (Orange or Red), and QUASAR™ compounds. Fluorophores may be used in combination with a quencher molecule that absorbs light when in close proximity to the fluorophore to diminish background fluorescence. Such quenchers are well known in the art and include, for example, BLACK HOLE QUENCHER™ (or BHQ™) or TAMRA™ compounds. Particular embodiments include a "homogeneous detectable label" that is detectable in a homogeneous system in which bound labeled probe in a mixture exhibits a detectable change compared to unbound labeled probe, which allows the label to be detected without physically removing hybridized from unhybridized labeled probe (e.g., U.S. Pat. Nos. 5,283,174, 5,656,207, and 5,658,737). Particular homogeneous detectable labels include chemiluminescent compounds, including acridinium ester ("AE") compounds, such as standard AE or AE derivatives which are well known (U.S. Pat. Nos. 5,656,207, 5,658,737, and 5,639,604). Methods of synthesizing labels, attaching labels to nucleic acid, and detecting signals from labels are well known (e.g., Sambrook et al., Molecular Cloning, A Laboratory Manual, 2nd ed. (Cold Spring Harbor Laboratory Press, Cold Spring Harbor, NY, 1989) at Chapt. 10, and U.S. Pat. Nos. 5,658,737, 5,656,207, 5,547,842, 5,283,174, and 4,581,333, and EP Pat. App. 0 747 706). Particular methods of linking an AE compound to a nucleic acid are known (e.g., U.S. Pat. Nos. 5,585,481 and 5,639,604, see column 10, line 6 to column 11, line 3, and Example 8). Particular AE labeling positions are a probe's central region and near a region of A/T base pairs, at a probe's 3' or 5' terminus, or at or near a mismatch site with a known sequence that is the probe should not detect compared to the desired target sequence. Other detectably labeled probes include TaqMan™ probes, molecular torches, and molecular beacons. TaqMan™ probes include a donor and acceptor label wherein fluorescence is detected upon enzymatically degrading the probe during amplification in order to release the fluorophore from the presence of the quencher. Molecular torches and beacons exist in open and closed configurations wherein the closed configuration quenches the fluorophore and the open position separates the fluorophore from the quencher to allow fluorescence. Hybridization to a target nucleic acid opens the otherwise closed probes.

By Astably,@ Astable@ or Astable for detection@ is meant that the temperature of a reaction mixture is at least 2° C. below the melting temperature of a nucleic acid duplex. The temperature of the reaction mixture is more preferably at least 5° C. below the melting temperature of the nucleic acid duplex, and even more preferably at least 10° C. below the melting temperature of the reaction mixture.

By Asubstantially homologous,@ Asubstantially corresponding@ or Asubstantially corresponds@ is meant that the subject oligonucleotide has a base sequence containing an at least 10 contiguous base region that is at least about 80% homologous, preferably at least about 90% homologous, and most preferably 100% homologous to an at least 10 contiguous base region present in a reference base sequence (excluding RNA and DNA equivalents). (Those skilled in the art will readily appreciate modifications that could be made to the hybridization assay conditions at various percentages of homology to permit hybridization of the oligonucleotide to the target sequence while preventing levels of non-specific hybridization sufficient to interfere with detection of the target nucleic acid.) The degree of similarity is determined by comparing the order of nucleobases making up the two sequences and does not take into consideration other structural differences which may exist between the two sequences, provided the structural differences do not prevent hydrogen bonding with complementary bases. The degree of homology between two sequences can also be expressed in terms of the number of base differences between each set of at least 10 contiguous bases being compared, which may be 0, 1 or 2 base differences.

By Asubstantially complementary@ is meant that the subject oligonucleotide has a base sequence containing an at least 10 contiguous base region that is at least 80% complementary, preferably at least 90% complementary, and most preferably 100% complementary to an at least 10 contiguous base region present in a target nucleic acid sequence (excluding RNA and DNA equivalents). Those skilled in the art will readily appreciate modifications that could be made to the hybridization assay conditions at various percentages of complementarity to permit hybridization of the oligonucleotide to the target sequence while preventing levels of non-specific hybridization sufficient to interfere with detection of the target nucleic acid. The degree of complementarity is determined by comparing the order of nucleobases making up the two sequences and does not take into consideration other structural differences which may exist between the two sequences, provided the structural differences do not prevent hydrogen bonding with complementary bases. The degree of complementarity between two sequences can also be expressed in terms of the number of base mismatches present in each set of at least 10 contiguous bases being compared, which may be 0, 1 or 2 base mismatches.

It will be appreciated that there is an implied "about" prior to the temperatures, concentrations, and times discussed in the present disclosure, such that slight and insubstantial deviations are within the scope of the present teachings. In general, the term "about" indicates insubstantial variation in a quantity of a component of a composition not having any significant effect on the activity or stability of the composition. All ranges are to be interpreted as encompassing the endpoints in the absence of express exclusions such as "not including the endpoints"; thus, for example, "within 10-15" includes the values 10 and 15. Also, the use of "comprise," "comprises," "comprising," "contain," "contains," "containing," "include," "includes," and "including" are not intended to be limiting. It is to be understood that both the foregoing general description and detailed description are exemplary and explanatory only and are not restrictive of the teachings. To the extent that any material incorporated by reference is inconsistent with the express content of this disclosure, the express content controls.

By "RNA and DNA equivalents" is meant RNA and DNA molecules having essentially the same complementary base pair hybridization properties. RNA and DNA equivalents have different sugar moieties (i.e., ribose versus deoxyribose) and may differ by the presence of uracil in RNA and thymine in DNA. The differences between RNA and DNA equivalents do not contribute to differences in homology because the equivalents have the same degree of complementarity to a particular sequence.

By "RNA and DNA equivalent bases" is meant nucleotide bases having the same complementary base pair hybridization properties in RNA and DNA. Here the base uracil can be substituted in place of the base thymine, or vice versa, and so uracil and thymine are RNA and DNA equivalent bases. A polynucleotide base sequence 5'-AGCT-3' that allows for substitution of RNA and DNA equivalent bases would also describe the sequence 5'-AGCU-3'. The differences between RNA and DNA equivalent bases do not contribute to differences in homology because the equivalents have the same degree of complementarity to a particular sequence.

The term, "complement" refers to a nucleic acid molecule that comprises a contiguous nucleic acid sequence that is complementary to a contiguous nucleic acid sequence of another nucleic acid molecule (for standard nucleotides A: T, A: U, C: G). For example, 5'-AACTGUC-3' is the complement of 5'-GACAGTT-3'.

A "target nucleic acid" as used herein is a nucleic acid comprising a target sequence to be amplified. Target nucleic acids may be DNA or RNA, and may be either single-stranded or double-stranded. The target nucleic acid may include other sequences besides the target sequence, which may not be amplified.

The term "target sequence" as used herein refers to the particular nucleotide sequence of the target nucleic acid that is to be amplified and/or detected. The "target sequence" includes the complexing sequences to which oligonucleotides (e.g., priming oligonucleotides and/or promoter oligonucleotides) complex during an amplification processes (e.g., PCR, TMA). Where the target nucleic acid is originally single-stranded, the term "target sequence" will also refer to the sequence complementary to the "target sequence" as present in the target nucleic acid. Where the target nucleic acid is originally double-stranded, the term "target sequence" refers to both the sense (+) and antisense (−) strands.

"Target-hybridizing sequence of bases" or "Target-hybridizing sequence" or "target-specific sequence" is used herein to refer to the portion of an oligomer that is configured to hybridize with a target nucleic acid sequence. Preferably, the target-hybridizing sequences are configured to specifically hybridize with a target nucleic acid sequence. Target-hybridizing sequences may be 100% complementary to the portion of the target sequence to which they are configured to hybridize, but not necessarily. Target-hybridizing sequences may also include inserted, deleted and/or substituted nucleotide residues relative to a target sequence. Less than 100% complementarity of a target-hybridizing sequence to a target sequence may arise, for example, when the target nucleic acid is a plurality strains within a species, such as would be the case for an oligomer configured to hybridize to sequence variants. It is understood that other reasons exist for configuring a target-hybridizing sequence to have less than 100% complementarity to a target nucleic acid.

By "hybridization" or "hybridize" is meant the ability of two completely or partially complementary nucleic acid strands to come together under specified hybridization assay conditions in a parallel or antiparallel orientation to form a stable structure having a double-stranded region. The two constituent strands of this double-stranded structure, sometimes called a hybrid, are held together by hydrogen bonds. Although these hydrogen bonds most commonly form between nucleotides containing the bases adenine and thymine or uracil (A and T or U) or cytosine and guanine (C and G) on single nucleic acid strands, base pairing can also form between bases which are not members of these "canonical" pairs. Non-canonical base pairing is well-known in the art. See, e.g., R. L. P. Adams et al., *The Biochemistry of the Nucleic Acids* (11th ed. 1992).

By "preferentially hybridize" is meant that under stringent hybridization assay conditions, hybridization assay probes can hybridize to their target nucleic acids to form stable probe: target hybrids indicating the presence of at least one organism of interest (Adetectable hybrids@), and there is not formed a sufficient number of detectable stable probe: non-target hybrids to indicate the presence of non-targeted organisms (Anon-detectable hybrids@), especially phylogenetically closely related organisms. Thus, the probe hybridizes to target nucleic acid to a sufficiently greater extent than to non-target nucleic acid to enable one having ordinary skill in the art to accurately detect the presence (or absence) of nucleic acid derived from *M. genitalium*, and distinguish its presence from that of a phylogenetically closely related organism in a test sample. In general, reducing the degree of complementarity between an oligonucleotide sequence and its target sequence will decrease the degree or rate of hybridization of the oligonucleotide to its target region. However, the inclusion of one or more non-complementary bases may facilitate the ability of an oligonucleotide to discriminate against non-target organisms.

Preferential hybridization can be measured using any of a variety of techniques known in the art, including, but not limited to those based on light emission, mass changes, and changes in conductivity or turbidity. A number of detection means are described herein, and one in particular is used in the Examples provided below. Preferably, there is at least a 10-fold difference between target and non-target hybridization signals in a test sample, more preferably at least a 100-fold difference, and most preferably at least a 500-fold difference. Preferably, non-target hybridization signals in a test sample are no more than the background signal level.

By "stringent hybridization assay conditions,@ Ahybridization assay conditions,@ Astringent hybridization conditions,@ or Astringent conditions@ is meant conditions permitting a hybridization assay probe to preferentially hybridize to a target nucleic acid (preferably rRNA or rDNA derived from *M. genitalium* over nucleic acid derived from a closely related non-target microorganism. Stringent hybridization assay conditions may vary depending upon factors including the GC content and length of the probe, the degree of similarity between the probe sequence and sequences of non-target sequences which may be present in the test sample, and the target sequence. Hybridization conditions include the temperature and the composition of the hybridization reagents or solutions. While the Examples section infra provides preferred hybridization assay conditions for detecting target nucleic acids derived from *M. genitalium* using the probes of the present disclosure, other stringent conditions could be easily ascertained by someone having ordinary skill in the art.

By Aassay conditions@ is meant conditions permitting stable hybridization of an oligonucleotide to a target nucleic acid. Assay conditions do not require preferential hybridization of the oligonucleotide to the target nucleic acid.

A Ahomogeneous detectable label@ refers to a label that can be detected in a homogeneous fashion by determining whether the label is on a probe hybridized to a target sequence. That is, homogeneous detectable labels can be detected without physically removing hybridized from unhybridized forms of the label or labeled probe. Homogeneous detectable labels are preferred when using labeled probes for detecting amplified nucleic acids. Examples of homogeneous labels have been described in detail by Arnold et al., U.S. Pat. No. 5,283,174; Woodhead et al., U.S. Pat. No. 5,656,207; and Nelson et al., U.S. Pat. No. 5,658,737. Preferred labels for use in homogenous assays include chemiluminescent compounds (e.g., see Woodhead et al., U.S. Pat. No. 5,656,207; Nelson et al., U.S. Pat. No. 5,658,737; and Arnold, Jr., et al., U.S. Pat. No. 5,639,604). Preferred chemiluminescent labels are acridinium ester (AAE@) compounds, such as standard AE or derivatives thereof (e.g., naphthyl-AE, ortho-AE, 1- or 3-methyl-AE, 2,7-dimethyl-AE, 4,5-dimethyl-AE, ortho-dibromo-AE, ortho-dimethyl-AE, meta-dimethyl-AE, ortho-methoxy-AE, ortho-methoxy (cinnamyl)-AE, ortho-methyl-AE, ortho-fluoro-AE, 1- or 3-methyl-ortho-fluoro-AE, 1- or 3-methyl-meta-difluoro-AE, and 2-methyl-AE).

A Ahomogeneous assay@ refers to a detection procedure that does not require physical separation of hybridized probe from non-hybridized probe prior to determining the extent of specific probe hybridization. Exemplary homogeneous assays, such as those described herein, can employ molecular beacons or other self-reporting probes which emit fluorescent signals when hybridized to an appropriate target, chemiluminescent acridinium ester labels which can be selectively destroyed by chemical means unless present in a hybrid duplex, and other homogeneously detectable labels that will be familiar to those having an ordinary level of skill in the art.

By Adifferential hydrolysis@ is meant the different rates at which the ester bond of an acridinium ester (AE) molecule is hydrolyzed in the presence of an alkaline selection reagent, which will depend upon whether the AE molecule is associated with a probe free in solution or a probe bound to a target nucleic acid. Generally, AE molecules associated with probe bound to target nucleic acid will hydrolyze more slowing than AE molecules associated with probe free in solution in the presence of a selection reagent.

By Adifferential hydrolysis ratio@ is meant the ratio of the rate of hydrolysis of the ester bond of an AE molecule associated with probe bound to a target nucleic acid to the rate of hydrolysis of the ester bond of an AE molecule associated with an identical probe free in solution in the presence of an alkaline selection reagent. The greater the differential hydrolysis ratio of the AE-labeled probe, the greater the sensitivity and discriminatory capacity of the AE-labeled probe for the target nucleic acid.

By Aconsisting essentially of@ is meant that additional component(s), composition(s) or method step(s) that do not materially change the basic and novel characteristics of the present invention may be included in the compositions or kits or methods of the present invention. Any component(s), composition(s), or method step(s) that have a material effect on the basic and novel characteristics of the present invention would fall outside of this term. For example, additions or deletions to an oligonucleotide can be non-material variations which do not prevent the oligonucleotide from having its claimed property (i.e., preferentially hybridizing under stringent hybridization assay conditions to the target nucleic acid over non-target nucleic acids). The oligonucleotide may include other nucleic acid molecules which do not participate in hybridization of the probe to the target nucleic acid and which do not affect such hybridization.

By Anucleic acid duplex,@ Aduplex,@ Anucleic acid hybrid@ or Ahybrid@ is meant a stable nucleic acid structure comprising a double-stranded, hydrogen-bonded region. Such hybrids include RNA: RNA, RNA: DNA and DNA: DNA duplex molecules and analogs thereof. The structure is sufficiently stable to be detectable by any known means.

An "amplification oligonucleotide" or "amplification oligomer" is an oligonucleotide that hybridizes to a target nucleic acid, or its complement, and participates in a nucleic acid amplification reaction (e.g., serving as a primer or promoter-primer). Particular amplification oligomers contain at least about 10 contiguous bases, and optionally at least 18, 19, 20, 21, 22, or 23 contiguous bases that are complementary to a region of the target nucleic acid sequence or its complementary strand. The contiguous bases may be at least about 80%, at least about 90%, or completely complementary to the target sequence to which the amplification oligomer binds. One skilled in the art will understand that the recited ranges include all whole and rational numbers within the range (e.g., 92% or 98.377%). Particular amplification oligomers are about 10 to about 60 bases long, or more preferably about 18 to about 26 bases long and optionally may include modified nucleotides.

A "primer" is an oligomer that hybridizes to a template nucleic acid and has a 3' end that is extended by a polymerase enzyme. A primer may be optionally modified, e.g., by including a 5' region that is non-complementary to the target sequence. Such modification can include functional additions, such as tags, promoters, or other non-target-specific sequences used or useful for manipulating or amplifying the primer or target oligonucleotide.

Within the context of transcription-mediated amplification, a primer modified with a 5' promoter sequence is referred to herein as a "promoter-primer." A person of ordinary skill in the art of molecular biology or biochemistry will understand that an oligomer that can function as a primer can be modified to include a 5' promoter sequence and then function as a promoter-primer, and, similarly, any promoter-primer can serve as a primer with or without its 5' promoter sequence. A promoter-primer modified to incorporate a 3' blocked end is referred to herein as a "promoter provider," which is capable of hybridizing to a target nucleic acid and providing an upstream promoter sequence that serves to initiate transcription, but does not provide a primer for oligo extension.

"Nucleic acid amplification" or "target amplification" or simply "amplification" refers to any in vitro procedure that produces multiple copies of a target nucleic acid sequence, or its complementary sequence, or fragments thereof (i.e., an amplified sequence containing less than the complete target nucleic acid). Examples of nucleic acid amplification procedures include transcription associated methods, such as transcription-mediated amplification (TMA), nucleic acid sequence-based amplification (NASBA) and others (e.g., U.S. Pat. Nos. 5,399,491, 5,554,516, 5,437,990, 5,130,238, 4,868,105, and 5,124,246), replicase-mediated amplification (e.g., U.S. Pat. No. 4,786,600), the polymerase chain reaction (PCR) (e.g., U.S. Pat. Nos. 4,683,195, 4,683,202, and 4,800,159), ligase chain reaction (LCR) (e.g., EP U.S. Pat. No. 320,308), helicase-dependent amplification (e.g., U.S. Pat. No. 7,282,328), and strand-displacement amplification (SDA) (e.g., U.S. Pat. No. 5,422,252). Amplification may be linear or exponential. PCR amplification uses DNA polymerase, primers, and thermal cycling steps to synthesize multiple copies of the two complementary strands of DNA or cDNA. LCR amplification uses at least four separate oligonucleotides to amplify a target and its complementary strand by using multiple cycles of hybridization, ligation, and denaturation. Helicase-dependent amplification uses a helicase to separate the two strands of a DNA duplex generating single-stranded templates, followed by hybridization of sequence-specific primers hybridize to the templates and extension by DNA polymerase to amplify the target sequence. SDA uses a primer that contains a recognition site for a restriction endonuclease that will nick one strand of a hemimodified DNA duplex that includes the target sequence, followed by amplification in a series of primer extension and strand displacement steps. Replicase-mediated amplification uses self-replicating RNA molecules, and a replicase such as QB-replicase. Particular embodiments use PCR or TMA, but it will be apparent to persons of ordinary skill in the art that oligomers disclosed herein may be readily used as primers in other amplification methods.

Transcription-associated amplification uses a DNA polymerase, an RNA polymerase, deoxyribonucleoside triphosphates, ribonucleoside triphosphates, a promoter-containing oligonucleotide, and optionally may include other oligonucleotides, to ultimately produce multiple RNA transcripts from a nucleic acid template (described in detail in, e.g., U.S. Pat. Nos. 5,399,491 and 5,554,516 to Kacian et al.; U.S. Pat. No. 5,437,990 to Burg et al.; PCT Publication Nos. WO 88/01302 and WO 88/01315 (Gingeras et al.); U.S. Pat. No. 5,130,238 to Malek et al.; U.S. Pat. Nos. 4,868,105 and 5,124,246 to Urdea et al.; PCT Publication No. WO 94/03472 (McDonough et al.); and PCT Publication No. WO 95/03430 (Ryder et al.)). Methods that use TMA are described in detail previously (e.g., U.S. Pat. Nos. 5,399,491 and 5,554,516).

By Aamplification conditions@ is meant conditions permitting nucleic acid amplification. While the Examples section infra provides preferred amplification conditions for amplifying target nucleic acid sequences derived from *Mycoplasma* organisms using primers of the present disclosure in a transcription-mediated amplification method, other acceptable amplification conditions could be easily determined by one having ordinary skill in the art, depending on the particular method of amplification desired.

By Aopposite sense@ or Aopposite strand@ is meant a nucleic acid molecule perfectly complementary to a reference, or sense, nucleic acid strand.

By Asense,@ Asame-sense@ or Apositive sense@ is meant a nucleic acid molecule perfectly homologous to a reference nucleic acid molecule.

By Aamplicon@ is meant a nucleic acid molecule generated in a nucleic acid amplification reaction and which is derived from a target nucleic acid. An amplicon contains a target nucleic acid sequence that may be of the same or opposite sense as the target nucleic acid.

By Aderived@ is meant that the referred to nucleic acid is obtained directly from a target organism or indirectly as the product of a nucleic acid amplification, which product may be, for instance, an antisense RNA molecule that does not exist in the target organism.

By Acapture probe@ is meant an oligonucleotide or a set of at least two oligonucleotides linked together which are capable of hybridizing to a target nucleic acid and to an immobilized probe, thereby providing means for immobilizing and isolating the target nucleic acid in a test sample. That portion of the capture probe which hybridizes to the target nucleic acid is referred to as the Atarget binding region,@ and that portion of the capture probe which hybridizes to the immobilized probe is referred to as the Aimmobilized probe binding region.@ While the preferred capture probe hybridizes to both the target nucleic acid and the immobilized probe under assay conditions, the target binding region and the immobilized probe binding region may be designed to hybridize to their respective target sequences under different hybridization conditions. In this way, the capture probe may be designed so that it first hybridizes to the target nucleic acid under more favorable in solution kinetics before adjusting the conditions to permit hybridization of the immobilized probe binding region to the immobilized probe. When the target binding and immobilized probe binding regions are provided on the same capture probe, they may be directly adjoining each other on the same oligonucleotide, they may be separated from each other by one or more optionally modified nucleotides, or they may be joined to each other by means of a non-nucleotide linker.

By Atarget binding region@ is meant that portion of an oligonucleotide which stably binds to a target sequence present in a target nucleic acid, a DNA or RNA equivalent of the target sequence or a complement of the target sequence under assay conditions. The assay conditions may be stringent hybridization conditions or amplification conditions.

By Aimmobilized probe binding region@ is meant that portion of an oligonucleotide which hybridizes to an immobilized probe under assay conditions.

By Ahomopolymer tail@ in the claims is meant a contiguous base sequence of at least 10 identical bases (e.g., 10 contiguous adenines or thymines).

By Aimmobilized probe@ is meant an oligonucleotide for joining a capture probe to an immobilized support. The immobilized probe is joined either directly or indirectly to the solid support by a linkage or interaction which remains stable under the conditions employed to hybridize the capture probe to the target nucleic acid and to the immobilized probe, whether those conditions are the same or different. The immobilized probe facilitates separation of the bound target nucleic acid from unbound materials in a sample.

By Aisolate@ or Aisolating@ is meant that at least a portion of the target nucleic acid present in a test sample is concentrated within a reaction receptacle or on a reaction device or solid carrier (e.g., test tube, cuvette, microtiter plate well, nitrocellulose filter, slide or pipette tip) in a fixed or releasable manner so that the target nucleic acid can be purified without significant loss of the target nucleic acid from the receptacle, device or carrier.

By Aseparate,@ Aseparation,@ Aseparating@ or Apurify,@ Apurified@ or Apurifying@ is meant that one or more components of a sample contained in or on a receptacle, device or carrier are physically removed from one or more other sample components present in or on the receptacle, device or carrier. Sample components which may be removed during a separating or purifying step include proteins, carbohydrates, lipids, inhibitors, non-target nucleic acids and unbound probe. Preferably retained in a sample during a separating or purifying step are target nucleic acids bound to immobilized capture probes.

By AMycoplasma organisms@ is meant two or more species of *Mycoplasma*, including *M. genitalium* as one of the organisms.

By Aphylogenetically closely related@ is meant that the organisms are closely related to each other in an evolutionary sense and therefore would have a higher total nucleic acid sequence homology than organisms that are more distantly related. Organisms occupying adjacent and next to adjacent positions on the phylogenetic tree are closely related. Examples of organisms that are closely related are the species *M. genitalium* and *M. pneumoniae*. Organisms occupying positions farther away than adjacent or next to adjacent positions on the phylogenetic tree will still be closely related if they have significant total nucleic acid sequence homology.

By Aspecies-specific@ is meant that the referred to hybridization assay probe is capable of preferentially detecting (e.g., under stringent hybridization assay conditions) a target nucleic acid sequence present in nucleic acid derived from organisms belonging to the species *M. genitalium*.

Hybridization Conditions and Probe Design

Hybridization reaction conditions, most importantly the temperature of hybridization and the concentration of salt in the hybridization solution, can be selected to allow the hybridization assay probes of the present disclosure to preferentially hybridize to nucleic acids having a target nucleic sequence derived from *M. genitalium*. At decreased salt concentrations and/or increased temperatures (conditions of increased stringency) the extent of nucleic acid hybridization decreases as hydrogen bonding between paired nucleotide bases in the double-stranded hybrid molecule is disrupted. This process is known as "melting."

Generally speaking, the most stable hybrids are those having the largest number of contiguous, perfectly matched (i.e., hydrogen-bonded) nucleotide base pairs. Such hybrids would usually be expected to be the last to melt as the stringency of the hybridization conditions increases. However, a double-stranded nucleic acid region containing one or more mismatched, "non-canonical," or imperfect base pairs (resulting in weaker or non-existent base pairing at that position in the nucleotide sequence of a nucleic acid) may still be sufficiently stable under conditions of relatively high stringency to allow the nucleic acid hybrid to be formed and detected in a hybridization assay without cross-reacting with other, non-selected nucleic acids which may be present in a test sample.

Hence, depending on the degree of similarity between the nucleotide sequences of the target nucleic acid and those of non-target nucleic acids belonging to phylogenetically distinct, but closely related organisms on the one hand, and the degree of complementarity between the nucleotide sequences of a particular probe and those of the target and non-target nucleic acids on the other, one or more mismatches will not necessarily defeat the ability of an oligonucleotide contained in the probe or primer to hybridize to the target nucleic acid and not to non-target nucleic acids.

The hybridization assay probes of the present disclosure were chosen, selected, and/or designed to maximize the difference between the melting temperatures ($T_m$) of the probe: target hybrid ($T_m$ is defined as the temperature at which half of the potentially double-stranded molecules in a given reaction mixture are in a single-stranded, denatured state) and the $T_m$ of a mismatched hybrid formed between the probe and rRNA or rDNA of the phylogenetically most closely-related organisms expected to be present in the test sample, but not sought to be detected. While the unlabeled amplification primers and capture probes need not have such an extremely high degree of specificity as the hybridization assay probe to be useful in the present disclosure, they are designed in a similar manner to preferentially hybridize to one or more target nucleic acids over other nucleic acids under specified amplification or hybridization assay conditions. The sequences used for this comparison were determined in the laboratory or obtained from published sources. Sequences for *M. genitalium* and *M. pneumoniae* were obtained from the GenBank database under Accession Nos. X77334 and M29061, respectively.

Within the rRNA molecule there is a close relationship between secondary structure (caused in part by intra-molecular hydrogen bonding) and function. This fact imposes restrictions on evolutionary changes in the primary nucleotide sequence causing the secondary structure to be maintained. For example, if a base is changed in one "strand" of a double helix (due to intra-molecular hydrogen bonding, both "strands" are part of the same rRNA molecule), a compensating substitution usually occurs in the primary sequence of the other "strand" in order to preserve complementarity (this is referred to as co-variance), and thus the necessary secondary structure. This allows two very different rRNA sequences to be aligned based both on the conserved primary sequence and also on the conserved secondary structure elements. Potential target sequences for the hybridization assay probes described herein were identified by noting variations in the homology of the aligned sequences.

The sequence evolution at each of the variable regions is mostly divergent. As a result of this divergence, corresponding rRNA variable regions of more distant phylogenetic relatives of *M. pneumoniae* and *M. genitalium* show greater differences from the rRNA of these organisms than do the rRNAs of phylogenetically closer relatives. Sufficient variation between *M. genitalium* and *M. pneumoniae* and other organisms was observed to identify preferred target sites and design hybridization assay probes useful for distinguishing between *M. genitalium* and *M. pneumoniae* over other closely related organisms.

Merely identifying putatively unique potential target nucleotide sequences does not guarantee that a functionally species-specific hybridization assay probe may be made to hybridize to *M. genitalium* rRNA or rDNA comprising that sequence. Various other factors will determine the suitability of a nucleic acid locus as a target site for species-specific probes. Because the extent and specificity of hybridization reactions, such as those described herein, are affected by a number of factors, manipulation of one or more of those factors will determine the exact sensitivity and specificity of a particular oligonucleotide, whether perfectly complementary to its target or not. The importance and effect of various assay conditions are known to those skilled in the art and are disclosed by the following: Kohne, AMethod for Detection, Identification and Quantitation of Non-Viral Organisms,@ U.S. Pat. No. 4,851,330; Hogan et al., ANucleic Acid Probes to *Mycobacterium gordonae*,@ U.S. Pat. No. 5,216,143; and Hogan, ANucleic Acid Probes for Detection and/or Quantitation of Non-Viral Organisms,@ U.S. Pat. No. 5,840,488.

The desired temperature of hybridization and the hybridization solution composition (such as salt concentration, detergents and other solutes) can also affect the stability of double-stranded hybrids. Conditions such as ionic strength and the temperature at which a probe will be allowed to hybridize to a target must be taken into account in constructing a species-specific probe. The thermal stability of hybrid nucleic acids generally increases with the ionic strength of the reaction mixture. On the other hand, chemical reagents which disrupt hydrogen bonds, such as formamide, urea, dimethyl sulfoxide and alcohols, can greatly reduce the thermal stability of the hybrids.

To maximize the specificity of a probe for its target, probes of the present disclosure were designed to hybridize to their targets under conditions of high stringency. Under such conditions only single nucleic acid strands (or regions) having a high degree of complementarity will hybridize to each other. Single nucleic acid strands without such a high degree of complementarity will not form hybrids. Accordingly, the stringency of the assay conditions determines the amount of complementarity which should exist between two nucleic acid strands in order to form a hybrid. Stringency is chosen to maximize the difference in stability between the hybrid formed between the probe and the target nucleic acid and potential hybrids between the probe and any non-target nucleic acids present in a test sample.

Proper specificity may be achieved by minimizing the length of the hybridization assay probe having perfect complementarity to sequences of non-target organisms, by avoiding G and C rich regions of complementarity to non-target nucleic acids, and by constructing the probe to contain as many destabilizing mismatches to non-target sequences as possible. Whether a probe is appropriate for detecting only a specific type of organism depends largely on the thermal stability difference between probe: target hybrids versus probe: non-target hybrids. In designing probes, the differences in these $T_m$ values should be as large as possible (preferably 2-5° C. or more). Manipulation of the $T_m$ can be accomplished by changes to probe length and probe composition, such as GC content versus AT content or the inclusion of nucleotide analogs (e.g., ribonucleotides having a 2'-O-methyl substitution to the ribofuranosyl moiety).

In general, the optimal hybridization temperature for oligonucleotide probes is approximately 5° C. below the melting temperature for a given duplex. Incubation at temperatures below the optimum temperature may allow mismatched base sequences to hybridize and can therefore decrease specificity. The longer the probe, the more hydrogen bonding between base pairs and, in general, the higher the $T_m$. Increasing the percentage of G and C also increases the $T_m$ because G-C base pairs exhibit additional hydrogen bonding and therefore greater thermal stability than A-T base pairs. Such considerations are known in the art. See, e.g., J. SAMBROOK ET AL., MOLECULAR CLONING: A LABORATORY MANUAL CH. 11 (2d ed. 1989).

A preferred method for determining $T_m$ measures hybridization using the well-known hybridization protection assay (HPA) disclosed by Arnold et al., AHomogenous Protection Assay,@ U.S. Pat. No. 5,283,174. The $T_m$ can be measured using HPA in the following manner. Probe molecules are labeled with an acridinium ester and permitted to form probe: target hybrids in a lithium succinate buffer (0.1 M lithium succinate buffer, pH 4.7, 20 mM EDTA, 15 mM aldrithiol-2, 1.2 M LiCl, 3% (v/v) ethanol absolute, 2% (w/v) lithium lauryl sulfate) using an excess amount of target. Aliquots of the solution containing the probe: target hybrids are then diluted in the lithium succinate buffered solution and incubated for five minutes at various temperatures starting below that of the anticipated $T_m$ (typically 55° C.) and increasing in 2-5° C. increments. This solution is then diluted with a mild alkaline borate buffer (600 mM boric acid, 240 mM NaOH, 1% (v/v) TRITON7 X-100, pH 8.5) and incubated at an equal or lower temperature (for example 50° C.) for ten minutes.

Under these conditions the acridinium ester attached to the single-stranded probe is hydrolyzed, while the acridinium ester attached to hybridized probe is relatively protected from hydrolysis. Thus, the amount of acridinium ester remaining after hydrolysis treatment is proportional to the number of hybrid molecules. The remaining acridinium ester can be measured by monitoring the chemiluminescence produced from the remaining acridinium ester by adding hydrogen peroxide and alkali to the solution. Chemiluminescence can be measured in a luminometer, such as a LEADER7 450i luminometer (Gen-Probe Incorporated, San Diego, CA). The resulting data can be plotted as percent of maximum signal (usually from the lowest temperature) versus temperature. The $T_m$ is defined as the temperature at which 50% of the maximum signal remains. In addition to the method above, $T_m$ may be determined by isotopic methods known to those skilled in the art (see, e.g., U.S. Pat. No. 5,840,488).

It should be noted that the $T_m$ for a given hybrid varies depending on the nature of the hybridization solution used. Factors such as the salt concentration, detergents, and other solutes can affect hybrid stability during thermal denaturation (see, e.g., SAMBROOK ET AL., supra, ch. 11). Conditions such as ionic strength and the temperature at which a probe will be allowed to hybridize to target should be taken into account in probe construction. Generally speaking, the thermal stability of a hybrid nucleic acid increases with the ionic strength of the reaction mixture. On the other hand, chemical reagents that disrupt hydrogen bonds, such as formamide, urea, dimethyl sulfoxide and alcohols, can greatly reduce hybrid thermal stability.

To ensure specificity of a hybridization assay probe for its target, it is preferable to design probes which hybridize only to target nucleic acid under conditions of high stringency. Only highly complementary sequences will form hybrids under conditions of high stringency. Accordingly, the stringency of the assay conditions determines the amount of complementarity needed between two sequences in order for a stable hybrid to form. Stringency should be chosen to maximize the difference in stability between the probe: target hybrid and potential probe: non-target hybrids.

Examples of specific stringent hybridization conditions are provided herein. Of course, alternative stringent hybridization conditions could be determined by those of ordinary skill in the art based on the present disclosure. (See, e.g., SAMBROOK ET AL., supra, ch. 11.)

The length of the target nucleic acid sequence region and, accordingly, the length of the probe sequence can also be important. In some cases, there may be several sequences from a particular region, varying in location and length, which may be used to design probes with the desired hybridization characteristics. In other cases, one probe may be significantly better with regard to specificity than another which differs from it merely by a single base. While it is possible for nucleic acids that are not perfectly complementary to hybridize, the longest stretch of perfectly complementary bases, as well as the base compositions, will generally determine hybrid stability.

Regions of rRNA known to form strong internal structures inhibitory to hybridization are less preferred target regions. Likewise, probes with extensive self-complementarity are generally to be avoided. However, that some degree of self-complementarity in a probe may be desirable, as in hairpin probes like the molecular beacons and molecular torches discussed below. If a strand is wholly or partially involved in an intra-molecular or inter-molecular hybrid, it will be less able to participate in the formation of a new inter-molecular probe: target hybrid without a change in the reaction conditions. Ribosomal RNA molecules are known to form very stable intra-molecular helices and secondary structures by hydrogen bonding. By designing a probe to a region of the target nucleic acid which remains substantially single-stranded under hybridization conditions, the rate and extent of hybridization between probe and target may be increased.

A genomic ribosomal nucleic acid (rDNA) target occurs naturally in a double-stranded form, as does a product of the polymerase chain reaction (PCR). These double-stranded targets are naturally inhibitory to hybridization with a probe and require denaturation prior to hybridization. Appropriate denaturation and hybridization conditions are known in the art (see, e.g., Southern, E. M., *J. Mol. Biol.*, 98:503 (1975)).

A number of formulae are available which will provide an estimate of the melting temperature for perfectly matched oligonucleotides to their target nucleic acids. One such formula is the following:

$$T_m = 81.5 + 16.6 \, (\log_{10}[\text{Na}^+]) + 0.41 \, (\text{fraction } G+C) - (600/N)$$

(where N=the length of the oligonucleotide in number of nucleotides) provides a good estimate of the $T_m$ for oligonucleotides between 14 and 60 to 70 nucleotides in length. From such calculations, subsequent empirical verification or "fine tuning" of the $T_m$ may be made using screening techniques well known in the art. For further information on hybridization and oligonucleotide probes reference, may be made to SAMBROOK ET AL., supra, ch. 11. This reference, among others well known in the art, also provides estimates of the effect of mismatches on the $T_m$ of a hybrid. Thus, from the known nucleotide sequence of a given region of the ribosomal RNA (or rDNA) of two or more organisms, oligonucleotides may be designed which will distinguish these organisms from one another.

Preparation of Oligonucleotides

The hybridization assay probes, amplification primers and capture probes of the present disclosure can be readily prepared by methods known in the art. Preferably, the oligonucleotides are synthesized using solid phase methods. Standard phosphoramidite solid-phase chemistry for joining nucleotides by phosphodiester linkages is disclosed by Caruthers et al., in AChemical Synthesis of Deoxynucleotides by the Phosphoramidite Method,@ *Methods Enzymol.*, 154:287 (1987). Automated solid-phase chemical synthesis using cyanoethyl phosphoramidite precursors has been described by Barone. See Barone et al., AIn Situ Activation of bis-dialkylaminephosphines—a New Method for Synthesizing Deoxyoligonucleotides on Polymer Supports,@ Nucleic Acids Res., 12 (10): 4051 (1984). Batt discloses a procedure for synthesizing oligonucleotides containing phosphorothioate linkages in U.S. Pat. No. 5,449,769, entitled AMethod and Reagent for Sulfurization of Organophosphorous Compounds.@ In addition, Riley et al. disclose the synthesis of oligonucleotides having different linkages including methylphosphonate linkages in U.S. Pat. No. 5,811,538, entitled AProcess for the Purification of Oligomers.@ Moreover, methods for the organic synthesis of oligonucleotides are known to those of skill in the art and are described in, for example, SAMBROOK ET AL., supra, ch. 10.

Following synthesis and purification of a particular oligonucleotide, several different procedures may be utilized to purify and control the quality of the oligonucleotide. Suitable procedures include polyacrylamide gel electrophoresis or high pressure liquid chromatography. Both of these procedures are well known to those skilled in the art.

All of the oligonucleotides of the present disclosure, whether hybridization assay probes, amplification primers or capture probes, may be modified with chemical groups to enhance their performance or to facilitate the characterization of amplification products. For example, backbone-modified oligonucleotides such as those having phosphorothioate, methylphosphonate, 2'-O-alkyl or peptide groups which render the oligonucleotides resistant to the nucleolytic activity of certain polymerases or to nuclease enzymes may allow the use of such enzymes in an amplification or other reaction. Another example of a modification involves using non-nucleotide linkers incorporated between nucleotides in the nucleic acid chain of a probe or primer, and which do not prevent hybridization of a probe or hybridization and elongation of a primer. See Arnold et al., ANon-Nucleotide Linking Reagents for Nucleotide Probes,@ U.S. Pat. No. 6,031,091. The oligonucleotides of the present disclosure may also contain mixtures of the desired modified and natural nucleotides.

The 3' end of an amplification primer can be modified or blocked to prevent or inhibit initiation of DNA synthesis, as disclosed by Kacian et al. in U.S. Pat. No. 5,554,516. The 3' end of the primer can be modified in a variety of ways well known in the art. By way of example, appropriate modifications to a primer can include the addition of ribonucleotides, 3' deoxynucleotide residues (e.g., cordycepin), 2',3'-dideoxynucleotide residues, modified nucleotides such as phosphorothioates, and non-nucleotide linkages such as those disclosed by Arnold et al. in U.S. Pat. No. 6,031,091 or alkane-diol modifications (see Wilk et al., ABackbone-Modified Oligonucleotides Containing a Butanediol-1,3 Moiety as a >Vicarious Segment=for the Deoxyribosyl Moiety—Synthesis and Enzyme Studies,@ *Nucleic Acids Res.*, 18 (8): 2065 (1990)), or the modification may simply consist of a region 3' to the priming sequence that is non-complementary to the target nucleic acid sequence. Additionally, a mixture of different 3' blocked primers or of 3' blocked and unblocked primers may increase the efficiency of nucleic acid amplification, as disclosed therein.

The 5' end of primers can be modified to be resistant to the 5'-exonuclease activity present in some nucleic acid polymerases. Such modifications can be carried out by adding a non-nucleotide group to the terminal 5' nucleotide of the primer using techniques such as those disclosed by Arnold et al. in U.S. Pat. No. 6,031,091. To facilitate strand displacement, the 5' end may also be modified to include non-complementary nucleotides as disclosed by Dattagupta et al, AIsothermal Strand Displacement Nucleic Acid Amplification,@ U.S. Pat. No. 6,087,133.

Once synthesized, a selected oligonucleotide may be labeled by any of several well-known methods (see, e.g., SAMBROOK, supra, ch. 10). Useful labels include radioisotopes as well as non-radioactive reporting groups. Isotopic labels include $^3$H, $^{35}$S, $^{32}$P, $^{125}$I, $^{57}$Co and $^{14}$C. Isotopic labels can be introduced into the oligonucleotide by techniques known in the art such as nick translation, end labeling, second strand synthesis, the use of reverse transcription, and by chemical methods. When using radiolabeled probes, hybridization can be detected by autoradiography, scintillation counting or gamma counting. The detection method selected will depend upon the particular radioisotope used for labeling.

Non-isotopic materials can also be used for labeling and may be introduced internally into the nucleic acid sequence or at the end of the nucleic acid sequence. Modified nucleotides may be incorporated enzymatically or chemically. Chemical modifications of the probe may be performed during or after synthesis of the probe, for example, through the use of non-nucleotide linker groups, as disclosed by Arnold et al. in U.S. Pat. No. 6,031,091. Non-isotopic labels include fluorescent molecules (individual labels or combinations of interacting labels, such as the fluorescence resonance energy transfer (FRET) pairs disclosed by Tyagi et al. in U.S. Pat. No. 5,925,517), chemiluminescent molecules, enzymes, cofactors, enzyme substrates, haptens or other ligands. With the hybridization assay probes of the present disclosure, the probes are preferably labeled by means of a non-nucleotide linker with an acridinium ester (AE), such as standard AE. Acridinium ester labeling may be performed as disclosed by Arnold et al., AAcridinium Ester Labelling and Purification of Nucleotide Probes,@ U.S. Pat. No. 5,185,439.

Nucleic Acid Amplification

Preferably, the amplification primers of the present disclosure are oligodeoxynucleotides and are sufficiently long to be used as a substrate for the synthesis of extension products by a nucleic acid polymerase. Optimal primer length should take into account several factors, including the temperature of reaction, the structure and base composition of the primer, and how the primer is to be used. For example, for optimal specificity the oligonucleotide primer generally should be at least 12 bases in length, depending on the complexity of the target nucleic acid sequence. If such specificity is not essential, shorter primers may be used. In such a case, it may be desirable to carry out the reaction at cooler temperatures in order to form stable hybrid complexes with the template nucleic acid.

Useful guidelines for designing amplification primers with desired characteristics are described above in the section entitled APreparation of Oligonucleotides.@ Optimal sites for amplifying and probing contain at least two, and preferably three, conserved regions of *M. genitalium* nucleic acid. These regions are about 15 to 350 bases in length, and preferably between about 15 and 150 bases in length.

The degree of amplification observed with a set of amplification primers (primers and/or promoter-primers) depends on several factors, including the ability of the primers to hybridize to their specific target sequences and their ability to be extended or copied enzymatically. While amplification primers of different lengths and base compositions may be used, amplification primers preferred in this disclosure have target binding regions of 18 to 40 bases with a predicted $T_m$ to target above 42° C., preferably at least about 50EC.

Parameters affecting probe hybridization, such as melting temperature, complementarity and secondary structure of the target sequence, also affect amplification primer hybridization and therefore performance of the amplification primers. The degree of non-specific extension (primer-dimer or non-target copying) can also affect amplification efficiency. Thus, amplification primers are generally selected to have low self-complementarity or cross-complementarity, particularly at the 3' ends of their sequences. Notwithstanding, amplification primers including regions of self-complementarity may be useful, such as the self-reporting Asignal primers@ disclosed by Nadeau et al., ADetection of Nucleic Acids by Fluorescence Quenching,@ U.S. Pat. No. 5,958, 700, and the Ahairpin primers@ disclosed by Nazarenko et al., ANucleic Acid Amplification Oligonucleotides with Molecular Energy Transfer Labels and Methods Based Thereon,@ U.S. Pat. No. 5,866,336. Lengthy homopolymer runs and high GC content are avoided to reduce spurious primer extension. Computer programs are available to aid in this aspect of the design, including Oligo Tech7 analysis software available from Oligo Therapeutics, Inc.

A nucleic acid polymerase used in conjunction with the amplification primers of the present disclosure refers to a chemical, physical or biological agent which incorporates either ribonucleotides or deoxyribonucleotides, or both, into a nucleic acid polymer, or strand, in a template-dependent manner. Examples of nucleic acid polymerases include DNA-directed DNA polymerases, RNA-directed DNA polymerases, and RNA-directed RNA polymerases. DNA polymerases bring about nucleic acid synthesis in a template-dependent manner and in a 5' to 3' direction. Because of the typical anti-parallel orientation of the two strands in a double-stranded nucleic acid, this direction is from a 3' region on the template to a 5' region on the template. Examples of DNA-directed DNA polymerases include *E. coli* DNA polymerase I, the thermostable DNA polymerase from *Thermus aquaticus* (Taq), and the large fragment of DNA polymerase I from *Bacillus stearothermophilus* (Bst). See, e.g., Riggs et al., APurified DNA Polymerase from *Bacillus stearothermophilus*,@ U.S. Pat. No. 6,066,483. Examples of RNA-directed DNA polymerases include various retroviral reverse transcriptases, such as Moloney murine leukemia virus (MMLV) reverse transcriptase or avian myeloblastosis virus (AMV) reverse transcriptase.

During most nucleic acid amplification reactions, a nucleic acid polymerase adds nucleotide residues to the 3' end of the primer using the target nucleic acid as a template, thus synthesizing a second nucleic acid strand having a nucleotide sequence partially or completely complementary to a region of the target nucleic acid. In many nucleic acid amplification reactions, the two strands comprising the resulting double-stranded structure must be separated by chemical or physical means in order to allow the amplification reaction to proceed. Alternatively, the newly-synthesized template strand may be made available for hybridization with a second primer or promoter-primer by other means, such as through strand displacement or the use of a nucleolytic enzyme which digests part or all of the original target strand. In this way the process may be repeated through a number of cycles, resulting in a large increase in the number of nucleic acid molecules having the target nucleotide sequence.

Either the first or second amplification primer, or both, may be a promoter-primer. In some applications, the amplification primers may only consist of promoter-primers which are complementary to the sense strand, as disclosed by Kacian et al., ANucleic Acid Sequence Amplification Method, Composition and Kit,@ U.S. Pat. No. 5,554,516. A promoter-primer usually contains an oligonucleotide segment that is not complementary to a nucleotide sequence present in the target nucleic acid molecule or primer extension product(s) (see, e.g., Kacian et al., ANucleic Acid Sequence Amplification Methods,@ U.S. Pat. No. 5,399,491). These non-complementary sequences may be located 5' to the complementary sequences on the amplification primer and may provide a locus for initiation of RNA synthesis when made double-stranded through the action of a nucleic acid polymerase. The promoter thus provided may allow for the in vitro transcription of multiple RNA copies of the target nucleic acid sequence. It will be appreciated that all references to primers herein are inclusive of primers and promoter-primers, unless the context clearly indicates otherwise.

Sample Processing

Sample processing prior to amplification or detection of a target sequence may be necessary or useful for discriminating a target sequence from non-target nucleic acid present in a sample. Sample processing procedures may include, for example, direct or indirect immobilization of nucleic acids and/or oligonucleotides from the liquid phase in a heterogeneous assay. With some procedures, such immobilization may require multiple hybridization events. Ranki et al., in ADetection of Microbial Nucleic Acids by a One-Step Sandwich Hybridization Test,@ U.S. Pat. Nos. 4,486,539 and 4,563,419, for example, disclose a one-step nucleic acid "sandwich" hybridization method involving the use of a solid-phase bound nucleic acid having a target complementary sequence and a labeled nucleic acid probe which is complementary to a distinct region of the target nucleic acid. Stabinsky, AMethods and Kits for Performing Nucleic Acid Hybridization Assays,@ U.S. Pat. No. 4,751,177, discloses methods including a "mediator" polynucleotide that reportedly overcomes sensitivity problems associated with the method of Ranki resulting from leakage of immobilized probe from the solid support. Instead of directly immobilizing the target nucleic acid, the mediator polynucleotides of Stabinsky are used to bind and indirectly immobilize target polynucleotide: probe polynucleotide complexes which have formed free in solution.

Any known solid support may be used for sample processing, such as matrices and particles free in solution. The solid support may be, for example, nitrocellulose, nylon, glass, polyacrylate, mixed polymers, polystyrene, silane polypropylene and, preferably, magnetically attractable particles to facilitate recovering sample and/or removing unbound nucleic acids or other sample components. Particularly preferred supports are magnetic spheres that are monodisperse (i.e., uniform in size V 5%), thereby providing consistent results, which is particularly advantageous for use in an automated procedure. One such automated procedure is disclosed by Ammann et al., AAutomated Process for Isolating and Amplifying a Target Nucleic Acid Sequence,@ U.S. Pat. No. 6,335,166.

An oligonucleotide for immobilizing a target nucleic acid on a solid support may be joined directly or indirectly to the solid support by any linkage or interaction which is stable under assay conditions (e.g., conditions for amplification and/or detection). Referred to herein as an Aimmobilized probe,@ this oligonucleotide may bind directly to the target nucleic acid or it may include a base sequence region, such as a homopolymeric tract (e.g., a poly dT) or a simple short repeating sequence (e.g., an AT repeat), which hybridizes to a complementary base sequence region present on a capture probe. Direct joining occurs when the immobilized probe is joined to the solid support in the absence of an intermediate group. For example, direct joining may be via a covalent linkage, chelation or ionic interaction. Indirect joining occurs when the immobilized probe is joined to the solid support by one or more linkers. A Alinker@ is a means for binding at least two different molecules into a stable complex and contains one or more components of a binding partner set.

Members of a binding partner set are able to recognize and bind to each other. Binding partner sets may be, for example, receptor and ligand, enzyme and substrate, enzyme and cofactor, enzyme and coenzyme, antibody and antigen, sugar and lectin, biotin and streptavidin, ligand and chelating agent, nickel and histidine, substantially complementary oligonucleotides, and complementary homopolymeric nucleic acids or homopolymeric portions of polymeric nucleic acids. Components of a binding partner set are the regions of the members that participate in binding.

A preferred sample processing system having practical advantages in terms of its ease of use and rapidity includes an immobilized probe containing a base sequence which is complementary to a base sequence of a capture probe, referred to herein as an Aimmobilized probe binding region.@ The capture probe additionally contains a base sequence, referred to herein as a Atarget binding region,@ which may specifically hybridize to a target sequence contained in a target nucleic acid under assay conditions. While specificity of the target binding region of the capture probe for a region of the target nucleic acid is desirable to minimize the number of non-target nucleic acids remaining from the sample after a separation step, it is not a requirement of the capture probes of the present disclosure if the capture probes are being used solely to isolate target nucleic acid. If the capture probe is not being employed to isolate a target nucleic acid for subsequent amplification of a target sequence, the capture probe may further include a detectable label attached within or near the target binding region, such as a substituted or unsubstituted acridinium ester. The labeled capture probe may be used in a homogeneous or semi-homogenous assay to specifically detect hybrid nucleic acids without detecting single-stranded nucleic acids, such as the capture probe. A preferred homogenous assay which could be used with this system is the hybridization protection assay (HPA), which is discussed above in the section entitled AHybridization Conditions and Probe Design. @ Following the HPA format, label associated with capture probes which have not hybridized to target nucleic acids would be hydrolyzed with the addition of a mild base, while label associated with capture probe: target hybrids would be protected from hydrolysis.

An advantage of this latter assay system is that only a single target-specific hybridization event (capture probe: target) is necessary for target detection, rather than multiple such events (e.g., capture probe: target and probe: target or probe: amplicon) which are required in other sample processing procedures described herein. Also, fewer oligonucleotides in an assay tend to make the assay faster and simpler to optimize, since the overall rate at which a target nucleic acid is captured and detected is limited by the slowest hybridizing oligonucleotide. While the target binding region of a capture probe may be less specific in alternative assay systems, it must still be rare enough to avoid significant saturation of the capture probe with non-target nucleic acids. Thus, the requirement that two separate and specific target sequences be identified in these alternative systems could place constraints on the identification of an appropriate target. By contrast, only one such target sequence is needed when the capture probe simultaneously functions as the detection probe.

Whichever approach is adopted, the assay needs to include a means for detecting the presence of the target nucleic acid in the test sample. A variety of means for detecting target nucleic acids are well known to those skilled in the art of nucleic acid detection, including means which do not require the presence of a detectable label. Nevertheless, probes including a detectable label are preferred. A labeled probe for detecting the presence of a target nucleic acid would have to include a base sequence which is substantially complementary and specifically hybridizes to a target sequence contained in the target nucleic acid. Once the probe stably binds to the target nucleic acid, and the resulting target: probe hybrid has been directly or indirectly immobilized, unbound probe can be washed away or inactivated and the remaining bound probe can be detected and/or measured.

Preferred sample processing systems combine the elements of detection and nucleic acid amplification. These systems first directly or indirectly immobilize a target nucleic acid using a capture probe, the captured target nucleic acid is purified by removing cellular debris, non-target nucleic acid and amplification inhibitors from the sample-containing vessel, which is followed by amplification of a target sequence contained in the target nucleic acid. Amplified product is then detected, preferably in solution with a labeled probe. The target nucleic acid may remain in the immobilized state during amplification, or it may be eluted from the solid support prior to amplification using appropriate conditions, such as by first incubating at a temperature above the $T_m$ of the capture probe: target complex and/or the $T_m$ of the capture probe: immobilized probe complex. A preferred embodiment of this system is disclosed by Weisburg et al., ATwo-Step Hybridization and Capture of a Polynucleotide,@ U.S. Pat. No. 6,110,678. In this system, the capture probe hybridizes to the target nucleic acid and an immobilized probe hybridizes to the capture probe: target complex under different hybridization conditions. Under a first set of hybridization conditions, hybridization of the capture probe to the target nucleic acid is favored over hybridization of the capture probe to the immobilized probe. Thus, under this first set of conditions, the capture probe is in solution rather than bound to a solid support, thereby maximizing the concentration of the free capture probe and utilizing favorable liquid phase kinetics for hybridization to the target nucleic acid. After the capture probe has had sufficient time to hybridize to the target nucleic acid, a second set of hybridization conditions is imposed permitting in the capture probe: target complex to hybridize to the immobilized probe, thereby isolating the target nucleic acid in the sample solution. The immobilized target nucleic acid may then be purified, and a target sequence present in the target nucleic acid may be amplified and detected. A purification procedure which includes one or more wash steps is generally desirable when working with crude samples (e.g., clinical, environmental, industrial, food, water, etc.) to prevent enzyme inhibition and/or nucleic acid degradation due to substances present in the sample.

A preferred amplification method is the transcription-mediated amplification method disclosed by Kacian et al., ANucleic Acid Sequence Amplification Methods,@ U.S. Pat. No. 5,480,789. In accord with this method, a promoter-primer having a 3' region complementary to a portion of the target and a 5' promoter region and a primer having the same nucleotide sequence as a portion of the target are contacted with a target RNA molecule. The primer and promoter-primer define the boundaries of the target region to be amplified, including both the sense present on the target molecule and its complement, and thus the length and sequence of the amplicon. In this preferred embodiment, the amplification oligonucleotides and immobilized target RNA are contacted in the presence of effective amounts of Moloney murine leukemia virus-derived reverse transcriptase and T7 RNA polymerase, both ribonucleotide and deoxyribonucleotide triphosphates, and necessary salts and cofactors at 42EC. Under these conditions, nucleic acid amplification occurs, resulting predominantly in the production of RNA amplicons of a sense opposite to that of the target nucleic acid. These amplicons can then be detected in solution by, for example, using an acridinium ester-labeled hybridization assay probe of the same sense as the target nucleic acid, employing HPA, as disclosed by Arnold et al. in U.S. Pat. No. 5,283,174.

The 3' terminus of the immobilized probe and the capture probe are preferably "capped" or blocked to prevent or inhibit their use as templates for nucleic acid polymerase activity. Capping may involve adding 3' deoxyribonucleotides (such as cordycepin), 3', 2'-dideoxynucleotide residues, non-nucleotide linkers, such as those disclosed by Arnold et al. in U.S. Pat. No. 6,031,091, alkane-diol modifications, or non-complementary nucleotide residues at the 3' terminus.

Those skilled in the art will recognize that the above-described methodology is amenable, either as described or with obvious modifications, to various other amplification schemes, including, for example, the polymerase chain reaction (PCR), Qß replicase-mediated amplification, self-sustained sequence replication (3SR), strand displacement amplification (SDA), nucleic acid sequence-based amplification (NASBA), loop-mediated isothermal amplification (LAMP), and the ligase chain reaction (LCR).

Capture Probes for Isolating Ribosomal Nucleic Acid

Capture probes of the present disclosure are designed to bind to and isolate nucleic acid derived from either the 16S or 23S ribosomal nucleic acid of a *Mycoplasma* organism in the presence of non-target nucleic acid. As such, the capture probes include both a target binding region and an immobilized probe binding region. The target binding region of the capture probes includes a base sequence which hybridizes to a target sequence derived from either the 16S or 23S ribosomal nucleic acid from a *Mycoplasma* organism under assay conditions. While not essential, the target binding region preferably exhibits specificity for the target sequence in the presence of non-target nucleic acid under assay conditions. The immobilized probe binding region has a base sequence which hybridizes to an immobilized probe comprising a polynucleotide, or a chimeric containing polynucleotide sequences, which is joined to a solid support present in the test sample, either directly or indirectly. The target binding region and the immobilized probe binding region may be joined to each other directly or by means of, for example, a nucleotide base sequence, an abasic sequence or a non-nucleotide linker.

In a preferred embodiment, capture probes according to the present disclosure include a target binding region comprising a base sequence region which is at least about 85% homologous (preferably at least about 90% homologous, more preferably at least about 95% homologous, and most preferably 100% homologous) to one of the capture probes disclosed herein. The immobilized probe binding region of these preferred capture probes includes a base sequence which hybridizes to an immobilized probe joined directly or indirectly to a solid support provided to the test sample under assay conditions. The immobilized probe binding region preferably comprises a homopolymeric region (e.g., poly (dA)) located at the 3' end of the capture probe which is complementary to a homopolymeric region (e.g., poly (dT)) located at the 5' end of the immobilized probe. Other base sequences may be incorporated into the immobilized probe binding region, including, for example, short repeating sequences.

To prevent undesirable cross-hybridization reactions, the capture probes of the present disclosure preferably exclude nucleotide base sequences, other than the nucleotide base sequence of the target binding region, which can stably bind to nucleic acid derived from any organism which may be present in the test sample under assay conditions. Consistent with this approach, and in order to maximize the immobilization of capture probe: target complexes which are formed, the nucleotide base sequence of the immobilized probe binding region is preferably designed so that it can stably bind to a nucleotide base sequence present in the immobilized probe under assay conditions and not to nucleic acid derived from any organism which may be present in the test sample.

The target binding region and the immobilized probe binding region of the capture probe may be selected so that the capture probe: target complex has a higher $T_m$ than the $T_m$ of the capture probe: immobilized probe complex. In this way, a first set of conditions may be imposed which favors hybridization of the capture probe to the target sequence over the immobilized probe, thereby providing for optimal liquid phase hybridization kinetics for hybridization of the capture probe to the target sequence. Once sufficient time has passed for the capture probe to bind to the target sequence, a second set of less stringent conditions may be imposed which allows for hybridization of the capture probe to the immobilized probe. Sets of conditions useful in these applications can be established by those skilled in the art using no more than routine experimentation.

Capture probes of the present disclosure may also include a label or a pair of interacting labels for direct detection of the target sequence in a test sample. Non-limiting examples of labels, combinations of labels and means for labeling probes are set forth above. A particularly useful method for detecting the presence of a capture probe hybridized to a target nucleic acid is the hybridization protection assay (HPA), which is described herein. HPA is a homogenous assay which distinguishes between probe hybridized to target nucleic acid and probe which remains unhybridized. Signal detected from an HPA reaction vessel provides an indication of the presence or amount of target organisms in the test sample.

Despite their application in a direct detection assay, the most common use of capture probes is in the isolation and purification of target nucleic acid prior to amplifying a target sequence contained in the target nucleic acid. By isolating and purifying the target nucleic acid prior to amplification, the number of unintended amplification reactions (i.e., amplification of non-target nucleic acid) can be severely limited. To prevent or inhibit the capture probe itself from functioning as a template for nucleic acid polymerase activity in the presence of amplification reagents and under amplification conditions, the 3' end of the capture probe can be capped or blocked. Examples of capping agents include 3' deoxyribonucleotides, 3', 2'-dideoxynucleotide residues, non-nucleotide linkers, alkane-diol modifications, and non-complementary nucleotide residues at the 3' terminus.

Amplification of *Mycoplasma* Ribosomal Nucleic Acid

The amplification primers of the present disclosure are directed to regions of either the 16S or 23S ribosomal nucleic acid derived from *Mycoplasma* organisms. The amplification primers may flank, overlap or be contained within at least one of the target nucleic acid sequences of a hybridization assay probe (or its complement) used to detect the presence of a *Mycoplasma* organism in a nucleic acid amplification assay. As indicated above, the amplification primers may also include non-complementary bases at their 5' ends comprising a promoter sequence (e.g., a T7 promoter sequence) able to bind an RNA polymerase and direct RNA transcription using the target nucleic acid as a template.

Amplification primers of the present disclosure are capable of amplifying a target nucleic acid sequence present in nucleic acid derived from *Mycoplasma* organisms under amplification conditions. First strand amplification primers comprise an oligonucleotide having a target binding region, where the base sequence of the target binding region has or substantially corresponds to the base sequence of SEQ ID NO:23, optionally including a 5' promoter sequence (e.g., SEQ ID NO:33) (Target Region 1); SEQ ID NO: 24, SEQ ID NO:25, SEQ ID NO:26, or SEQ ID NO:27, each of these sequences optionally including a 5' promoter sequence (e.g., SEQ ID NO:34, SEQ ID NO:35, SEQ ID NO: 36, or SEQ ID NO:37) (Target Region 2); or SEQ ID NO:28, SEQ ID NO:29, SEQ ID NO: 30, SEQ ID NO:31, or SEQ ID NO:32, each of these sequences optionally including a 5' promoter sequence (e.g., SEQ ID NO:38, SEQ ID NO:39, SEQ ID NO:40, SEQ ID NO: 41, or SEQ ID NO:42) (Target Region 3). Opposite strand amplification primers comprise an oligonucleotide having a target binding region, where the base sequence of the target binding region has or substantially corresponds to the base sequence of SEQ ID NO: 43, SEQ ID NO:44, or SEQ ID NO:45 (Target Region 1); SEQ ID NO:46, SEQ ID NO: 47, SEQ ID NO:48, SEQ ID NO:49, or SEQ ID NO:50 (Target Region 2); or SEQ ID NO: 51, SEQ ID NO:52, or SEQ ID NO:53 (Target Region 3). The target binding region of an amplification primer according to the present disclosure is preferably at least about 80% homologous (more preferably at least about 90% homologous and most preferably 100% homologous) to the recited base sequence. Amplification primers of the present disclosure have a target binding region which is preferably at least 15 bases in length and more preferably from 19 to 25 bases in length.

Amplification primers of the present disclosure may have modifications, such as blocked 3' and/or 5' termini (as discussed above) or sequence additions including, but not limited to, a specific nucleotide sequence recognized by an RNA polymerase (e.g., the promoter sequence for T7, T3 or SP6 RNA polymerase), a sequence which enhances initiation or elongation of RNA transcription by an RNA polymerase, or a sequence which may provide for intra-molecular base pairing and encourage the formation of secondary or tertiary nucleic acid structures.

Amplification primers are used in a nucleic acid amplification procedure, such as the polymerase chain reaction (PCR), Qβ replicase-mediated amplification, self-sustained sequence replication (3SR), transcription-mediated amplification (TMA), nucleic acid sequence-based amplification (NASBA), ligase chain reaction (LCR), strand displacement amplification (SDA) and loop-mediated isothermal amplification (LAMP), each of which is well known in the art. See, e.g., Mullis, AProcess for Amplifying Nucleic Acid Sequences,@ U.S. Pat. No. 4,683,202; Erlich et al., AKits for Amplifying and Detecting Nucleic Acid Sequences,@ U.S. Pat. No. 6,197,563; Walker et al., AStrand Displacement Amplification—an Isothermal, In Vitro DNA Amplification Technique,@ *Nucleic Acids Res.,* 20 (7): 1691-1696 (1992); Fahy et al., ASelf-sustained Sequence Replication (3SR): An Isothermal Transcription-Based Amplification System Alternative to PCR,@ *PCR Methods and Applications,* 1:25-33 (1991); Kacian et al., U.S. Pat. No. 5,399,491; Davey et al., ANucleic Acid Amplification Process,@ U.S. Pat. No. 5,554,517; Birkenmeyer et al., AAmplification of Target Nucleic Acids Using Gap Filling Ligase Chain Reaction,@ U.S. Pat. No. 5,427,930; Marshall et al., AAmplification of RNA Sequences Using the Ligase Chain Reaction,@ U.S. Pat. No. 5,686,272; Walker, AStrand Displacement Amplification,@ U.S. Pat. No. 5,712,124; Notomi et al., AProcess for Synthesizing Nucleic Acid,@ U.S. Pat. No. 6,410,278; Dattagupta et al., AIsothermal Strand Displacement Amplification,@ U.S. Pat. No. 6,214, 587; and Helen H. Lee et al., Nucleic Acid Amplification Technologies: Application to Disease Diagnosis (1997). Other amplification procedures not specifically indicated but which meet the definition of Anucleic acid amplification@ are also contemplated by the inventors.

Amplification primers of the present disclosure are preferably unlabeled but may include one or more reporter groups to facilitate detection of a target nucleic acid in combination with or exclusive of a hybridization assay probe. A wide variety of methods are available to directly detect an amplified target sequence. For example, the nucleotide substrates or the primers can include a detectable label which is incorporated into newly synthesized DNA. The resulting labeled amplification product is then generally separated from the unused labeled nucleotides or primers and the label is detected in the separated product fraction. See, e.g., Wu, ADetection of Amplified Nucleic Acid Using Secondary Capture Oligonucleotides and Test Kit,@ U.S. Pat. No. 5,387,510.

A separation step is not required if the primer is modified by, for example, linking it to two dyes which form a donor/acceptor dye pair. The modified primer can be designed so that the fluorescence of one dye pair member remains quenched by the other dye pair member, as long as the primer does not hybridize to target nucleic acid, thereby physically separating the two dyes. Moreover, the primer can be further modified to include a restriction endonuclease recognition site positioned between the two dyes so that when a hybrid is formed between the modified primer and target nucleic acid, the restriction endonuclease recognition site is rendered double-stranded and available for cleavage or nicking by the appropriate restriction endonuclease. Cleavage or nicking of the hybrid then separates the two dyes, resulting in a change in fluorescence due to decreased quenching which can be detected as an indication of the presence of the target organism or organisms in the test sample. Such modified primers are disclosed by Nadeau et al., ADetection of Nucleic Acids by Fluorescence Quenching,@ U.S. Pat. Nos. 5,958,700 and 6,054,279.

Substances which can serve as useful detectable labels are well known in the art and include radioactive isotopes, fluorescent molecules, chemiluminescent molecules, chromophores, as well as ligands such as biotin and haptens which, while not directly detectable, can be readily detected by a reaction with labeled forms of their specific binding partners, e.g., avidin and antibodies, respectively.

Another approach is to detect the amplification product by hybridization with a detectably labeled probe and measuring the resulting hybrids in any conventional manner. In particular, the product can be assayed by hybridizing a chemiluminescent, acridinium ester-labeled probe to the target sequence, selectively hydrolyzing the acridinium ester present on unhybridized probe, and measuring the chemiluminescence produced from the remaining acridinium ester in a luminometer. See, e.g., Arnold et al., U.S. Pat. No. 5,283, 174, and Nelson et al., Nonisotopic Probing, Blotting, and Sequencing, ch. 17 (Larry J. Kricka ed., 2d ed. 1995).

Hybridization Assay Probes to *M. genitalium* Ribosomal Nucleic Acid

The disclosure includes novel hybridization assay probes. Hybridization is the association of two single strands of complementary nucleic acid to form a hydrogen bonded double strand. A nucleic acid sequence able to hybridize to a nucleic acid sequence sought to be detected ("target sequence") can serve as a probe for the target sequence. Hybridization may occur between complementary nucleic acid strands, including DNA/DNA, DNA/RNA, and RNA/RNA. Two single strands of deoxyribo-(DNA) or ribo-(RNA) nucleic acid, formed from nucleotides (including the bases adenine (A), cytosine (C), thymidine (T), guanine (G), uracil (U), inosine (I), and analogs thereof, may hybridize to form a double-stranded structure in which the two strands are held together by hydrogen bonds between pairs of complementary bases. Generally, A is hydrogen-bonded to T or U, while G is hydrogen-bonded to C. At any point along the hybridized strands, therefore, the classical base pairs AT or AU, TA or UA, GC or CG may be found. Thus, when a first single strand of nucleic acid contains sufficient contiguous complementary bases to a second, and those two strands are brought together under conditions that will promote their hybridization, double-stranded nucleic acid will result. Under appropriate conditions, DNA/DNA, RNA/DNA, or RNA/RNA hybrids may be formed.

The rate and extent of hybridization is influenced by a number of factors. For instance, it is implicit that if one of the two strands is wholly or partially involved in a hybrid, it will be less able to participate in the formation of a new hybrid. By designing a probe so that a substantial portion of the sequence of interest is single-stranded, the rate and extent of hybridization may be greatly increased. Also, if the target is an integrated genomic sequence it will naturally occur in a double-stranded form, as is the case with a product of PCR. These double-stranded targets are naturally inhibitory to hybridization with a probe and require denaturation prior to the hybridization step. In addition, there can be intra-molecular hybrids formed within a probe if there is sufficient self-complementarity. Regions of the nucleic acid which are known to form strong internal structures inhibitory to hybridization are typically less preferred. Examples of such structures include hairpin loops. Undesirable secondary structure in a hybridization assay probe can be avoided through careful probe design, and commercial computer programs are available to search for these types of interactions, such as the Oligo Tech7 analysis software available from Oligo Therapeutics, Inc.

In some applications, such as homogenous assays, probes exhibiting at least some degree of self-complementarity may be desirable to facilitate detection of probe: target duplexes in a test sample. Such probes include Amolecular torches@ which are designed to include distinct regions of self-complementarity referred to as the Atarget binding domain@ and the Atarget closing domain.@ These two domains are connected by a joining region in the molecular torch and hybridize to each other under hybridization assay conditions. The joining region can be a non-nucleotide linker, such as polyethylene glycol. Molecular torches are disclosed by Becker et al., AMolecular Torches,@ U.S. Pat. No. 6,361,945.

When exposed to denaturing conditions, the two complementary regions (which may be fully or partially complementary) of the molecular torch melt, leaving the target binding domain available for hybridization to a target sequence when the original hybridization assay conditions are restored. Molecular torches are designed so that the target binding domain favors hybridization to the target sequence over the target closing domain. The target binding domain and the target closing domain of a molecular torch include interacting labels (e.g., fluorophore/quencher) positioned so that a different signal is produced when the molecular torch is self-hybridized than when the molecular torch is hybridized to a target nucleic acid, thereby permitting detection of probe: target duplexes in a test sample in the presence of unhybridized probe having viable labels associated therewith.

In accordance with the teachings of Becker et al. in U.S. Pat. No. 6,361,945, hybridization assay probes of the present disclosure may be designed and constructed to include, in addition to a Atarget binding domain@ able to distinguish between nucleic acid derived from *M. genitalium*, a Atarget closing domain,@ a Ajoining region@ and interacting labels characteristic of a molecular torch.

Another example of a self-complementary hybridization assay probe is a Amolecular beacon.@ Molecular beacons include nucleic acid molecules having a target complement sequence, an affinity pair (or nucleic acid arms) holding the probe in a closed conformation in the absence of a target nucleic acid sequence, and a label pair that interacts when the probe is in a closed conformation. Hybridization of the target nucleic acid and the target complement sequence separates the members of the affinity pair, thereby shifting the probe to an open conformation. The shift to the open conformation is detectable due to reduced interaction of the label pair, which may be, for example, a fluorophore and a quencher (e.g., DABCYL and EDANS). Examples of various molecular beacon configurations and applications are disclosed by Tyagi et al. in U.S. Pat. No. 5,925,517. In accordance with the teachings of Tyagi et al., probes according to the present disclosure may be designed and constructed to include, in addition to a Atarget complement sequence@ able to distinguish between nucleic acid derived from *M. genitalium*, an Aaffinity pair@ and dual labels characteristic of a molecular beacon.

In the case of a hybridization assay, the length of the target nucleic acid sequence and, accordingly, the length of the probe sequence can be important. In some cases, there may be several sequences from a particular region, varying in location and length, which will yield probes with the desired hybridization characteristics. In other cases, one sequence may have better hybridization characteristics than another that differs merely by a single base. While it is possible for nucleic acids that are not perfectly complementary to hybridize, the longest stretch of perfectly homologous base sequence will normally primarily determine hybrid stability. While probes of different lengths and base composition may be used, preferred probes have oligonucleotides that are up to 100 bases in length, more preferably from 12 to 50 bases in length, and even more preferably from 18 to 35 bases in length.

The hybridization assay probes include a base sequence that is substantially complementary to a 16S or 23S rRNA or rDNA target sequence present in or derived from the nucleic acid of *M. genitalium*. Thus, the probes are able to stably bind to a *M. genitalium* target sequence under stringent hybridization assay conditions. As discussed above, the hybridization assay probes may have additional base sequences which do not stably bind to the target nucleic acid.

In addition to self-complementary probes, probes of the present disclosure may be designed and constructed to include an immobilized probe binding region of a capture probe, where the immobilized probe binding region is comprised of a nucleotide base sequence which can hybridize under predetermined hybridization conditions to a substantially complementary nucleotide base sequence contained in an immobilized probe joined directly or indirectly to a solid support. Examples of solid supports and means for joining oligonucleotides to solid supports are described above in the section entitled ASample Processing.@ The immobilized probe binding region is preferably selected so that it will not stably bind under the predetermined hybridization conditions to nucleic acid from any organism which may be present in the test sample, including *M. genitalium*.

Thus, a preferred nucleotide base sequence for the immobilized probe binding region of a capture probe according to the present disclosure is a homopolymer tail, such as a 3' poly dA tail matched to a 5' poly dT tail on the immobilized probe. These tails may be of any length sufficient to facilitate stable hybridization under predetermined hybridization conditions and are preferably about 30 bases in length.

The immobilized probe is preferably joined to a magnetically attractable particle which can be isolated in a reaction vessel during a purification step once the probe has had sufficient time to hybridize to target nucleic acid present in the sample. Acosta et al., in U.S. Pat. No. 6,254,826 (AAssay Work Station@) disclose an instrument that can be used for performing such a purification step. The capture probe is preferably designed so that the melting temperature of the capture probe: target hybrid is greater than the melting temperature of the capture probe: immobilized probe hybrid. In this way, different sets of hybridization assay conditions can be employed to facilitate hybridization of the capture probe to the target nucleic acid prior to hybridization of the capture probe to the immobilized oligonucleotide, thereby maximizing the concentration of free probe and providing favorable liquid phase hybridization kinetics. This Atwo-step@ target capture method is discussed above and disclosed by Weisburg et al., U.S. Pat. No. 6,110,678. Other target capture schemes which could be readily adapted to the present disclosure are well known in the art and include, without limitation, those disclosed by the following: Dunn et al., Methods in Enzymology, AMapping viral mRNAs by sandwich hybridization,@ 65 (1): 468-478 (1980); Ranki et al., U.S. Pat. No. 4,486,539; Stabinsky, U.S. Pat. No. 4,751,177; and Becker et al., U.S. Pat. No. 6,130,038.

For *M. genitalium* probes, the terms Atarget nucleic acid sequence,@ Atarget nucleotide sequence,@ Atarget sequence@ and Atarget region@ all refer to a nucleic acid sequence present in *M. genitalium* rRNA or rDNA, or a sequence complementary thereto, which is not present in the nucleic acid of a closely related non-*M. genitalium* species.

*M. genitalium* probes of the present disclosure comprise oligonucleotides having a target binding region, where the base sequence of the target binding region is contained within a base sequence selected from the group consisting of SEQ ID NO:81, SEQ ID NO: 82, or SEQ ID NO:83. The probe preferentially hybridizes under stringent hybridization conditions to a target nucleic acid derived from *M. genitalium* over nucleic acid derived from non-*M. genitalium* organisms. The probe preferably does not include any other target complementary base sequence region overlapping with or in addition to the target binding region which is capable of forming a stable hybrid with nucleic acid derived from *M. genitalium* under the same conditions.

Once synthesized, the probes may be labeled with a detectable label or reporter group by any well-known method. For example, the probe may be labeled with a detectable moiety such as a radioisotope, antigen or chemiluminescent moiety to facilitate detection of the target sequence. Useful labels include radioisotopes as well as non-radioactive reporting groups. Isotopic labels include $^{3}$H, $^{35}$S, $^{32}$P, $^{125}$I, $^{57}$Co and $^{14}$C. Isotopic labels can be introduced into an oligonucleotide by techniques known in the art such as nick translation, end labeling, second strand synthesis, reverse transcription and by chemical methods. When using radiolabeled probes, hybridization can be detected by techniques such as autoradiography, scintillation counting or gamma counting. The chosen detection method depends on the particular radioisotope used for labeling.

Non-isotopic materials can also be used for labeling and may be introduced internally between nucleotides or at an end of the oligonucleotide. Modified nucleotides may be incorporated enzymatically or chemically. Chemical modifications of the oligonucleotide may be performed during or after synthesis of the oligonucleotide using techniques known in the art. For example, through use of non-nucleotide linker groups disclosed by Arnold et al. in U.S. Pat. No. 6,031,091. Non-isotopic labels include fluorescent molecules, chemiluminescent molecules, fluorescent chemiluminescent molecules, phosphorescent molecules, electrochemiluminescent molecules, chromophores, enzymes, enzyme cofactors, enzyme substrates, dyes and haptens or other ligands. Another useful labeling technique is a base sequence that is unable to stably bind to the target nucleic acid under stringent conditions. Probes of the present disclosure are preferably labeled with an acridinium ester which is joined to the probe by means of a non-nucleotide linker. Acridinium ester labeling techniques are disclosed by Arnold et al. in U.S. Pat. No. 5,185,439. Linking reagents are disclosed by Arnold et al. in U.S. Pat. No. 6,031,091.

In a preferred embodiment, *M. genitalium* probes according to the present disclosure comprise an oligonucleotide having a target binding region, where the base sequence of the target binding region consists of the base sequence of SEQ ID NO:1 with an acridinium ester label joined to the probe by a non-nucleotide linker positioned between nucleotides 10 and 11, or SEQ ID NO:2, and an acridinium ester label joined to the probe by a non-nucleotide linker positioned between nucleotides 6 and 7 (Target Region 1).

In another preferred embodiment, an *M. genitalium* probe according to the present disclosure comprises an oligonucleotide having a target binding region, where the base sequence of the target binding region consists of the base sequence of SEQ ID NO: 14 with an acridinium ester label joined to the probe by a non-nucleotide linker positioned between nucleotides 14 and 15 (Target Region 2).

In another preferred embodiment, an *M. genitalium* probe according to the present disclosure comprises an oligonucleotide having a target binding region, where the base sequence of the target binding region consists of the base sequence of any of SEQ ID NO: 22, SEQ ID NO:21, or SEQ ID NO:20, each with an acridinium ester label joined to the probe by a non-nucleotide linker positioned between nucleotides 13 and 14 (Target Region 3).

The selected hybridization assay probe can be contacted with a test sample suspected of containing *M. genitalium*. Generally, the test sample is from a source which also contains unknown organisms. After bringing the probe into contact with the test sample, which may include amplified nucleic acids derived from *M. genitalium*, the test sample can be incubated under conditions permitting preferential hybridization of the probe to a target nucleic acid derived from *M. genitalium* over nucleic acid derived from non-target organisms in the test sample.

After the probe has hybridized to target nucleic acid present in the test sample, the resulting hybrid may be separated and detected by various techniques well known in the art, such as hydroxyapatite adsorption and radioactive monitoring. Other techniques include those which involve selectively degrading label associated with unhybridized probe and then measuring the amount of remaining label associated with hybridized probe, as disclosed by Arnold et al. in U.S. Pat. No. 5,283,174. This latter technique is particularly preferred.

Nucleic Acid Compositions

In another related aspect, the present disclosure features compositions comprising a nucleic acid hybrid formed between a hybridization assay probe and a target nucleic acid (Aprobe: target@) under stringent hybridization assay conditions. One use of the hybrid formed between a probe and a target nucleic acid is to provide an indication of the presence or amount of a target organism or group of organisms in a test sample. For example, acridinium ester (AE) present in nucleic acid hybrids is resistant to hydrolysis in an alkali solution, whereas AE present in single-stranded nucleic acid is susceptible to hydrolysis in an alkali solution (see Arnold et al., U.S. Pat. No. 5,283,174). Thus, the presence of target nucleic acids can be detected, after the hydrolysis of the unbound AE-labeled probe, by measuring chemiluminescence of acridinium ester remaining associated with the nucleic acid hybrid.

The present disclosure also contemplates compositions comprising nucleic acid hybrids formed between a capture probe and a target nucleic acid (Acapture probe: target@) under stringent hybridization assay conditions. One use of the hybrid formed between a capture probe and a target nucleic acid is to isolate and purify the target nucleic acid in a test sample prior to amplification of a target sequence contained in the target nucleic acid or detection of the target nucleic acid in, for example, a heterogenous assay. By isolating and purifying target nucleic acid prior to amplification or detection, the opportunities for non-specific binding or amplification are significantly minimized.

The present disclosure additionally features compositions comprising a nucleic acid formed between an amplification primer and a target nucleic acid (Aprimer: target@) under amplification conditions. One use of the hybrid formed between a primer and a target nucleic acid is to provide an initiation site for a nucleic acid polymerase at the 3' end of the amplification primer. For example, a hybrid may form an initiation site for reverse transcriptase, DNA polymerases such as Taq polymerase or T4 DNA polymerase, and RNA polymerases such as T7 polymerase, SP6 polymerase, T3 polymerase and the like.

Compositions of the present disclosure include compositions for determining the presence or amount of *M. genitalium* in a test sample comprising a nucleic acid hybrid formed between a target nucleic acid derived from *M.*

*genitalium* and a probe comprising an oligonucleotide having a target binding region, where the base sequence of the target binding region consists of the base sequence of any of the probes disclosed herein. The oligonucleotides of these compositions may include at least one additional nucleotide base sequence region which does not stably bind to nucleic acid derived from *M. genitalium* under stringent hybridization conditions.

Also contemplated by the present disclosure are compositions for immobilizing a target nucleic acid derived from a *Mycoplasma* organism present in a test sample comprising a nucleic acid hybrid formed between the target nucleic acid and a capture probe having a target binding region, where the base sequence of the target binding region is at least about 85% homologous (preferably at least about 90% homologous, more preferably at least about 95% homologous, and most preferably 100% homologous) to the base sequence of any target capture oligonucleotide disclosed herein. In a further embodiment, these compositions additionally include a nucleic acid hybrid formed between an immobilized probe binding region of the capture probe and an immobilized probe.

The present disclosure further contemplates compositions for amplifying a target sequence present in a target nucleic acid derived from a *Mycoplasma* organism comprising a nucleic acid hybrid formed between the target nucleic acid and an amplification primer comprising an oligonucleotide having a target binding region of 12-30 bases in length, where the base sequence of the target binding region is at least about 80% homologous (preferably at least about 90% homologous and more preferably 100% homologous) to the base sequence of any of Target Region 1 (SEQ ID NO:81), Target Region 2 (SEQ ID NO: 82), or Target Region 3 (SEQ ID NO:83), or the complement thereof. The amplification primer of these compositions optionally includes a 5' sequence which is recognized by an RNA polymerase or which enhances initiation or elongation by an RNA polymerase. When included, a T7 promoter, such as the nucleotide base sequence of SEQ ID NO: 80, is preferred.

Assay Methods

The present disclosure contemplates various methods for assaying for the presence or amount of nucleic acid derived from *M. genitalium* in a test sample. One skilled in the art will understand that the exact assay conditions, probes and/or primers used will vary depending on the particular assay format used and the source of the sample.

One aspect of the present disclosure relates to a method for determining the presence or amount of *M. genitalium* in a test sample by contacting the test sample under stringent hybridization assay conditions with a hybridization assay probe capable of preferentially hybridizing under stringent hybridization conditions to nucleic acid derived from *M. genitalium* over nucleic acid derived from non-*M. genitalium* organisms present in the test sample. The probes of this method may include at least one additional base sequence region which does not stably bind to nucleic acid derived from *M. genitalium* under stringent hybridization conditions.

A further aspect of the present disclosure relates to a method for amplifying nucleic acid derived from a *Mycoplasma* organism present in a test sample by contacting the test sample under amplification conditions with one or more amplification primers, where each amplification primer comprises an oligonucleotide having a target binding region, where the base sequence of the target binding region has or substantially corresponds to the base sequence of the oligonucleotide primers presented in Table 2. The amplification primers of this embodiment optionally include a 5' sequence which is recognized by an RNA polymerase or which enhances initiation or elongation by an RNA polymerase. When included, a T7 promoter, such as the nucleotide base sequence of SEQ ID NO:80, is preferred. Particular combinations of amplification primers which can be used in this method for amplifying are set forth in the section entitled AAmplification of *Mycoplasma* Ribosomal Nucleic Acid.@

In a preferred embodiment, the method for amplifying *Mycoplasma*-derived nucleic acid in a test sample further includes the step of contacting the test sample under stringent hybridization assay conditions with a hybridization assay probe capable of preferentially hybridizing to an amplified *M. genitalium* target nucleic acid over nucleic acids from non-*M. genitalium* organisms present in the test sample under the stringent conditions. While the test sample is generally contacted with the hybridization assay probe after a sufficient period for amplification has passed, the amplification primers and hybridization assay probe may be added to the sample in any order, especially where the hybridization assay probe is a self-hybridizing probe, such as a molecular torch or a molecular beacon. Molecular beacons may be particularly useful for real-time detection of the target nucleic acid.

The test sample is contacted with a hybridization assay probe so that the presence or amount of *M. genitalium* in the test sample can be determined.

Still another aspect of the present disclosure relates to a method for immobilizing a target nucleic acid derived from a *Mycoplasma* organism in a test sample which comprises providing to the test sample a capture probe having a target binding region and an immobilized probe binding region under a first set of hybridization conditions permitting the capture probe to stably bind the target nucleic acid, thereby forming a capture probe: target complex, and a second set of hybridization conditions permitting the capture probe to stably bind to an immobilized probe in the test sample, thereby forming an immobilized probe: capture probe: target complex. The first and second sets of hybridization conditions may be the same or different and the capture probe: target complex remains stable under the second set of hybridization conditions. The target binding region of this capture probe comprises a base sequence region which is at least about 85% homologous (preferably at least about 90% homologous, more preferably at least about 95% homologous, and most preferably 100% homologous) to the base sequence of SEQ ID NO: 54, SEQ ID NO:55, SEQ ID NO:56, SEQ ID NO:57, SEQ ID NO:58, SEQ ID NO:59, SEQ ID NO:60, SEQ ID NO:61, SEQ ID NO: 62, SEQ ID NO:63, SEQ ID NO:64, SEQ ID NO: 65, or SEQ ID NO:66. Oligonucleotide segments incorporating these target binding region sequences can be synthesized to include 2'-O-methyl substitutions (sometimes "2' methoxy" or "2'OMe") on the sugar residues of the oligonucleotide backbone.

A purifying step preferably follows the immobilizing step to remove one or more components of the test sample which might interfere with or prevent amplification or specific detection of a target sequence contained in the immobilized target nucleic acid. This method for immobilizing and optionally purifying a *Mycoplasma*-derived nucleic may precede any of the methods described above for amplifying and/or detecting the presence of a target nucleic acid derived from *M. genitalium*. If a purifying step is included, the target nucleic acid may be indirectly eluted from the immobilized probe or directly eluted from the capture probe of the immobilized probe: capture probe: target complex by altering the sample conditions prior to amplifying or detecting the target sequence.

Diagnostic Systems

The present disclosure also contemplates diagnostic systems in kit form. A diagnostic system of the present disclosure may include a kit which contains, in an amount sufficient for at least one assay, any of the hybridization assay probes, capture probes and/or amplification primers of the present disclosure in a packaging material. Typically, the kits will also include instructions recorded in a tangible form (e.g., contained on paper or an electronic medium) for using the packaged probes and/or primers in an amplification and/or detection assay for determining the presence or amount of M. genitalium in a test sample.

The various components of the diagnostic systems may be provided in a variety of forms. For example, the required enzymes, the nucleotide triphosphates, the probes and/or primers may be provided as a lyophilized reagent. These lyophilized reagents may be pre-mixed before lyophilization so that when reconstituted they form a complete mixture with the proper ratio of each of the components ready for use in the assay. In addition, the diagnostic systems of the present disclosure may contain a reconstitution reagent for reconstituting the lyophilized reagents of the kit. In preferred kits for amplifying target nucleic acid derived from M. genitalium, the enzymes, nucleotide triphosphates and required cofactors for the enzymes are provided as a single lyophilized reagent that, when reconstituted, forms a proper reagent for use in the present amplification methods. In these kits, a lyophilized primer reagent may also be provided. In other preferred kits, lyophilized probe reagents are provided.

Typical packaging materials would include solid matrices such as glass, plastic, paper, foil, micro-particles and the like, capable of holding within fixed limits hybridization assay probes, capture probes and/or amplification primers of the present disclosure. Thus, for example, the packaging materials can include glass vials used to contain sub-milligram (e.g., picogram or nanogram) quantities of a contemplated probe or primer, or they can be microtiter plate wells to which probes or primers of the present disclosure have been operatively affixed, i.e., linked so as to be capable of participating in an amplification and/or detection method of the present disclosure.

The instructions will typically indicate the reagents and/or concentrations of reagents and at least one assay method parameter which might be, for example, the relative amounts of reagents to use per amount of sample. In addition, such specifics as maintenance, time periods, temperature and buffer conditions may also be included.

The diagnostic systems of the present disclosure contemplate kits having any of the hybridization assay probes, capture probes and/or amplification primers described herein, whether provided individually or in one of the preferred combinations described above, for use in amplifying and/or determining the presence or amount of M. genitalium in a test sample.

Examples are provided below illustrating different aspects and embodiments of the disclosure. Skilled artisans will appreciate that these examples are not intended to limit the disclosure to the specific embodiments described therein.

Organism Lysis

Whole cells in the Examples below were chemically lysed using procedures familiar to those having an ordinary level of skill in the art.

Target Capture Assay

Certain Examples which follow incorporated a target capture step to isolate and purify target nucleic acid prior to amplification of a target nucleic acid sequence. The capture probes of these examples had 5' target binding regions having the base sequences indicated in Table 2, and further included a 3' immobilized probe binding region having a poly dA tail 30 nucleotides in length, also as indicated in Table 2. The target binding region of the capture probe was designed to bind to a region of the target nucleic acid distinct from the regions bound by the primer, promoter-primer and hybridization assay probe. The solid support of this target capture assay can be a Sera-Mag™ MG-CM Carboxylate Modified (Seradyn, Inc.; Indianapolis, Indiana; Cat. No. 24152105-050450), 1 micron, super-paramagnetic particle having a covalently bound oligo (dT) 14 which was able to bind to the poly dA tail of the capture probe under hybridization conditions. Similar magnetic particles are disclosed by Sutor, AProcess for Preparing Magnetically Responsive Microparticles,@ U.S. Pat. No. 5,648,124. To draw the particles out of suspension and immobilize them along the inner wall of the sample tubes, the tubes were transferred to a magnetic separation rack disclosed by Acosta et al. in U.S. Pat. No. 6,254,826. While the particles were immobilized, fluid was aspirated from the tubes and the tubes were washed with the Wash Buffer described below. The wash step can be repeated before adding the below-described Amplification Reagent and the Enzyme Reagent for amplifying the target sequence. Between wash steps, the particles can be resuspended in the Wash Buffer.

Transcription-Mediated Amplification

Amplification of a target sequence in the following Examples was a transcription-mediated amplification (TMA) procedure disclosed by, for example, Kacian et al. in U.S. Pat. Nos. 5,399,491 and 5,480,784 and by LEE ET AL., supra, ch. 8. TMA is an isothermal amplification procedure which allows for a greater than one billion-fold increase in copy number of the target sequence using reverse transcriptase and RNA polymerase (see Enzyme Reagents below). A TMA reaction involves converting a single-stranded target sequence to a double-stranded DNA intermediate by reverse transcriptase in the presence of a sense primer and an antisense primer having a 5'RNA polymerase-specific promoter sequence. Included in this DNA intermediate is a double-stranded promoter sequence which is recognized by RNA polymerase and transcribed into hundreds of copies of RNA. Each of these transcribed RNA molecules, in turn, can be converted to a double-stranded DNA intermediate which is used for producing additional RNA. Thus, the TMA reaction proceeds exponentially. The particulars of the TMA reactions used in the following examples are set forth below.

Hybridization Assay Probes

Featured in the Examples are hybridization assay probes having the nucleotide sequences indicated in Table 1. All of the hybridization assay probes described below, as well as the capture probes, primers and promoter-primers, were synthesized using standard phosphoramidite chemistry using standard procedures well known in the art. See, e.g., Caruthers et al., Methods in Enzymol., 154:287 (1987). Synthesis was performed using an Expedite™ 8909 Nucleic Acid Synthesizer (Applied Biosystems; Foster City, CA). Hybridization assay probes were also synthesized to include a non-nucleotide linker, as described by Arnold et al. in U.S. Pat. No. 6,031,091, and labeled with a chemiluminescent acridinium ester, as described by Arnold et al. in U.S. Pat. No. 5,185,439. The reactivity and specificity of these probes was demonstrated using a single phase homogeneous assay format, essentially as disclosed by Arnold et al. in U.S. Pat. No. 5,283,174. All probe hybridization results are given in relative light units (RLU), which is a measure of the photons detected by a luminometer.

Three different oligonucleotide systems were developed for detecting ribosomal nucleic acids of M. genitalium. These included probes, primers, capture oligonucleotides, and combinations thereof. Details for each of the three systems are given in the following Examples.

Example 1 describes procedures used for assessing background signal levels and specificity for probe candidates in each of three different target regions of M. genitalium ribosomal nucleic acid. In these procedures, AE-labeled probes were first hybridized to complementary in vitro amplification products created using M. genitalium 16S or 23S rRNA as templates, followed by chemiluminescent signal determination with and without a standard selection step to inactivate AE label associated with unhybridized probe. Probes having beneficial properties exhibited high signals in the presence of nucleic acids derived from M. genitalium, and low signals in the absence of nucleic acids derived from M. genitalium.

Example 1 describes procedures used to assess background signal levels and specificity for probe candidates in each of three different target regions of M. genitalium ribosomal nucleic acid. In all instances, detection probes included oligonucleotides of about 15 to 30 nucleotides in length having an attached label that was detected in a homogeneous reaction (i.e., one not requiring separation of bound and unbound probes). Preferred probes include an attached chemiluminescent label (e.g., where differential hydrolysis can be used in the process of distinguishing bound and unbound probes). Preferably, an acridinium ester label (e.g., an AE compound as disclosed in U.S. Pat. Nos. 5,185,439, 5,639,604, 5,585,481, and 5,656,744) is attached to a central region of the probe using a non-nucleotide linker, such as one of those described in U.S. Pat. Nos. 5,585,481 and 5,656,744. Probes having beneficial properties advantageously exhibited high signals when hybridized to a complementary target, and low signals in the absence of the complementary target.

Example 1

Differential Hydrolysis Properties of Various Hybridization Probes

Key functional parameters, including specificity and background signal production, of hybridization probes were assessed using bacterial lysates as sources of rRNA target nucleic acids. In all instances, rRNA targets underwent in vitro amplification to better reflect use of the different detection systems. Specificity was evaluated using a lysate of M. pneumoniae (a close phylogenetic relative of M. genitalium) as the source of rRNA that underwent in vitro amplification. M. genitalium cell lysate was delivered to reaction tubes in amounts that provided 20 copies rRNA for each reaction, while negative control reactions (i.e., containing 0 copies of the rRNA) did not receive any lysate. Parallel trials to assess probe specificity used M. pneumoniae lysate in place of the M. genitalium cell lysate, where each reaction included $2 \times 10^6$ copies of rRNA of M. pneumoniae. Each tube then received 100 µl Target Capture Reagent (TCR) and 1-10 pmol of two Target Capture Oligos (TCOs) that hybridized in the regions adjacent to the sequences to be amplified. The TCR included about 25 µg of 0.7-1.05 micron paramagnetic particles (Seradyn, Indianapolis, IN) covalently linked to poly-$(dT_{14})$. The TCR further included a 250 mM HEPES-buffered solution containing lithium lauryl sulfate, lithium chloride, and EDTA. A 5'-TTT-3' spacer sequence was interposed between the M. genitalium-complementary sequence and the oligo-(dA) tail region for each of the capture oligonucleotides. Tubes were incubated at 62° C. for 35 minutes, and then incubated at 23° C. for 30 minutes. Tube racks were placed on a magnetic base for 5 minutes, allowing aggregation of the magnetic beads bound to the TCO and to M. genitalium rRNA on the sides of the tubes. The solution was aspirated, then 1.0 ml of an aqueous Wash Solution was added. Wash solution included 10 mM HEPES (pH 7.5), 6.5 mM NaOH, 1 mM EDTA, 0.3% (v/v) ethanol, 0.02% (w/v) methyl-paraben, 0.01% (w/v) poly-paraben, 150 mM NaCl, 0.1% (w/v) sodium lauryl sulfate). Tubes were vortexed and placed on the magnetic base once more for 5 minutes before a second aspiration. Next, each tube received 75 µl of a HEPES-buffered Amplification Reagent that included trehalose, ethyl alcohol, methyl paraben, propyl paraben, phenol red, KCl, 2-12 mM of each of four NTPs, 0.5 mM of each of four dNTPs, $MgCl_2$, 10-15 pmol of a specific T7 primer, 10-15 pmol of a specific nT7 primer, and 200 µl of an inert Oil Reagent to control evaporation. Amplification primers, which were designed to specific for hybridization to M. genitalium nucleic acid sequences, flanked each region of interest. Reaction tubes were vortexed and then incubated at 62° C. for 10 minutes, followed by a ramp to 42° C. Next, the tubes received 25 µl of an Enzyme Reagent that included Moloney Murine Leukemia Virus (MMLV) reverse transcriptase and T7 RNA polymerase. Tubes were vortexed and incubated at 42° C. for 60 minutes to permit amplification reactions to occur. Thereafter, each tube was provided with 10 fmol AE-labeled probe and 100 µl of a Hybridization Reagent (pH 4.70) that included succinic acid, lithium lauryl sulfate, lithium hydroxide, aldrithiol-2, lithium chloride, EDTA, ethyl alcohol. Hybridization reactions were facilitated by incubating the tubes with shaking at 62° C. for 20 minutes, followed by cooling at ambient temperatures for 5 minutes. Next, 250 µl Selection Reagent (pH 8.5) that included boric acid, sodium hydroxide, and 1% TRITON X-100 (Union Carbide Corporation; Danbury, CT) was added to each tube. The contents of the tubes were mixed and incubated at 62° C. for 10 minutes to hydrolyze acridinium ester labels associated with unhybridized probe, and then cooled to 23° C. Samples were then analyzed in a LEADER® HC+ luminometer (Gen-Probe Incorporated) equipped for automatic injection of 1 mM nitric acid and 0.1% (v/v) hydrogen peroxide, followed by injection of a solution containing 1 N sodium hydroxide. Results for the chemiluminescent reactions were measured in relative light units (RLU). Results of the procedure are presented in Table 1. Where indicated in the table, "N/A" means results were not available.

TABLE 1

Probe Sensitivity and Specificity Testing

| Probe | M. genitalium lysate (20 rRNA copies) (RLU) | M. pneumoniae lysate ($2 \times 10^6$ rRNA copies) (RLU) | Neg. Control (RLU) |
|---|---|---|---|
| Target Region 1 | | | |
| SEQ ID NO: 1 | 823,250 | N/A | 750 |
| SEQ ID NO: 2 | 876,875 | 0 | 0 |

TABLE 1-continued

Probe Sensitivity and Specificity Testing

| Probe | M. genitalium lysate (20 rRNA copies) (RLU) | M. pneumoniae lysate (2 × 10⁶ rRNA copies) (RLU) | Neg. Control (RLU) |
|---|---|---|---|
| SEQ ID NO: 3 | 903,667 | 9,750 | 0 |
| SEQ ID NO: 4 | 735,500 | 48,500 | 0 |
| SEQ ID NO: 5 | 787,000 | N/A | 8,833 |
| SEQ ID NO: 6 | 543,500 | N/A | 6,500 |
| SEQ ID NO: 7 | 425,000 | N/A | 13,500 |
| Target Region 2 | | | |
| SEQ ID NO: 8 | 596,710 | 2,571 | 2,329 |
| SEQ ID NO: 9 | 131,364 | 105,847 | 497 |
| SEQ ID NO: 10 | 117,873 | 328,269 | 824 |
| SEQ ID NO: 11 | 280,699 | 481,436 | 827 |
| SEQ ID NO: 12 | 1,299,139 | 411,387 | 1,591 |
| SEQ ID NO: 13 | 333,152 | 1,574,731 | 3,955 |
| SEQ ID NO: 14 | 1,647,135 | 2,900 | 1,776 |
| Target Region 3 | | | |
| SEQ ID NO: 15 | 1,098,048 | 132,593 | 22,701 |
| SEQ ID NO: 16 | 561,912 | 20,914 | 13,877 |
| SEQ ID NO: 17 | 1,065,630 | 39,448 | 1,887 |
| SEQ ID NO: 18 | 419,443 | 14,828 | 1,158 |
| SEQ ID NO: 19 | 1,421,782 | 40,198 | 3,188 |
| SEQ ID NO: 20 | 899,611 | 7,132 | 3,533 |
| SEQ ID NO: 21 | 913,786 | 5,030 | 3,673 |
| SEQ ID NO: 22 | 1,261,352 | 4,875 | 3,345 |

Results presented in Table 1 confirmed that certain probes exhibited performance characteristics that were superior to others. For example, the Target Region 1 probe identified as SEQ ID NO:2 advantageously gave very low signals in the absence of added nucleic acids, very low signal in the presence of amplified M. pneumoniae nucleic acids, and very high signal in the presence of M. genitalium target nucleic acids. This was characteristic of a highly specific probe yielding an exceptional signal: noise ratio. Similarly, the Target Region 2 probes identified as SEQ ID NO:14 and SEQ ID NO:8 both exhibited relatively low signals in the absence of added nucleic acids, low signals in the presence of amplified M. pneumoniae nucleic acids, and relatively high signals in the presence of M. genitalium target nucleic acids. The target-specific signal measured for the probe of SEQ ID NO:14 was exceptionally high. Likewise, the Target Region 3 probe identified as SEQ ID NO:22 exhibited a relatively low background signal in the absence of added nucleic acids, low signal in the presence of amplified M. pneumoniae nucleic acids, and high signal in the presence of M. genitalium target nucleic acids. Each of these probes exhibited exceptional properties making them useful for specific detection of M. genitalium nucleic acids.

While different hybridization probes can be used for detecting nucleic acids according to the disclosure, certain probes were particularly desirable. In certain preferred embodiments, Target Region 1 probes include the base sequence of SEQ ID NO:86 or the complement thereof, allowing for substitution of DNA and RNA equivalent bases (i.e., T and U substitutions). In certain preferred embodiments, Target Region 2 probes include the base sequence of SEQ ID NO:89 or the complement thereof, allowing for substitution of DNA and RNA equivalent bases (i.e., T and U substitutions). In certain preferred embodiments, Target Region 3 probes include the base sequence of SEQ ID NO:92 or the complement thereof, allowing for substitution of DNA and RNA equivalent bases (i.e., T and U substitutions).

Example 2 describes the methods that identified amplification primers that can be used for detecting M. genitalium nucleic acids in each of the three target regions described herein.

Example 2

Identification of Amplification Primers

A bacterial lysate served as the source of M. genitalium template sequences in amplification reactions that employed paired sets of primers. The volume of lysate used in the procedure was sufficient to provide approximately 20 copies of each rRNA target nucleic acid for each reaction. Nucleic acids underwent specimen processing and target capture prior to amplification essentially according to the procedures disclosed in published International Patent Application No. PCT/US2000/18685, except that the template was captured using M. genitalium-specific oligonucleotides rather than HIV-specific oligonucleotides. Capture oligonucleotides employed in the procedure are identified in Table 2, and were used were used in amounts corresponding to about 2-5 pmol for each reaction. TMA reactions using captured and washed template nucleic acids were carried out essentially as described by Kacian et al., in U.S. Pat. No. 5,399,491, the disclosure of this U.S. patent is incorporated by reference. Each promoter-primer included a T7 promoter sequence AATTTAATACGACTCACTATAGGGAGA (SEQ ID NO:80) upstream of a sequence complementary to an M. genitalium rRNA target. Amplification reactions were conducted for various primer combinations, where reactions included 10-15 pmols of each primer. Target nucleic acids and primers were annealed and amplification reactions were prepared as described in Example 1. After a one hour incubation at 42° C., the entire 100 µl amplification reaction was subjected to a hybridization assay, also as described in Example 1. To illustrate the procedure for identifying useful amplification primers, only a single hybridization probe was used for each different target region. Detection of amplification reaction products for Target Region 1 was performed using the probe SEQ ID NO:2; and detection of amplification reaction products for Target Region 2 was performed using the probe SEQ ID NO:14. Detection of amplification reaction products for Target Region 3 was performed using a variety of different probes. Probes were labeled with acridinium ester to a specific activity of about $1.5 \times 10^8$ RLU/pmol, and then used in an amount equivalent to $2 \times 10^6$ RLU for each hybridization reaction. Trials were conducted using replicates of 2-20. To be judged as a positive result, either the chemiluminescent signal indicating probe hybridization must have exceeded 50,000 RLU in an assay, or the signal-to-noise ratio (where background noise was measured in a negative amplification control reaction) must have been at least 30.

Table 2 presents results from the amplification procedures using different combinations of amplification primers and capture oligonucleotides. Results in the last column of the table show the number of positive trials and the number of replicate trials used in the procedures.

TABLE 2

Amplification of *M. genitalium* Polynucleotide Sequences Using Various Primer Combinations

| Target Region | First Strand Primer Target-Complementary Sequence (T7 promoter primer) | Opposite Strand Primer | Target Capture Oligo(s) Target Binding Region (Full TCO Sequence) | # Positive/ # Tested |
|---|---|---|---|---|
| 1 | SEQ ID NO: 23 (SEQ ID NO: 33) | SEQ ID NO: 43 | SEQ ID NO: 54 (SEQ ID NO: 67) | 27/40 |
|  |  | SEQ ID NO: 44 | SEQ ID NO: 54 (SEQ ID NO: 67) | 3/4 |
|  |  | SEQ ID NO: 45 | SEQ ID NO: 55 (SEQ ID NO: 68) | 6/6 |
|  |  | SEQ ID NO: 45 | SEQ ID NO: 54 (SEQ ID NO: 67) | 6/6 |
|  |  | SEQ ID NO: 45 | SEQ ID NO: 56 (SEQ ID NO: 69) | 6/6 |
|  |  | SEQ ID NO: 45 | SEQ ID NO: 57 (SEQ ID NO: 70) | 6/6 |
| 2 | SEQ ID NO: 24 (SEQ ID NO: 34) | SEQ ID NO: 46 | SEQ ID NO: 58 (SEQ ID NO: 71) | 0/2 |
|  |  | SEQ ID NO: 47 | SEQ ID NO: 58 (SEQ ID NO: 71) | 2/2 |
|  |  | SEQ ID NO: 48 | SEQ ID NO: 58 (SEQ ID NO: 71) | 2/2 |
|  | SEQ ID NO: 25 (SEQ ID NO: 35) | SEQ ID NO: 46 | SEQ ID NO: 58 (SEQ ID NO: 71) | 2/2 |
|  |  | SEQ ID NO: 49 | SEQ ID NO: 58 (SEQ ID NO: 71) | 2/2 |
|  |  | SEQ ID NO: 48 | SEQ ID NO: 58 (SEQ ID NO: 71) | 2/2 |
|  | SEQ ID NO: 26 (SEQ ID NO: 36) | SEQ ID NO: 49 | SEQ ID NO: 58 (SEQ ID NO: 71) | 0/2 |
|  |  | SEQ ID NO: 50 | SEQ ID NO: 58 (SEQ ID NO: 71) | 0/2 |
|  | SEQ ID NO: 27 (SEQ ID NO: 37) | SEQ ID NO: 47 | SEQ ID NO: 58 (SEQ ID NO: 71) | 1/2 |
|  |  | SEQ ID NO: 50 | SEQ ID NO: 58 (SEQ ID NO: 71) | 2/2 |
|  | SEQ ID NO: 25 (SEQ ID NO: 35) | SEQ ID NO: 47 | SEQ ID NO: 58 (SEQ ID NO: 71) | 7/9 |
|  |  | SEQ ID NO: 47 | SEQ ID NO: 59 (SEQ ID NO: 72) | 8/9 |
|  |  | SEQ ID NO: 47 | SEQ ID NO: 60 (SEQ ID NO: 73) | 9/9 |
|  |  | SEQ ID NO: 47 | SEQ ID NO: 61 (SEQ ID NO: 74) | 9/9 |
|  |  | SEQ ID NO: 47 | SEQ ID NO: 62 (SEQ ID NO: 75) | 8/9 |
| 3 | SEQ ID NO: 28 (SEQ ID NO: 38) | SEQ ID NO: 51 | SEQ ID NO: 63 (SEQ ID NO: 76) | 4/4 |
|  | SEQ ID NO: 29 (SEQ ID NO: 39) | SEQ ID NO: 51 | SEQ ID NO: 63 (SEQ ID NO: 76) | 4/4 |
|  | SEQ ID NO: 30 (SEQ ID NO: 40) | SEQ ID NO: 51 | SEQ ID NO: 63 (SEQ ID NO: 76) | 4/4 |
|  | SEQ ID NO: 31 (SEQ ID NO: 41) | SEQ ID NO: 51 | SEQ ID NO: 63 (SEQ ID NO: 76) | 0/4 |
|  | SEQ ID NO: 32 (SEQ ID NO: 42) | SEQ ID NO: 51 | SEQ ID NO: 63 (SEQ ID NO: 76) | 3/4 |
|  | SEQ ID NO: 32 (SEQ ID NO: 42) | SEQ ID NO: 51 | SEQ ID NO: 64 (SEQ ID NO: 77) | 4/4 |
|  | SEQ ID NO: 29 (SEQ ID NO: 39) | SEQ ID NO: 51 | SEQ ID NO: 64 (SEQ ID NO: 77) | 6/6 |
|  |  | SEQ ID NO: 51 | SEQ ID NO: 65 (SEQ ID NO: 78) | 5/6 |
|  |  | SEQ ID NO: 51 | SEQ ID NO: 63 (SEQ ID NO: 76) | 6/6 |
|  |  | SEQ ID NO: 52 | SEQ ID NO: 63 (SEQ ID NO: 76) | 15/16 |
|  |  | SEQ ID NO: 52 | SEQ ID NO: 66 (SEQ ID NO: 79) | 9/16 |

TABLE 2-continued

Amplification of *M. genitalium* Polynucleotide Sequences Using Various Primer Combinations

| Target Region | First Strand Primer Target-Complementary Sequence (T7 promoter primer) | Opposite Strand Primer | Target Capture Oligo(s) Target Binding Region (Full TCO Sequence) | # Positive/ # Tested |
|---|---|---|---|---|
| | | SEQ ID NO: 53 | SEQ ID NO: 63 (SEQ ID NO: 76) | 13/16 |
| | | SEQ ID NO: 53 | SEQ ID NO: 66 (SEQ ID NO: 79) | 11/16 |

The results presented in Table 2 showed that many of the primer combinations gave very high levels of *M. genitalium* detectability. Even primer combinations that gave low, but measurable levels of *M. genitalium* detectability in the results presented herein indicated successful amplification of *M. genitalium* templates and established the combination as a useful component of an *M. genitalium* nucleic acid amplification assay.

Example 3 describes results from comparison testing of a commercially available TMA assay for detecting *M. genitalium* and three alternative assays using the above-described oligonucleotide reagents and methods on an automated platform. As referenced below, the "Alt-1" assay amplified and detected *M. genitalium* nucleic acids in Target Region 1; the "Alt-2" assay amplified and detected *M. genitalium* nucleic acids in Target Region 2; and the "Alt-3" assay amplified and detected *M. genitalium* nucleic acids in Target Region 3.

Example 3

Analytical Sensitivity and Specificity of TMA Assays for *M. genitalium*

Analytical sensitivities of different TMA assays for detecting *M. genitalium* were assessed using the following test samples: vaginal swabs, female urine, male urine, and penile swabs. Three alternative TMA assays for detecting *M. genitalium*, based on the reagents and procedures disclosed in the preceding Examples, were compared with the TMA-based APTIMA™ *M. genitalium* Assay (Hologic, Inc.; Marlborough, MA).

The three "comparator" assays (i.e., the Alt-1, Alt-2, and Alt-3 assays) employed sets of oligonucleotide reagents disclosed above, and summarized in Table 3.

TABLE 3

Three Comparator Assays

| | Comparator Assay Name | | |
|---|---|---|---|
| Oligo Reagent | Alt TMA-1 | Alt TMA-2 | Alt TMA-3 |
| TCO (1) Target Complementary Sequence (Full Sequence) | SEQ ID NO: 55 (SEQ ID NO: 68) | SEQ ID NO: 60 (SEQ ID NO: 73) | SEQ ID NO: 63 (SEQ ID NO: 76) |
| TCO (2) Target Complementary Sequence (Full Sequence) | SEQ ID NO: 57 (SEQ ID NO: 70) | SEQ ID NO: 61 (SEQ ID NO: 74) | SEQ ID NO: 65 (SEQ ID NO: 78) |
| T7 promoter-primer Target Complementary Sequence (Full Sequence) | SEQ ID NO: 23 (SEQ ID NO: 33) | SEQ ID NO: 25 (SEQ ID NO: 35) | SEQ ID NO: 29 (SEQ ID NO: 39) |
| Non-T7 primer | SEQ ID NO: 45 | SEQ ID NO: 47 | SEQ ID NO: 52 |
| Probe | SEQ ID NO: 2 | SEQ ID NO: 14 | SEQ ID NO: 22 |

Sample processing, nucleic acid amplification by TMA, and chemiluminescent detection were all performed using a PANTHER™ automated in vitro diagnostic analyzer (Hologic, Inc.; Marlborough, MA), APTIMA™ *M. genitalium* Assay reagents, and oligonucleotide reagents shown in Table 3. Analytical sensitivity at the 95% limit of detection was determined by standard Probit analysis of serial dilutions of *M. genitalium* lysate and in vitro transcript in screened-negative clinical specimen matrix or Specimen Transport Medium (STM), respectively. "STM" refers to a phosphate-buffered detergent solution which, in addition to lysing cells, protects released RNA by inhibiting the activity of RNases that may be active in the sample undergoing testing. Preferred detergents that may be used in STM include sodium dodecyl sulfate (SDS) and lithium lauryl sulfate (LLS). Analytical specificity was determined by testing 16 panels consisting of 54 non-target bacteria, protozoa, and viruses. Specificity panels were tested in the absence and presence of low titer *M. genitalium* to evaluate potential assay cross-reactivity and interference. Clinical performance of the three assays was determined by testing residual vaginal swabs and female and male urine specimens (N=1,400) obtained from adults from several U.S. clinical sites. Agreement between the APTIMA™ *M. genitalium* Assay and the three comparator TMA assays was determined individually as well as using a composite determination based on the consensus result of the three assays. Results are presented in Tables 4 and 5.

TABLE 4

Analytical Sensitivity of TMA Assays for *M. genitalium* in Clinical Specimen Matrices

| Specimen Matrix | *M. genitalium* Lysate, cell equivalents/ml (95% confidence interval) | | | |
| --- | --- | --- | --- | --- |
| | APTIMA™ *M. genitalium* Assay | Alt TMA-1 | Alt TMA-2 | Alt TMA-3 |
| Vaginal Swab | 0.040 | 0.035 | 0.017 | 0.029 |
| Female Urine | 0.035 | 0.017 | 0.019 | 0.024 |
| Male Urine | 0.028 | 0.027 | 0.030 | 0.025 |
| Penile Swab | 0.026 | 0.034 | 0.020 | 0.026 |

TABLE 5

Analytical Sensitivity of TMA Assays for *M. genitalium* Using in vitro Transcripts

| Specimen Matrix | In vitro Transcript RNA (copies/ml) at 95% confidence interval | | | |
| --- | --- | --- | --- | --- |
| | APTIMA™ *M. genitalium* Assay | Alt TMA-1 | Alt TMA-2 | Alt TMA-3 |
| STM | 16.5 | 61.9 | 23.5 | 20.9 |

Results of these procedures confirmed that the three comparator assays were very sensitive. Analytical sensitivity of the three comparator assays using *M. genitalium* lysate in clinical specimen matrix ranged from 0.0027 to 0.0057 CFU/ml. Sensitivity with in vitro transcripts in STM ranged from 23.5 to 61.9 RNA copies/ml. Positive, negative, and overall agreements between the APTIMA™ *M. genitalium* Assay and the three-assay composite comparator was 98.8%, 100%, and 99.9%, respectively. In this analysis, consensus was determined by the same result reported for any two of the three Alt TMA assays. Of the 1,400 specimens tested, only one specimen yielded a discordant result between the APTIMA™ *M. genitalium* Assay and the composite comparator.

The results further confirmed that neither the APTIMA™ *M. genitalium* Assay nor any of the three comparator assays detected nucleic acids of any of 54 tested organisms. Microorganisms tested for cross-reactivity included: *Acinetobacter lwoffi, Actinomyces israelii, Alcaligenes faecalis, Atopobium vaginae, Bacteroides fragilis, Bifidobacterium adolescentis, Campylobacter jejuni, Candida albicans, Chlamydia trachomatis, Clostridium difficile, Corynebacterium genitalium, Cryptococcus neoformans, Cytomegalovirus, Enterobacter cloacae, Enterococcus faecalis, Escherichia coli, Fusobacterium nucleatum, Gardnerella vaginalis, Haemophilus ducreyi,* Herpes simplex virus I, Herpes simplex virus II, HIV, *Klebsiella pneumoniae, Lactobacillus acidophilus, Lactobacillus crispatus, Leptotrichia buccalis, Listeria monocytogenes, Mobiluncus curtisii, Neisseria gonorrhoeae, Finegoldia magna, Prevotella bivia, Propionibacterium acnes, Proteus vulgaris, Pseudomonas aeruginosa, Staphylococcus aureus, Staphylococcus epidermis, Streptococcus agalactiae, Streptococcus pyogenes, Trichomonas vaginalis, Ureaplasma parvum, Ureaplasma urealyticum, Mycoplasma hominis, Mycoplasma pneumoniae,* HPV 6, HPV 11, HPV 16 (SiHa cells), HPV 18 (HeLa cells), HPV 58, HPV 39, HPV 51, *Chromobacterium violaceum, Elizabethkingia meningosepticum, Pentatrichomonas hominis,* Megasphaera type 1, and a "no microorganism control" (i.e., matrix only).

All of the compositions, kits, and methods disclosed and claimed herein can be made and executed without undue experimentation in light of the present disclosure. While the disclosure describes preferred embodiments, it will be apparent to those of skill in the art that variations may be applied without departing from the spirit and scope of the disclosure. All such variations and equivalents apparent to those skilled in the art, whether now existing or later developed, are deemed to be within the spirit and scope of the disclosure.

All patents, patent applications, and publications mentioned in the specification are indicative of the levels of those of ordinary skill in the art to which the disclosure pertains. All patents, patent applications, and publications are herein incorporated by reference in their entirety for all purposes and to the same extent as if each individual publication was specifically and individually indicated to be incorporated by reference in its entirety for any and all purposes.

While the present disclosure has been described and shown in considerable detail with reference to certain preferred embodiments, those skilled in the art will readily appreciate other embodiments of the present disclosure. Accordingly, the present disclosure is deemed to include all modifications and variations encompassed within the spirit and scope of the following appended claims.

What is claimed is:

1. An oligonucleotide probe for detecting nucleic acids of *Mycoplasma genitalium*, consisting of:
   a target-hybridizing sequence of bases consisting of SEQ ID NO:2 in which thymines may optionally be substituted with uracils, with a non-nucleotide linker positioned between bases 6 and 7 of SEQ ID NO:2; and
   a detectable label attached to the non-nucleotide linker.

2. The oligonucleotide probe of claim 1, wherein the detectable label comprises a chemiluminescent label.

3. The oligonucleotide probe of claim 2, wherein the chemiluminescent label comprises an acridinium ester.

4. An oligonucleotide probe for detecting nucleic acids of *Mycoplasma genitalium*, consisting of:
   a target-hybridizing sequence of bases consisting of the base sequence of SEQ ID NO:3 in which thymines may optionally be substituted with uracils, with a non-nucleotide linker between base positions 6 and 7 of SEQ ID NO:3; and
   a detectable label attached to the non-nucleotide linker.

5. The oligonucleotide probe of claim 4, wherein the detectable label comprises a chemiluminescent label.

6. The oligonucleotide probe of claim 5, wherein the chemiluminescent label comprises an acridinium ester.

7. The oligonucleotide probe of claim 4, wherein the base sequence of the target-hybridizing sequence is SEQ ID NO: 3 with the non-nucleotide linker between base positions 6 and 7.

* * * * *

SEQUENCE LISTING

<160> NUMBER OF SEQ ID NOS: 92

<210> SEQ ID NO 1
<211> LENGTH: 22

-continued

```
<212> TYPE: DNA
<213> ORGANISM: Mycoplasma genitalium
<220> FEATURE:
<221> NAME/KEY: misc_feature
<222> LOCATION: (10)..(11)
<223> OTHER INFORMATION: Non-nucleotide linker between base positions 10
      and 11
<220> FEATURE:
<221> NAME/KEY: misc_feature
<222> LOCATION: (10)..(11)
<223> OTHER INFORMATION: Acridinium ester label attached to
      non-nucleotide linker

<400> SEQUENCE: 1
tagctgtcgg agcgatccct tc                                              22

<210> SEQ ID NO 2
<211> LENGTH: 18
<212> TYPE: DNA
<213> ORGANISM: Mycoplasma genitalium
<220> FEATURE:
<221> NAME/KEY: misc_feature
<222> LOCATION: (6)..(7)
<223> OTHER INFORMATION: Non-nucleotide linker between base positions 6
      and 7
<220> FEATURE:
<221> NAME/KEY: misc_feature
<222> LOCATION: (6)..(7)
<223> OTHER INFORMATION: Acridinium ester label attached to
      non-nucleotide linker

<400> SEQUENCE: 2
tgtcggagcg atcccttc                                                   18

<210> SEQ ID NO 3
<211> LENGTH: 17
<212> TYPE: DNA
<213> ORGANISM: Mycoplasma genitalium
<220> FEATURE:
<221> NAME/KEY: misc_feature
<222> LOCATION: (6)..(7)
<223> OTHER INFORMATION: Non-nucleotide linker between base positions 6
      and 7
<220> FEATURE:
<221> NAME/KEY: misc_feature
<222> LOCATION: (6)..(7)
<223> OTHER INFORMATION: Acridinium ester label attached to
      non-nucleotide linker

<400> SEQUENCE: 3
tgtcggagcg atccctt                                                    17

<210> SEQ ID NO 4
<211> LENGTH: 17
<212> TYPE: DNA
<213> ORGANISM: Mycoplasma genitalium
<220> FEATURE:
<221> NAME/KEY: misc_feature
<222> LOCATION: (5)..(6)
<223> OTHER INFORMATION: Non-nucleotide linker between base positions 5
      and 6
<220> FEATURE:
<221> NAME/KEY: misc_feature
<222> LOCATION: (5)..(6)
<223> OTHER INFORMATION: Acridinium ester label attached to
      non-nucleotide linker

<400> SEQUENCE: 4
gtcggagcga tcccttc                                                    17

<210> SEQ ID NO 5
```

```
<211> LENGTH: 23
<212> TYPE: DNA
<213> ORGANISM: Mycoplasma genitalium
<220> FEATURE:
<221> NAME/KEY: misc_feature
<222> LOCATION: (9)..(10)
<223> OTHER INFORMATION: Non-nucleotide linker between base positions 9
      and 10
<220> FEATURE:
<221> NAME/KEY: misc_feature
<222> LOCATION: (9)..(10)
<223> OTHER INFORMATION: Acridinium ester label attached to
      non-nucleotide linker

<400> SEQUENCE: 5
gcgatccctt cggtagtgaa gtt                                              23

<210> SEQ ID NO 6
<211> LENGTH: 20
<212> TYPE: DNA
<213> ORGANISM: Mycoplasma genitalium
<220> FEATURE:
<221> NAME/KEY: misc_feature
<222> LOCATION: (9)..(10)
<223> OTHER INFORMATION: Non-nucleotide linker between base positions 9
      and 10
<220> FEATURE:
<221> NAME/KEY: misc_feature
<222> LOCATION: (9)..(10)
<223> OTHER INFORMATION: Acridinium ester label attached to
      non-nucleotide linker

<400> SEQUENCE: 6
gcgatccctt cggtagtgaa                                                  20

<210> SEQ ID NO 7
<211> LENGTH: 20
<212> TYPE: DNA
<213> ORGANISM: Mycoplasma genitalium
<220> FEATURE:
<221> NAME/KEY: misc_feature
<222> LOCATION: (6)..(7)
<223> OTHER INFORMATION: Non-nucleotide linker between base positions 6
      and 7
<220> FEATURE:
<221> NAME/KEY: misc_feature
<222> LOCATION: (6)..(7)
<223> OTHER INFORMATION: Acridinium ester label attached to
      non-nucleotide linker

<400> SEQUENCE: 7
atcccttcgg tagtgaagtt                                                  20

<210> SEQ ID NO 8
<211> LENGTH: 22
<212> TYPE: RNA
<213> ORGANISM: Mycoplasma genitalium
<220> FEATURE:
<221> NAME/KEY: misc_feature
<222> LOCATION: (1)..(22)
<223> OTHER INFORMATION: 2' Methoxy (2'-OMe) backbone
<220> FEATURE:
<221> NAME/KEY: misc_feature
<222> LOCATION: (10)..(11)
<223> OTHER INFORMATION: Non-nucleotide linker between base positions 10
      and 11
<220> FEATURE:
<221> NAME/KEY: misc_feature
<222> LOCATION: (10)..(11)
<223> OTHER INFORMATION: Acridinium ester label attached to
      non-nucleotide linker

<400> SEQUENCE: 8
```
gcaaguucgc aaggauuugu ug                                           22

<210> SEQ ID NO 9
<211> LENGTH: 20
<212> TYPE: RNA
<213> ORGANISM: Mycoplasma genitalium
<220> FEATURE:
<221> NAME/KEY: misc_feature
<222> LOCATION: (1)..(20)
<223> OTHER INFORMATION: 2' Methoxy (2'-OMe) backbone
<220> FEATURE:
<221> NAME/KEY: misc_feature
<222> LOCATION: (9)..(10)
<223> OTHER INFORMATION: Non-nucleotide linker between base positions 9
      and 10
<220> FEATURE:
<221> NAME/KEY: misc_feature
<222> LOCATION: (9)..(10)
<223> OTHER INFORMATION: Acridinium ester label attached to
      non-nucleotide linker

<400> SEQUENCE: 9
cgcaaggauu uguugaugug                                              20

<210> SEQ ID NO 10
<211> LENGTH: 23
<212> TYPE: RNA
<213> ORGANISM: Mycoplasma genitalium
<220> FEATURE:
<221> NAME/KEY: misc_feature
<222> LOCATION: (1)..(20)
<223> OTHER INFORMATION: 2' Methoxy (2'-OMe) backbone
<220> FEATURE:
<221> NAME/KEY: misc_feature
<222> LOCATION: (14)..(15)
<223> OTHER INFORMATION: Non-nucleotide linker between base positions 14
      and 15
<220> FEATURE:
<221> NAME/KEY: misc_feature
<222> LOCATION: (14)..(15)
<223> OTHER INFORMATION: Acridinium ester label attached to
      non-nucleotide linker

<400> SEQUENCE: 10
ggauuuguug augugaaaug ugg                                          23

<210> SEQ ID NO 11
<211> LENGTH: 22
<212> TYPE: RNA
<213> ORGANISM: Mycoplasma genitalium
<220> FEATURE:
<221> NAME/KEY: misc_feature
<222> LOCATION: (1)..(22)
<223> OTHER INFORMATION: 2' Methoxy (2'-OMe) backbone
<220> FEATURE:
<221> NAME/KEY: misc_feature
<222> LOCATION: (13)..(14)
<223> OTHER INFORMATION: Non-nucleotide linker between base positions 13
      and 14
<220> FEATURE:
<221> NAME/KEY: misc_feature
<222> LOCATION: (13)..(14)
<223> OTHER INFORMATION: Acridinium ester label attached to
      non-nucleotide linker

<400> SEQUENCE: 11
guugauguga aaguggaau ac                                            22

<210> SEQ ID NO 12
<211> LENGTH: 20
<212> TYPE: RNA

```
<213> ORGANISM: Mycoplasma genitalium
<220> FEATURE:
<221> NAME/KEY: misc_feature
<222> LOCATION: (1)..(20)
<223> OTHER INFORMATION: 2' Methoxy (2'-OMe) backbone
<220> FEATURE:
<221> NAME/KEY: misc_feature
<222> LOCATION: (12)..(13)
<223> OTHER INFORMATION: Non-nucleotide linker between base positions 12
      and 13
<220> FEATURE:
<221> NAME/KEY: misc_feature
<222> LOCATION: (12)..(13)
<223> OTHER INFORMATION: Acridinium ester label attached to
      non-nucleotide linker

<400> SEQUENCE: 12
cuacccuugg uuauguuuug                                                    20

<210> SEQ ID NO 13
<211> LENGTH: 20
<212> TYPE: RNA
<213> ORGANISM: Mycoplasma genitalium
<220> FEATURE:
<221> NAME/KEY: misc_feature
<222> LOCATION: (13)..(14)
<223> OTHER INFORMATION: Non-nucleotide linker between base positions 13
      and 14
<220> FEATURE:
<221> NAME/KEY: misc_feature
<222> LOCATION: (13)..(14)
<223> OTHER INFORMATION: Acridinium ester label attached to
      non-nucleotide linker

<400> SEQUENCE: 13
cccuugguua uguuuuguuc                                                    20

<210> SEQ ID NO 14
<211> LENGTH: 20
<212> TYPE: RNA
<213> ORGANISM: Mycoplasma genitalium
<220> FEATURE:
<221> NAME/KEY: misc_feature
<222> LOCATION: (1)..(20)
<223> OTHER INFORMATION: 2' Methoxy (2'-OMe) backbone
<220> FEATURE:
<221> NAME/KEY: misc_feature
<222> LOCATION: (14)..(15)
<223> OTHER INFORMATION: Non-nucleotide linker between base positions 14
      and 15
<220> FEATURE:
<221> NAME/KEY: misc_feature
<222> LOCATION: (14)..(15)
<223> OTHER INFORMATION: Acridinium ester label attached to
      non-nucleotide linker

<400> SEQUENCE: 14
cccuugguua uguuuuguuc                                                    20

<210> SEQ ID NO 15
<211> LENGTH: 23
<212> TYPE: RNA
<213> ORGANISM: Mycoplasma genitalium
<220> FEATURE:
<221> NAME/KEY: misc_feature
<222> LOCATION: (1)..(23)
<223> OTHER INFORMATION: 2' Methoxy (2'-OMe) backbone
<220> FEATURE:
<221> NAME/KEY: misc_feature
<222> LOCATION: (14)..(15)
<223> OTHER INFORMATION: Non-nucleotide linker between base positions 14
      and 15
<220> FEATURE:
```

```
<221> NAME/KEY: misc_feature
<222> LOCATION: (14)..(15)
<223> OTHER INFORMATION: Acridinium ester label attached to
      non-nucleotide linker

<400> SEQUENCE: 15
ggccaaaccu aucugaggau agg                                           23

<210> SEQ ID NO 16
<211> LENGTH: 23
<212> TYPE: DNA
<213> ORGANISM: Mycoplasma genitalium
<220> FEATURE:
<221> NAME/KEY: misc_feature
<222> LOCATION: (14)..(15)
<223> OTHER INFORMATION: Non-nucleotide linker between base positions 14
      and 15
<220> FEATURE:
<221> NAME/KEY: misc_feature
<222> LOCATION: (14)..(15)
<223> OTHER INFORMATION: Acridinium ester label attached to
      non-nucleotide linker

<400> SEQUENCE: 16
ggccaaacct atctgaggat agg                                           23

<210> SEQ ID NO 17
<211> LENGTH: 21
<212> TYPE: RNA
<213> ORGANISM: Mycoplasma genitalium
<220> FEATURE:
<221> NAME/KEY: misc_feature
<222> LOCATION: (1)..(21)
<223> OTHER INFORMATION: 2' Methoxy (2'-OMe) backbone
<220> FEATURE:
<221> NAME/KEY: misc_feature
<222> LOCATION: (15)..(16)
<223> OTHER INFORMATION: Non-nucleotide linker between base positions 15
      and 16
<220> FEATURE:
<221> NAME/KEY: misc_feature
<222> LOCATION: (15)..(16)
<223> OTHER INFORMATION: Acridinium ester label attached to
      non-nucleotide linker

<400> SEQUENCE: 17
ggccaaaccu aucugaggau a                                             21

<210> SEQ ID NO 18
<211> LENGTH: 22
<212> TYPE: DNA
<213> ORGANISM: Mycoplasma genitalium
<220> FEATURE:
<221> NAME/KEY: misc_feature
<222> LOCATION: (15)..(16)
<223> OTHER INFORMATION: Non-nucleotide linker between base positions 15
      and 16
<220> FEATURE:
<221> NAME/KEY: misc_feature
<222> LOCATION: (15)..(16)
<223> OTHER INFORMATION: Acridinium ester label attached to
      non-nucleotide linker

<400> SEQUENCE: 18
ggccaaacct atctgaggat ag                                            22

<210> SEQ ID NO 19
<211> LENGTH: 21
<212> TYPE: RNA
<213> ORGANISM: Mycoplasma genitalium
<220> FEATURE:
```

<221> NAME/KEY: misc_feature
<222> LOCATION: (1)..(21)
<223> OTHER INFORMATION: 2' Methoxy (2'-OMe) backbone
<220> FEATURE:
<221> NAME/KEY: misc_feature
<222> LOCATION: (14)..(15)
<223> OTHER INFORMATION: Non-nucleotide linker between base positions 14
    and 15
<220> FEATURE:
<221> NAME/KEY: misc_feature
<222> LOCATION: (14)..(15)
<223> OTHER INFORMATION: Acridinium ester label attached to
    non-nucleotide linker

<400> SEQUENCE: 19
gccaaaccua ucugaggaua g                                      21

<210> SEQ ID NO 20
<211> LENGTH: 21
<212> TYPE: RNA
<213> ORGANISM: Mycoplasma genitalium
<220> FEATURE:
<221> NAME/KEY: misc_feature
<222> LOCATION: (1)..(21)
<223> OTHER INFORMATION: 2' Methoxy (2'-OMe) backbone
<220> FEATURE:
<221> NAME/KEY: misc_feature
<222> LOCATION: (13)..(14)
<223> OTHER INFORMATION: Non-nucleotide linker between base positions 13
    and 14
<220> FEATURE:
<221> NAME/KEY: misc_feature
<222> LOCATION: (13)..(14)
<223> OTHER INFORMATION: Acridinium ester label attached to
    non-nucleotide linker

<400> SEQUENCE: 20
ccaaaccuau cugaggauag g                                      21

<210> SEQ ID NO 21
<211> LENGTH: 20
<212> TYPE: RNA
<213> ORGANISM: Mycoplasma genitalium
<220> FEATURE:
<221> NAME/KEY: misc_feature
<222> LOCATION: (1)..(20)
<223> OTHER INFORMATION: 2' Methoxy (2'-OMe) backbone
<220> FEATURE:
<221> NAME/KEY: misc_feature
<222> LOCATION: (13)..(14)
<223> OTHER INFORMATION: Non-nucleotide linker between base positions 13
    and 14
<220> FEATURE:
<221> NAME/KEY: misc_feature
<222> LOCATION: (13)..(14)
<223> OTHER INFORMATION: Acridinium ester label attached to
    non-nucleotide linker

<400> SEQUENCE: 21
ccaaaccuau cugaggauag                                        20

<210> SEQ ID NO 22
<211> LENGTH: 19
<212> TYPE: RNA
<213> ORGANISM: Mycoplasma genitalium
<220> FEATURE:
<221> NAME/KEY: misc_feature
<222> LOCATION: (1)..(19)
<223> OTHER INFORMATION: 2' Methoxy (2'-OMe) backbone
<220> FEATURE:
<221> NAME/KEY: misc_feature
<222> LOCATION: (13)..(14)
<223> OTHER INFORMATION: Non-nucleotide linker between base positions 13

```
                              and 14
<220> FEATURE:
<221> NAME/KEY: misc_feature
<222> LOCATION: (13)..(14)
<223> OTHER INFORMATION: Acridinium ester label attached to
      non-nucleotide linker

<400> SEQUENCE: 22
ccaaaccuau cugaggaua                                                  19

<210> SEQ ID NO 23
<211> LENGTH: 22
<212> TYPE: DNA
<213> ORGANISM: Mycoplasma genitalium

<400> SEQUENCE: 23
atgtactacc caggcgagat ac                                              22

<210> SEQ ID NO 24
<211> LENGTH: 23
<212> TYPE: DNA
<213> ORGANISM: Mycoplasma genitalium

<400> SEQUENCE: 24
cttgaaactg gatcacagtt acc                                             23

<210> SEQ ID NO 25
<211> LENGTH: 25
<212> TYPE: DNA
<213> ORGANISM: Mycoplasma genitalium

<400> SEQUENCE: 25
cctaacactg tcttgaaact ggatc                                           25

<210> SEQ ID NO 26
<211> LENGTH: 21
<212> TYPE: DNA
<213> ORGANISM: Mycoplasma genitalium

<400> SEQUENCE: 26
gcctccgtta cctttagga g                                                21

<210> SEQ ID NO 27
<211> LENGTH: 22
<212> TYPE: DNA
<213> ORGANISM: Mycoplasma genitalium

<400> SEQUENCE: 27
ccgtactgaa ggtacctttg tg                                              22

<210> SEQ ID NO 28
<211> LENGTH: 24
<212> TYPE: DNA
<213> ORGANISM: Mycoplasma genitalium

<400> SEQUENCE: 28
cttccataat gcaagcccta caac                                            24

<210> SEQ ID NO 29
<211> LENGTH: 25
<212> TYPE: DNA
<213> ORGANISM: Mycoplasma genitalium

<400> SEQUENCE: 29
```

```
ttaacttcca taatgcaagc cctac                                         25

<210> SEQ ID NO 30
<211> LENGTH: 20
<212> TYPE: DNA
<213> ORGANISM: Mycoplasma genitalium

<400> SEQUENCE: 30
cgctgctttc caacagcttc                                               20

<210> SEQ ID NO 31
<211> LENGTH: 19
<212> TYPE: DNA
<213> ORGANISM: Mycoplasma genitalium

<400> SEQUENCE: 31
cctctttggc gctgctttc                                                19

<210> SEQ ID NO 32
<211> LENGTH: 21
<212> TYPE: DNA
<213> ORGANISM: Mycoplasma genitalium

<400> SEQUENCE: 32
acggggctat caccctcttt g                                             21

<210> SEQ ID NO 33
<211> LENGTH: 49
<212> TYPE: DNA
<213> ORGANISM: Artificial Sequence
<220> FEATURE:
<223> OTHER INFORMATION: Promoter primer
<220> FEATURE:
<221> NAME/KEY: misc_feature
<222> LOCATION: (1)..(27)
<223> OTHER INFORMATION: Phage T7 promoter sequence
<220> FEATURE:
<221> NAME/KEY: misc_feature
<222> LOCATION: (28)..(49)
<223> OTHER INFORMATION: M. genitalium target-complementary sequence

<400> SEQUENCE: 33
aatttaatac gactcactat agggagaatg tactacccag gcgagatac               49

<210> SEQ ID NO 34
<211> LENGTH: 50
<212> TYPE: DNA
<213> ORGANISM: Artificial Sequence
<220> FEATURE:
<223> OTHER INFORMATION: Promoter primer
<220> FEATURE:
<221> NAME/KEY: misc_feature
<222> LOCATION: (1)..(27)
<223> OTHER INFORMATION: Phage T7 promoter sequence
<220> FEATURE:
<221> NAME/KEY: misc_feature
<222> LOCATION: (28)..(50)
<223> OTHER INFORMATION: M. genitalium target-complementary sequence

<400> SEQUENCE: 34
aatttaatac gactcactat agggagactt gaaactggat cacagttacc              50

<210> SEQ ID NO 35
<211> LENGTH: 52
<212> TYPE: DNA
<213> ORGANISM: Artificial Sequence
<220> FEATURE:
<223> OTHER INFORMATION: Promoter primer
```

```
<220> FEATURE:
<221> NAME/KEY: misc_feature
<222> LOCATION: (1)..(27)
<223> OTHER INFORMATION: Phage T7 promoter sequence
<220> FEATURE:
<221> NAME/KEY: misc_feature
<222> LOCATION: (28)..(52)
<223> OTHER INFORMATION: M. genitalium target-complementary sequence

<400> SEQUENCE: 35
aatttaatac gactcactat agggagacct aacactgtct tgaaactgga tc        52

<210> SEQ ID NO 36
<211> LENGTH: 48
<212> TYPE: DNA
<213> ORGANISM: Artificial Sequence
<220> FEATURE:
<223> OTHER INFORMATION: Promoter primer
<220> FEATURE:
<221> NAME/KEY: misc_feature
<222> LOCATION: (1)..(27)
<223> OTHER INFORMATION: Phage T7 promoter sequence
<220> FEATURE:
<221> NAME/KEY: misc_feature
<222> LOCATION: (28)..(48)
<223> OTHER INFORMATION: M. genitalium target-complementary sequence

<400> SEQUENCE: 36
aatttaatac gactcactat agggagagcc tccgttacct tttaggag              48

<210> SEQ ID NO 37
<211> LENGTH: 49
<212> TYPE: DNA
<213> ORGANISM: Artificial Sequence
<220> FEATURE:
<223> OTHER INFORMATION: Promoter primer
<220> FEATURE:
<221> NAME/KEY: misc_feature
<222> LOCATION: (1)..(27)
<223> OTHER INFORMATION: Phage T7 promoter sequence
<220> FEATURE:
<221> NAME/KEY: misc_feature
<222> LOCATION: (28)..(49)
<223> OTHER INFORMATION: M. genitalium target-complementary sequence

<400> SEQUENCE: 37
aatttaatac gactcactat agggagaccg tactgaaggt acctttgtg             49

<210> SEQ ID NO 38
<211> LENGTH: 51
<212> TYPE: DNA
<213> ORGANISM: Artificial Sequence
<220> FEATURE:
<223> OTHER INFORMATION: Promoter primer
<220> FEATURE:
<221> NAME/KEY: misc_feature
<222> LOCATION: (1)..(27)
<223> OTHER INFORMATION: Phage T7 promoter sequence
<220> FEATURE:
<221> NAME/KEY: misc_feature
<222> LOCATION: (28)..(51)
<223> OTHER INFORMATION: M. genitalium target-complementary sequence

<400> SEQUENCE: 38
aatttaatac gactcactat agggagactt ccataatgca agccctacaa c          51

<210> SEQ ID NO 39
<211> LENGTH: 52
<212> TYPE: DNA
<213> ORGANISM: Artificial Sequence
<220> FEATURE:
```

<223> OTHER INFORMATION: Promoter primer
<220> FEATURE:
<221> NAME/KEY: misc_feature
<222> LOCATION: (1)..(27)
<223> OTHER INFORMATION: Phage T7 promoter sequence
<220> FEATURE:
<221> NAME/KEY: misc_feature
<222> LOCATION: (28)..(52)
<223> OTHER INFORMATION: M. genitalium target-complementary sequence

<400> SEQUENCE: 39
aatttaatac gactcactat agggagatta acttccataa tgcaagccct ac        52

<210> SEQ ID NO 40
<211> LENGTH: 47
<212> TYPE: DNA
<213> ORGANISM: Artificial Sequence
<220> FEATURE:
<223> OTHER INFORMATION: Promoter primer
<220> FEATURE:
<221> NAME/KEY: misc_feature
<222> LOCATION: (1)..(27)
<223> OTHER INFORMATION: Phage T7 promoter sequence
<220> FEATURE:
<221> NAME/KEY: misc_feature
<222> LOCATION: (28)..(47)
<223> OTHER INFORMATION: M. genitalium target-complementary sequence

<400> SEQUENCE: 40
aatttaatac gactcactat agggagacgc tgctttccaa cagcttc        47

<210> SEQ ID NO 41
<211> LENGTH: 46
<212> TYPE: DNA
<213> ORGANISM: Artificial Sequence
<220> FEATURE:
<223> OTHER INFORMATION: Promoter primer
<220> FEATURE:
<221> NAME/KEY: misc_feature
<222> LOCATION: (1)..(27)
<223> OTHER INFORMATION: Phage T7 promoter sequence
<220> FEATURE:
<221> NAME/KEY: misc_feature
<222> LOCATION: (28)..(46)
<223> OTHER INFORMATION: M. genitalium target-complementary sequence

<400> SEQUENCE: 41
aatttaatac gactcactat agggagacct ctttggcgct gctttc        46

<210> SEQ ID NO 42
<211> LENGTH: 48
<212> TYPE: DNA
<213> ORGANISM: Artificial Sequence
<220> FEATURE:
<223> OTHER INFORMATION: Promoter primer
<220> FEATURE:
<221> NAME/KEY: misc_feature
<222> LOCATION: (1)..(27)
<223> OTHER INFORMATION: Phage T7 promoter sequence
<220> FEATURE:
<221> NAME/KEY: misc_feature
<222> LOCATION: (28)..(48)
<223> OTHER INFORMATION: M. genitalium target-complementary sequence

<400> SEQUENCE: 42
aatttaatac gactcactat agggagaacg gggctatcac cctctttg        48

<210> SEQ ID NO 43
<211> LENGTH: 21
<212> TYPE: DNA
<213> ORGANISM: Mycoplasma genitalium

<400> SEQUENCE: 43
cgatagatac tagctgtcgg a     21

<210> SEQ ID NO 44
<211> LENGTH: 19
<212> TYPE: DNA
<213> ORGANISM: Mycoplasma genitalium

<400> SEQUENCE: 44
tctatcgttt acggtgtgg     19

<210> SEQ ID NO 45
<211> LENGTH: 20
<212> TYPE: DNA
<213> ORGANISM: Mycoplasma genitalium

<400> SEQUENCE: 45
gtagtccaca ccgtaaacga     20

<210> SEQ ID NO 46
<211> LENGTH: 23
<212> TYPE: DNA
<213> ORGANISM: Mycoplasma genitalium

<400> SEQUENCE: 46
gatcaaaaca ccaccatgta gag     23

<210> SEQ ID NO 47
<211> LENGTH: 23
<212> TYPE: DNA
<213> ORGANISM: Mycoplasma genitalium

<400> SEQUENCE: 47
gttcgcaagg atttgttgat gtg     23

<210> SEQ ID NO 48
<211> LENGTH: 20
<212> TYPE: DNA
<213> ORGANISM: Mycoplasma genitalium

<400> SEQUENCE: 48
cgcaaggatt tgttgatgtg     20

<210> SEQ ID NO 49
<211> LENGTH: 21
<212> TYPE: DNA
<213> ORGANISM: Mycoplasma genitalium

<400> SEQUENCE: 49
gagaataggt aggagcaatt g     21

<210> SEQ ID NO 50
<211> LENGTH: 23
<212> TYPE: DNA
<213> ORGANISM: Mycoplasma genitalium

<400> SEQUENCE: 50
gcaattgatg caagttcgca agg     23

<210> SEQ ID NO 51
<211> LENGTH: 20
<212> TYPE: DNA

```
<213> ORGANISM: Mycoplasma genitalium

<400> SEQUENCE: 51
tgtagtggcg agcgaaagcg                                            20

<210> SEQ ID NO 52
<211> LENGTH: 23
<212> TYPE: DNA
<213> ORGANISM: Mycoplasma genitalium

<400> SEQUENCE: 52
gaaaacgaat gtgattccgt gtg                                        23

<210> SEQ ID NO 53
<211> LENGTH: 23
<212> TYPE: DNA
<213> ORGANISM: Mycoplasma genitalium

<400> SEQUENCE: 53
tagtggcgag cgaaagcgga aca                                        23

<210> SEQ ID NO 54
<211> LENGTH: 23
<212> TYPE: DNA
<213> ORGANISM: Mycoplasma genitalium

<400> SEQUENCE: 54
acggtgtgga ctactagggt atc                                        23

<210> SEQ ID NO 55
<211> LENGTH: 22
<212> TYPE: DNA
<213> ORGANISM: Mycoplasma genitalium

<400> SEQUENCE: 55
agcctaagcg tcagtaatgg cc                                         22

<210> SEQ ID NO 56
<211> LENGTH: 21
<212> TYPE: DNA
<213> ORGANISM: Mycoplasma genitalium

<400> SEQUENCE: 56
caacatgctc caccacttgt g                                          21

<210> SEQ ID NO 57
<211> LENGTH: 19
<212> TYPE: DNA
<213> ORGANISM: Mycoplasma genitalium

<400> SEQUENCE: 57
acattagcag tctcgttaa                                             19

<210> SEQ ID NO 58
<211> LENGTH: 24
<212> TYPE: RNA
<213> ORGANISM: Mycoplasma genitalium
<220> FEATURE:
<221> NAME/KEY: misc_feature
<222> LOCATION: (1)..(24)
<223> OTHER INFORMATION: 2' Methoxy (2'-OMe) backbone

<400> SEQUENCE: 58
cccucguucu ucacugcggc uuac                                       24
```

<210> SEQ ID NO 59
<211> LENGTH: 24
<212> TYPE: RNA
<213> ORGANISM: Mycoplasma genitalium
<220> FEATURE:
<221> NAME/KEY: misc_feature
<222> LOCATION: (1)..(24)
<223> OTHER INFORMATION: 2' Methoxy (2'-OMe) backbone

<400> SEQUENCE: 59
cauauacauc accuuacggu uugg                                              24

<210> SEQ ID NO 60
<211> LENGTH: 24
<212> TYPE: RNA
<213> ORGANISM: Mycoplasma genitalium
<220> FEATURE:
<221> NAME/KEY: misc_feature
<222> LOCATION: (1)..(24)
<223> OTHER INFORMATION: 2' Methoxy (2'-OMe) backbone

<400> SEQUENCE: 60
ccuauucucu acaugguggu guuu                                              24

<210> SEQ ID NO 61
<211> LENGTH: 24
<212> TYPE: RNA
<213> ORGANISM: Mycoplasma genitalium
<220> FEATURE:
<221> NAME/KEY: misc_feature
<222> LOCATION: (1)..(24)
<223> OTHER INFORMATION: 2' Methoxy (2'-OMe) backbone

<400> SEQUENCE: 61
ugcaucaauu gcuccuaccu auuc                                              24

<210> SEQ ID NO 62
<211> LENGTH: 24
<212> TYPE: RNA
<213> ORGANISM: Mycoplasma genitalium
<220> FEATURE:
<221> NAME/KEY: misc_feature
<222> LOCATION: (1)..(24)
<223> OTHER INFORMATION: 2' Methoxy (2'-OMe) backbone

<400> SEQUENCE: 62
ugcaucaauu gcuccuaccu auuc                                              24

<210> SEQ ID NO 63
<211> LENGTH: 22
<212> TYPE: RNA
<213> ORGANISM: Mycoplasma genitalium
<220> FEATURE:
<221> NAME/KEY: misc_feature
<222> LOCATION: (1)..(22)
<223> OTHER INFORMATION: 2' Methoxy (2'-OMe) backbone

<400> SEQUENCE: 63
ucgagcuacu cagguuucuu gc                                                22

<210> SEQ ID NO 64
<211> LENGTH: 24
<212> TYPE: RNA
<213> ORGANISM: Mycoplasma genitalium
<220> FEATURE:
<221> NAME/KEY: misc_feature
<222> LOCATION: (1)..(24)

```
<223> OTHER INFORMATION: 2' Methoxy (2'-OMe) backbone

<400> SEQUENCE: 64
ccugugguua cugagauguu ucac                                              24

<210> SEQ ID NO 65
<211> LENGTH: 21
<212> TYPE: RNA
<213> ORGANISM: Mycoplasma genitalium
<220> FEATURE:
<221> NAME/KEY: misc_feature
<222> LOCATION: (1)..(21)
<223> OTHER INFORMATION: 2' Methoxy (2'-OMe) backbone

<400> SEQUENCE: 65
acggggcuau cacccucuuu g                                                 21

<210> SEQ ID NO 66
<211> LENGTH: 25
<212> TYPE: RNA
<213> ORGANISM: Mycoplasma genitalium
<220> FEATURE:
<221> NAME/KEY: misc_feature
<222> LOCATION: (1)..(25)
<223> OTHER INFORMATION: 2' Methoxy (2'-OMe) backbone

<400> SEQUENCE: 66
cugggcagau ucacucaaaa uaacg                                             25

<210> SEQ ID NO 67
<211> LENGTH: 56
<212> TYPE: DNA
<213> ORGANISM: Artificial Sequence
<220> FEATURE:
<223> OTHER INFORMATION: Target capture oligonucleotide

<400> SEQUENCE: 67
acggtgtgga ctactagggt atctttaaaa aaaaaaaaaa aaaaaaaaaa aaaaaa           56

<210> SEQ ID NO 68
<211> LENGTH: 55
<212> TYPE: DNA
<213> ORGANISM: Artificial Sequence
<220> FEATURE:
<223> OTHER INFORMATION: Target capture oligonucleotide

<400> SEQUENCE: 68
agcctaagcg tcagtaatgg cctttaaaaa aaaaaaaaaa aaaaaaaaaa aaaaa            55

<210> SEQ ID NO 69
<211> LENGTH: 54
<212> TYPE: DNA
<213> ORGANISM: Artificial Sequence
<220> FEATURE:
<223> OTHER INFORMATION: Target capture oligonucleotide

<400> SEQUENCE: 69
caacatgctc caccacttgt gtttaaaaaa aaaaaaaaaa aaaaaaaaaa aaaa             54

<210> SEQ ID NO 70
<211> LENGTH: 52
<212> TYPE: DNA
<213> ORGANISM: Artificial Sequence
<220> FEATURE:
<223> OTHER INFORMATION: Target capture oligonucleotide

<400> SEQUENCE: 70
```
acattagcag tctcgttaat ttaaaaaaaa aaaaaaaaaa aaaaaaaaaa aa    52

<210> SEQ ID NO 71
<211> LENGTH: 57
<212> TYPE: DNA
<213> ORGANISM: Artificial Sequence
<220> FEATURE:
<223> OTHER INFORMATION: Target capture oligonucleotide
<220> FEATURE:
<221> NAME/KEY: misc_feature
<222> LOCATION: (1)..(24)
<223> OTHER INFORMATION: 2' Methoxy (2'-OMe) backbone
<220> FEATURE:
<221> NAME/KEY: misc_feature
<222> LOCATION: (25)..(57)
<223> OTHER INFORMATION: DNA backbone

<400> SEQUENCE: 71
cccucguucu ucacugcggc uuactttaaa aaaaaaaaaa aaaaaaaaaa aaaaaaa    57

<210> SEQ ID NO 72
<211> LENGTH: 57
<212> TYPE: DNA
<213> ORGANISM: Artificial Sequence
<220> FEATURE:
<223> OTHER INFORMATION: Target capture oligonucleotide
<220> FEATURE:
<221> NAME/KEY: misc_feature
<222> LOCATION: (1)..(24)
<223> OTHER INFORMATION: 2' Methoxy (2'-OMe) backbone
<220> FEATURE:
<221> NAME/KEY: misc_feature
<222> LOCATION: (25)..(57)
<223> OTHER INFORMATION: DNA backbone

<400> SEQUENCE: 72
cauauacauc accuuacggu uuggtttaaa aaaaaaaaaa aaaaaaaaaa aaaaaaa    57

<210> SEQ ID NO 73
<211> LENGTH: 57
<212> TYPE: DNA
<213> ORGANISM: Artificial Sequence
<220> FEATURE:
<223> OTHER INFORMATION: Target capture oligonucleotide
<220> FEATURE:
<221> NAME/KEY: misc_feature
<222> LOCATION: (1)..(24)
<223> OTHER INFORMATION: 2' Methoxy (2'-OMe) backbone
<220> FEATURE:
<221> NAME/KEY: misc_feature
<222> LOCATION: (25)..(57)
<223> OTHER INFORMATION: DNA backbone

<400> SEQUENCE: 73
ccuauucucu acaugguggu guuutttaaa aaaaaaaaaa aaaaaaaaaa aaaaaaa    57

<210> SEQ ID NO 74
<211> LENGTH: 57
<212> TYPE: DNA
<213> ORGANISM: Artificial Sequence
<220> FEATURE:
<223> OTHER INFORMATION: Target capture oligonucleotide
<220> FEATURE:
<221> NAME/KEY: misc_feature
<222> LOCATION: (1)..(24)
<223> OTHER INFORMATION: 2' Methoxy (2'-OMe) backbone
<220> FEATURE:
<221> NAME/KEY: misc_feature
<222> LOCATION: (25)..(57)
<223> OTHER INFORMATION: DNA backbone

<400> SEQUENCE: 74
ugcaucaauu gcuccuaccu auucuuaaa aaaaaaaaaa aaaaaaaaaa aaaaaaa        57

<210> SEQ ID NO 75
<211> LENGTH: 57
<212> TYPE: DNA
<213> ORGANISM: Artificial Sequence
<220> FEATURE:
<223> OTHER INFORMATION: Target capture oligonucleotide
<220> FEATURE:
<221> NAME/KEY: misc_feature
<222> LOCATION: (1)..(24)
<223> OTHER INFORMATION: 2' Methoxy (2'-OMe) backbone
<220> FEATURE:
<221> NAME/KEY: misc_feature
<222> LOCATION: (25)..(57)
<223> OTHER INFORMATION: DNA backbone

<400> SEQUENCE: 75
ugcaucaauu gcuccuaccu auucuuaaa aaaaaaaaaa aaaaaaaaaa aaaaaaa        57

<210> SEQ ID NO 76
<211> LENGTH: 55
<212> TYPE: DNA
<213> ORGANISM: Artificial Sequence
<220> FEATURE:
<223> OTHER INFORMATION: Target capture oligonucleotide
<220> FEATURE:
<221> NAME/KEY: misc_feature
<222> LOCATION: (1)..(22)
<223> OTHER INFORMATION: 2' Methoxy (2'-OMe) backbone
<220> FEATURE:
<221> NAME/KEY: misc_feature
<222> LOCATION: (23)..(55)
<223> OTHER INFORMATION: DNA backbone

<400> SEQUENCE: 76
ucgagcuacu cagguuucuu gcuuuaaaaa aaaaaaaaaa aaaaaaaaaa aaaaa        55

<210> SEQ ID NO 77
<211> LENGTH: 57
<212> TYPE: DNA
<213> ORGANISM: Artificial Sequence
<220> FEATURE:
<223> OTHER INFORMATION: Target capture oligonucleotide
<220> FEATURE:
<221> NAME/KEY: misc_feature
<222> LOCATION: (1)..(24)
<223> OTHER INFORMATION: 2' Methoxy (2'-OMe) backbone
<220> FEATURE:
<221> NAME/KEY: misc_feature
<222> LOCATION: (25)..(57)
<223> OTHER INFORMATION: DNA backbone

<400> SEQUENCE: 77
ccugugguua cugagauguu ucacuuuaaa aaaaaaaaaa aaaaaaaaaa aaaaaaa        57

<210> SEQ ID NO 78
<211> LENGTH: 54
<212> TYPE: DNA
<213> ORGANISM: Artificial Sequence
<220> FEATURE:
<223> OTHER INFORMATION: Target capture oligonucleotide
<220> FEATURE:
<221> NAME/KEY: misc_feature
<222> LOCATION: (1)..(21)
<223> OTHER INFORMATION: 2' Methoxy (2'-OMe) backbone
<220> FEATURE:
<221> NAME/KEY: misc_feature
<222> LOCATION: (22)..(54)
<223> OTHER INFORMATION: DNA backbone

<400> SEQUENCE: 78
acggggcuau cacccucuuu gtttaaaaaa aaaaaaaaaa aaaaaaaaaa aaaa        54

<210> SEQ ID NO 79
<211> LENGTH: 58
<212> TYPE: DNA
<213> ORGANISM: Artificial Sequence
<220> FEATURE:
<223> OTHER INFORMATION: Target capture oligonucleotide
<220> FEATURE:
<221> NAME/KEY: misc_feature
<222> LOCATION: (1)..(25)
<223> OTHER INFORMATION: 2' Methoxy (2'-OMe) backbone
<220> FEATURE:
<221> NAME/KEY: misc_feature
<222> LOCATION: (26)..(58)
<223> OTHER INFORMATION: DNA backbone

<400> SEQUENCE: 79
cugggcagau ucacucaaaa uaacguuuaa aaaaaaaaaa aaaaaaaaaa aaaaaaaa    58

<210> SEQ ID NO 80
<211> LENGTH: 27
<212> TYPE: DNA
<213> ORGANISM: Artificial Sequence
<220> FEATURE:
<223> OTHER INFORMATION: Promoter sequence for T7 RNA polymerase

<400> SEQUENCE: 80
aatttaatac gactcactat agggaga                                      27

<210> SEQ ID NO 81
<211> LENGTH: 102
<212> TYPE: DNA
<213> ORGANISM: Mycoplasma genitalium

<400> SEQUENCE: 81
ataccctagt agtccacacc gtaaacgata gatactagct gtcggagcga tcccttcggt  60
agtgaagtta acacattaag tatctcgcct gggtagtaca tt                     102

<210> SEQ ID NO 82
<211> LENGTH: 213
<212> TYPE: DNA
<213> ORGANISM: Mycoplasma genitalium

<400> SEQUENCE: 82
gatcaaaaca ccaccatgta gagaataggt aggagcaatt gatgcaagtt cgcaaggatt  60
tgttgatgtg aaatgtggaa tactaccctt ggttatgttt tgttctaatt ggtaactgtg  120
atccagtttc aagacagtgt taggtgggca gtttgactgg ggcggtcgcc tcctaaaagg  180
taacggaggc gcacaaaggt accttcagta cgg                               213

<210> SEQ ID NO 83
<211> LENGTH: 152
<212> TYPE: DNA
<213> ORGANISM: Mycoplasma genitalium

<400> SEQUENCE: 83
aagaaaacga atgtgattcc gtgtgtagtg gcgagcgaaa gcggaacagg ccaaacctat  60
ctgaggatag gggttgtagg gcttgcatta tggaagttaa aaggatagaa gaagctgttg  120
gaaagcagcg ccaaagaggg tgatagcccc gt                                152

<210> SEQ ID NO 84
<211> LENGTH: 45
<212> TYPE: DNA
<213> ORGANISM: Mycoplasma genitalium

<400> SEQUENCE: 84
aatgtactac ccaggcgaga tacttaatgt gttaacttca ctacc                45

<210> SEQ ID NO 85
<211> LENGTH: 35
<212> TYPE: DNA
<213> ORGANISM: Mycoplasma genitalium

<400> SEQUENCE: 85
ataccctagt agtccacacc gtaaacgata gatac                           35

<210> SEQ ID NO 86
<211> LENGTH: 22
<212> TYPE: DNA
<213> ORGANISM: Mycoplasma genitalium

<400> SEQUENCE: 86
tagctgtcgg agcgatccct tc                                         22

<210> SEQ ID NO 87
<211> LENGTH: 108
<212> TYPE: DNA
<213> ORGANISM: Mycoplasma genitalium

<400> SEQUENCE: 87
ccgtactgaa ggtacctttg tgcgcctccg ttaccttta ggaggcgacc gccccagtca   60
aactgcccac ctaacactgt cttgaaactg gatcacagtt accaatta             108

<210> SEQ ID NO 88
<211> LENGTH: 85
<212> TYPE: DNA
<213> ORGANISM: Mycoplasma genitalium

<400> SEQUENCE: 88
gatcaaaaca ccaccatgta gagaataggt aggagcaatt gatgcaagtt cgcaaggatt  60
tgttgatgtg aaatgtggaa tacta                                      85

<210> SEQ ID NO 89
<211> LENGTH: 20
<212> TYPE: DNA
<213> ORGANISM: Mycoplasma genitalium

<400> SEQUENCE: 89
cccttggtta tgttttgttc                                            20

<210> SEQ ID NO 90
<211> LENGTH: 81
<212> TYPE: DNA
<213> ORGANISM: Mycoplasma genitalium

<400> SEQUENCE: 90
acggggctat caccctcttt ggcgctgctt tccaacagct tcttctatcc ttttaacttc  60
cataatgcaa gccctacaac c                                          81

<210> SEQ ID NO 91
<211> LENGTH: 50

```
<212> TYPE: DNA
<213> ORGANISM: Mycoplasma genitalium

<400> SEQUENCE: 91
aagaaaacga atgtgattcc gtgtgtagtg gcgagcgaaa gcggaacagg              50

<210> SEQ ID NO 92
<211> LENGTH: 21
<212> TYPE: DNA
<213> ORGANISM: Mycoplasma genitalium

<400> SEQUENCE: 92
ccaaacctat ctgaggatag g                                            21
```